United States Patent [19]

Misawa et al.

[11] Patent Number: 5,137,350
[45] Date of Patent: Aug. 11, 1992

[54] DISTANCE MEASURING DEVICE

[75] Inventors: Masayuki Misawa, Tokyo; Isamu Hirai, Fuchu; Saburo Sugawara, Kawasaki, all of Japan

[73] Assignee: Asahi Kogaku Kogyo Kabushiki Kaisha, Tokyo, Japan

[21] Appl. No.: 509,406

[22] Filed: Apr. 16, 1990

[30] Foreign Application Priority Data

| Apr. 14, 1989 | [JP] | Japan | 1-94400 |
| Apr. 25, 1989 | [JP] | Japan | 1-105556 |
| Apr. 27, 1989 | [JP] | Japan | 1-109898 |
| May 9, 1989 | [JP] | Japan | 1-115584 |
| May 9, 1989 | [JP] | Japan | 1-115585 |

[51] Int. Cl.$^5$ .......................... G01C 3/00; G03B 3/00
[52] U.S. Cl. .................. 356/1; 250/201.4; 250/201.6; 354/403
[58] Field of Search ............ 250/201.4, 201.6; 354/403, 408, 402; 356/1

[56] References Cited

U.S. PATENT DOCUMENTS

| 4,470,681 | 9/1984 | Johnson | 354/403 |
| 4,534,636 | 8/1985 | Sugawara | |
| 4,571,048 | 2/1986 | Sugawara | |
| 4,627,734 | 12/1986 | Rioux | 356/1 |
| 4,740,806 | 4/1988 | Takehama | 354/403 |
| 4,768,053 | 8/1988 | Matsuda et al. | |
| 4,800,409 | 1/1989 | Matsuda et al. | |
| 4,841,326 | 6/1989 | Koyama et al. | 354/402 |
| 4,859,842 | 8/1989 | Suda et al. | 354/408 |
| 4,888,490 | 12/1989 | Bass et al. | 356/1 |
| 4,908,646 | 3/1990 | Sato et al. | 354/402 |
| 4,982,219 | 1/1991 | Uchiyama | 354/408 |

FOREIGN PATENT DOCUMENTS

| 59-107332 | 6/1984 | Japan . |
| 59-129809 | 7/1984 | Japan . |
| 59-193406 | 11/1984 | Japan . |
| 60-60511 | 4/1985 | Japan . |
| 60-236013 | 11/1985 | Japan . |
| 61-246613 | 11/1986 | Japan . |
| 62-150309 | 7/1987 | Japan . |
| 62-150312 | 7/1987 | Japan . |
| 62-151818 | 7/1987 | Japan . |
| 62-151819 | 7/1987 | Japan . |
| 62-255921 | 11/1987 | Japan . |

OTHER PUBLICATIONS

English Translation of Japanese Pub. No. 62-150309.
English translation of Japanese Pub. No. 62-151818.
English translation of Japanese Pub. No. 61-246613.
English translation of Japanese Pub. No. 62-151819.
English translation of Japanese Pub. No. 60-236013.

*Primary Examiner*—Stephen C. Buczinski
*Attorney, Agent, or Firm*—Sandler, Greenblum & Bernstein

[57] ABSTRACT

In a distance measuring device for projecting light beams to a plurality of distance measurement point, and for detecting reflected light beams in order to measure the distances from said device to said distance measuring points, light emitted by the light source is optically/mechanically directed to a plurality of two-dimensionally distributed distance measuring points, then the reflected light from each of the distance measuring points is received and the distance between the device and each of the distance measuring points is detected.

125 Claims, 53 Drawing Sheets

DISTANCE MEASURING DEVICE

BACKGROUND OF THE INVENTION

The present invention relates to a distance measuring device for a camera to measure the distance between the device and an object.

Among the conventional auto focus mechanisms of cameras, an auto focusing system utilizing an infrared LED (Light Emitting Diode) is well known. In this system, a small diameter infrared light beam is radiated to an object to be photographed and the reflected light is received by a semiconductor light position sensing device (PSD) and the like. The distance from the detection output of PSD to the object is computed. According to the computed result, a photographic lens is moved to a predetermined position and the object is photographed.

Conventionally, in such an apparatus, for example, when taking a picture of two persons standing apart from each other a light beam for measuring the distance may not be radiated to them, but may pass between them. Thus, the distance to the background rather than to the persons is measured, and the image of the persons is blurred.

To prevent such an erroneous detection, for example, in Japanese patent provisional publication No. SHO 59-193406, a method for horizontally (linearly) separating an infrared light beam into three beams is disclosed. In this method, the distance measurement range is increased and the beams are radiated to the two persons. Thus, the possibility for erroneously measuring the distance to the background can be reduced.

However, in the method described in the above patent publication, there is no problem when taking a picture while the camera is horizontally positioned. However, when taking a picture while the camera is vertically positioned, the problem as described above still occurs.

SUMMARY OF THE INVENTION

It is therefore an object of the present invention to provide an improved distance measuring device for precisely measuring the distance between a camera and the subject regardless of the positions of the camera and the arrangement of the subjects to be photographed by measuring a plurality of measurement points.

For the above objects, according to the invention, there is provided a distance measuring device for projecting light beams to a plurality of distance measurement point and for detecting reflected light beams in order to measure the distances from the device to the distance measuring points. The device comprises a light source and a light projecting device for projecting light emitted by the light source to a plurality of distance measuring points and an optical element for separating the light into a plurality of light beams to be projected to the measuring points, respectively, so that the distance measurement points are two-dimensionally distributed in a first direction perpendicular to the optical axis and in a second direction perpendicular to the optical axis.

A light collecting device is provided for collecting the light beams reflected on the measuring points and a light receiving device for receiving the light collected by the light collecting means is also provided.

DESCRIPTION OF THE ACCOMPANYING DRAWINGS

Figure 11:
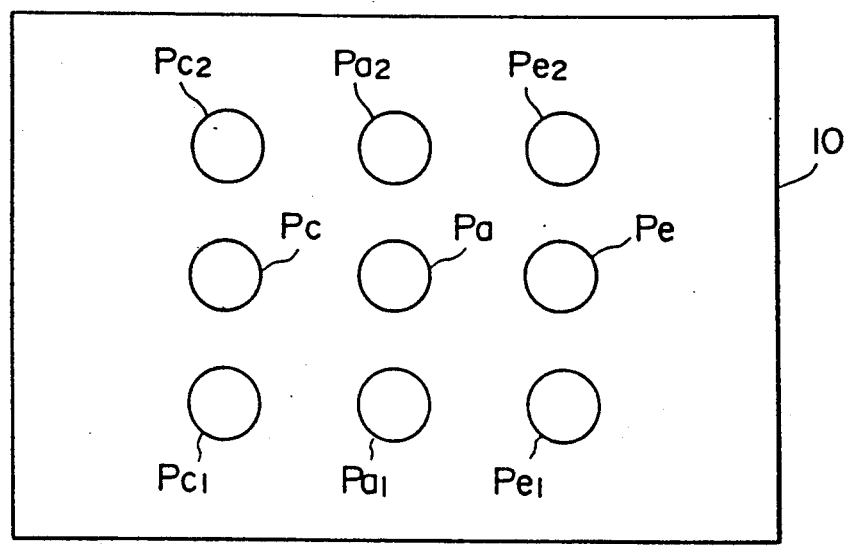
FIG. 11 shows the another example of distance measurement points.
Figure 60A:
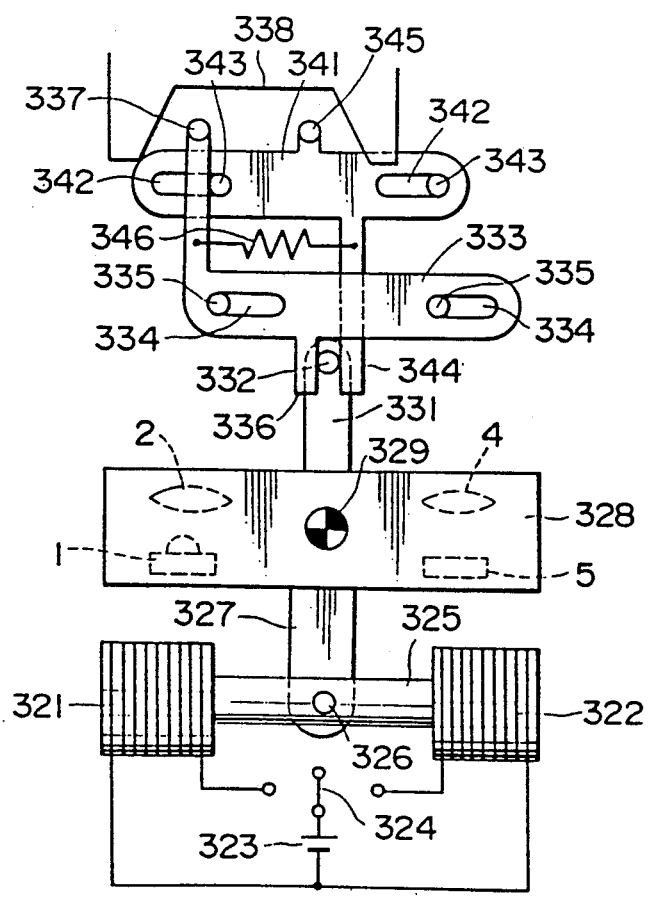
Figure 60B:
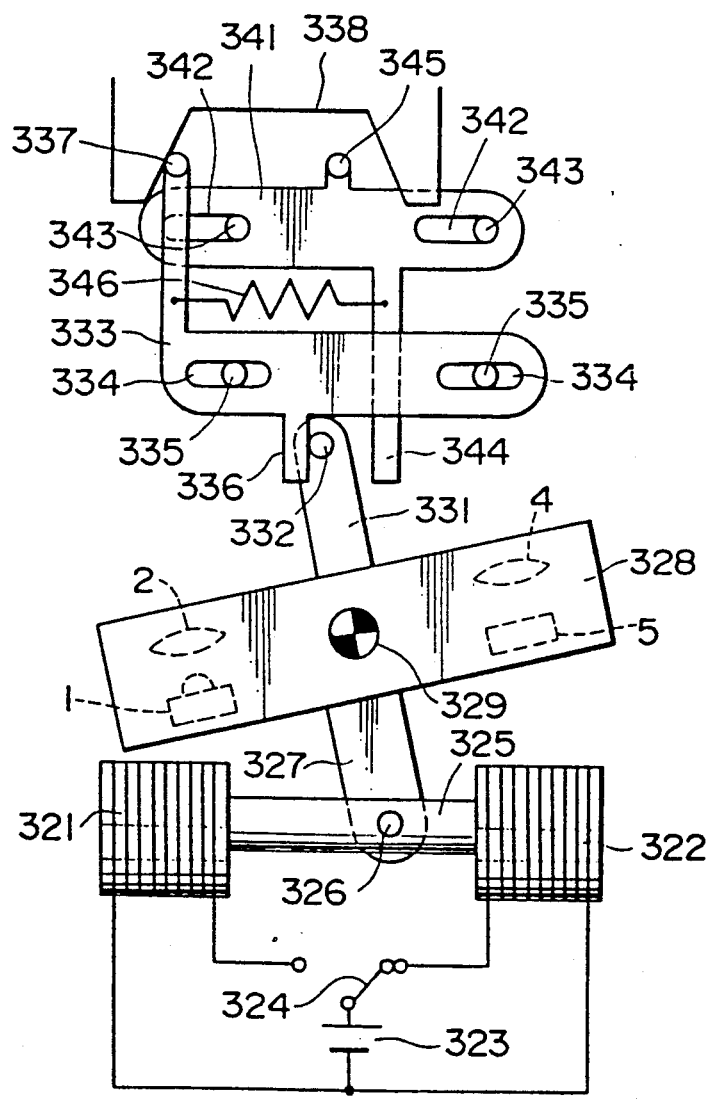
Figure 60C:
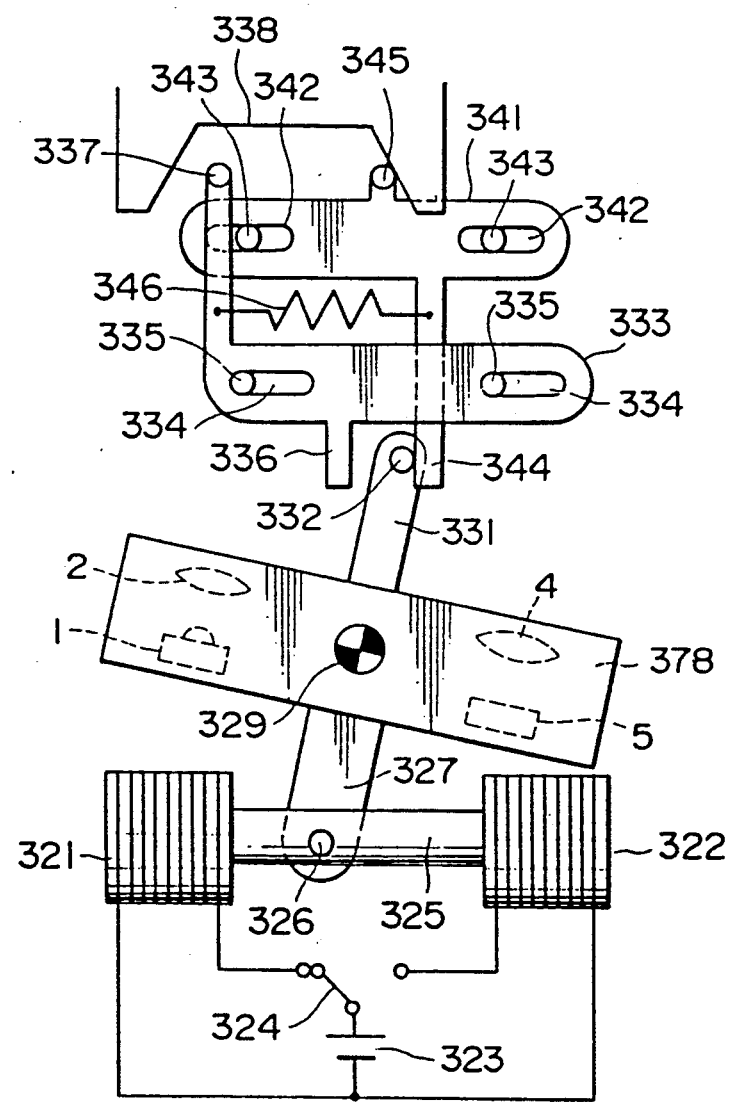
Figure 61:
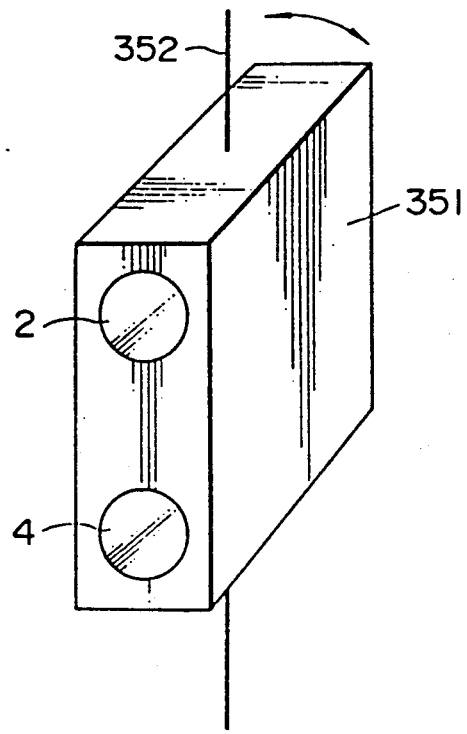
Figure 62:
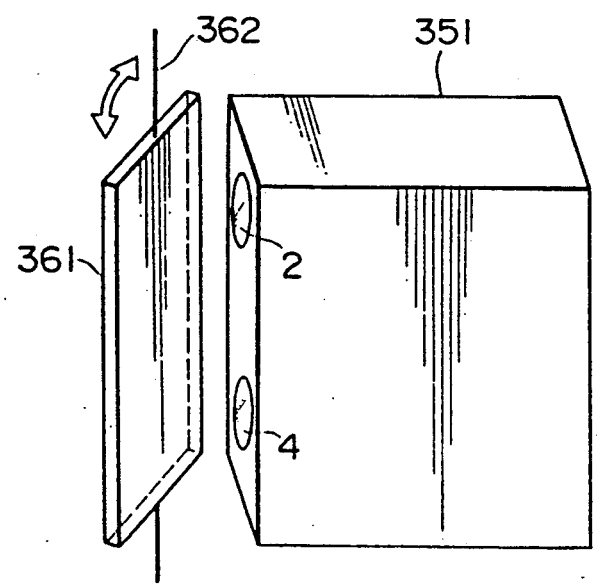
Figure 63:
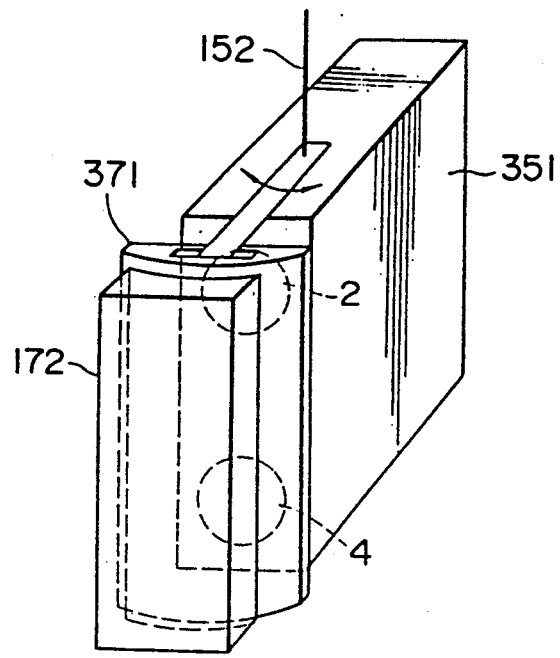
Figure 64:
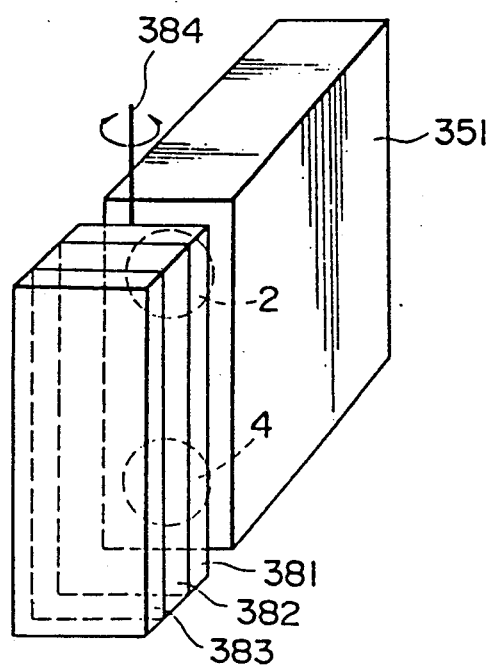
Figure 69:
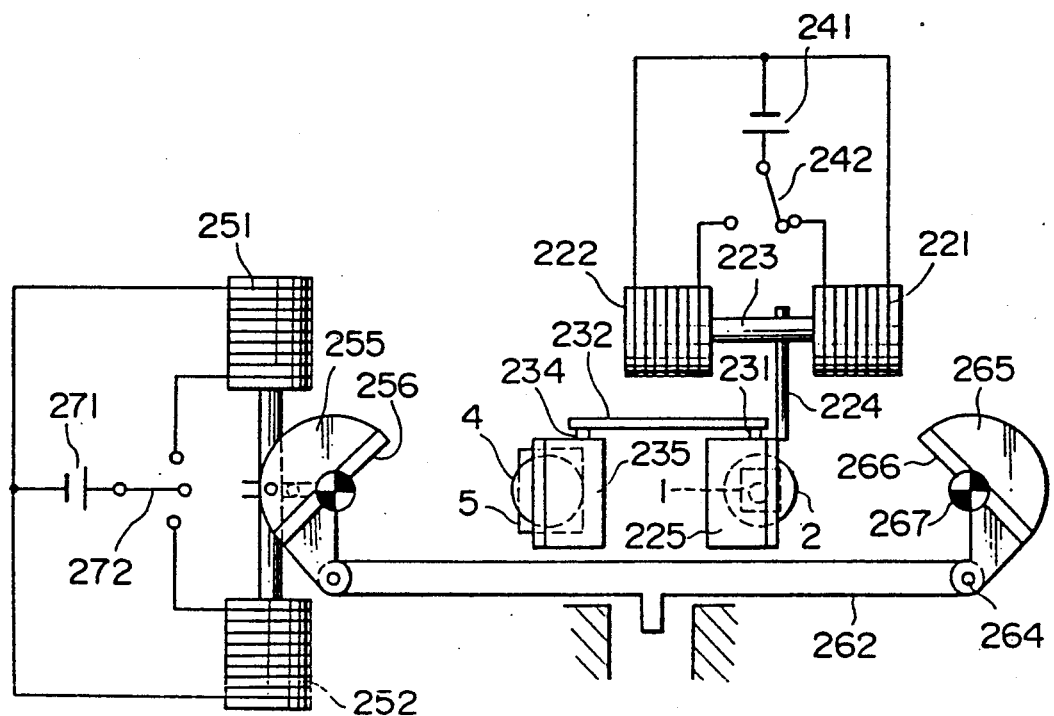
Figure 70:
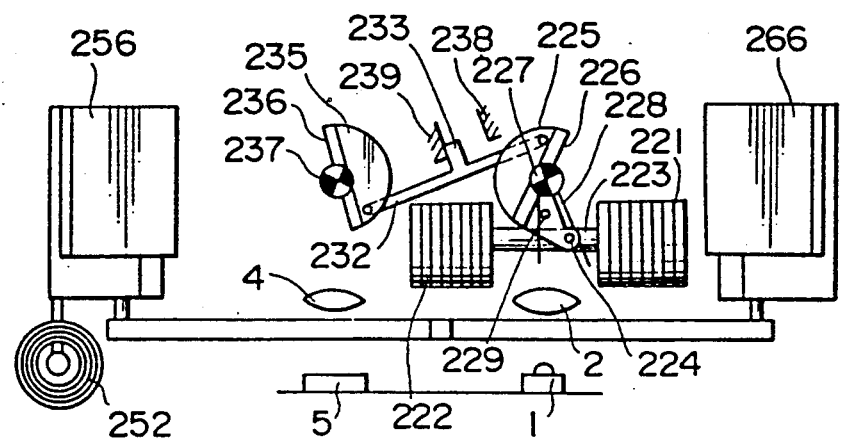
Figure 71:
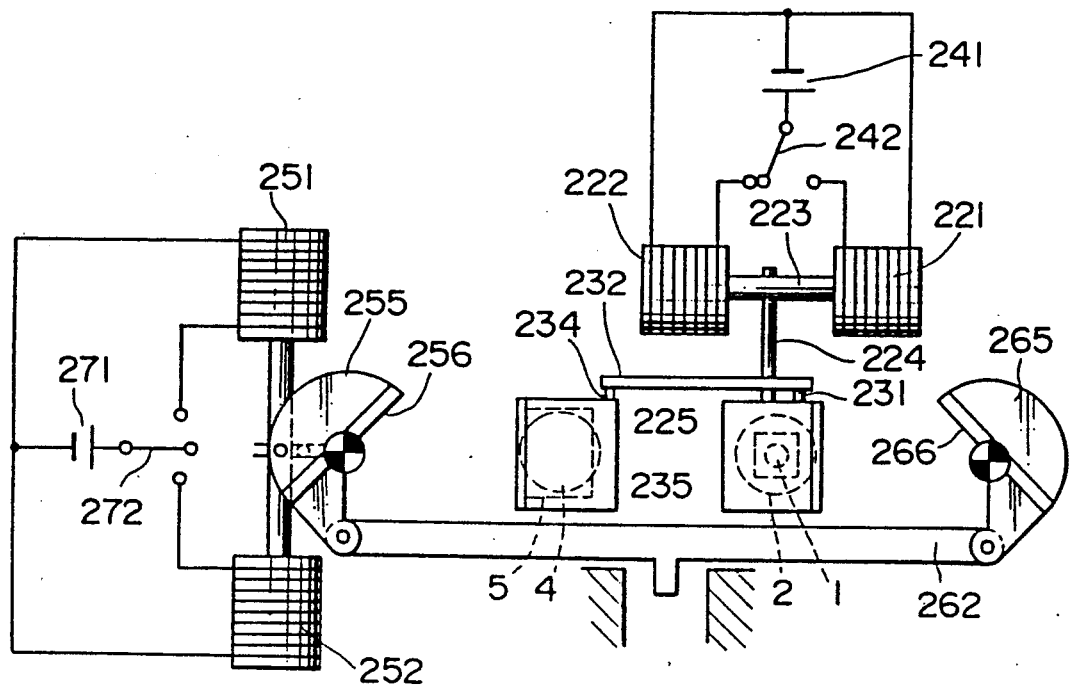
Figure 72:
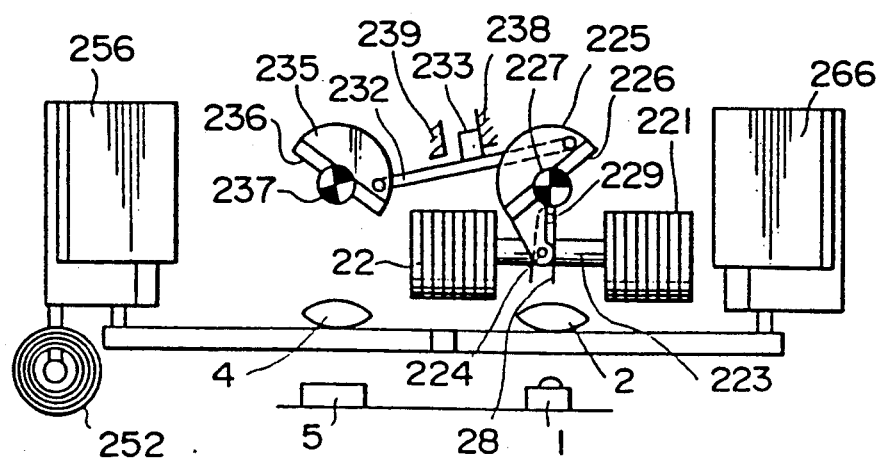
Figure 73:
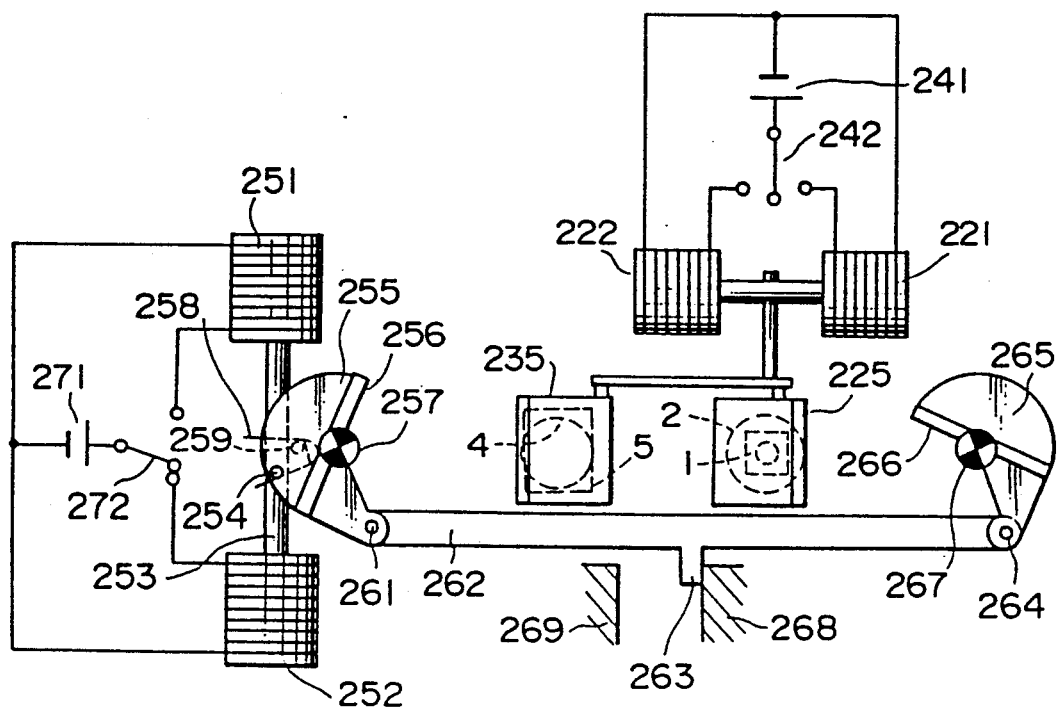
Figure 74:
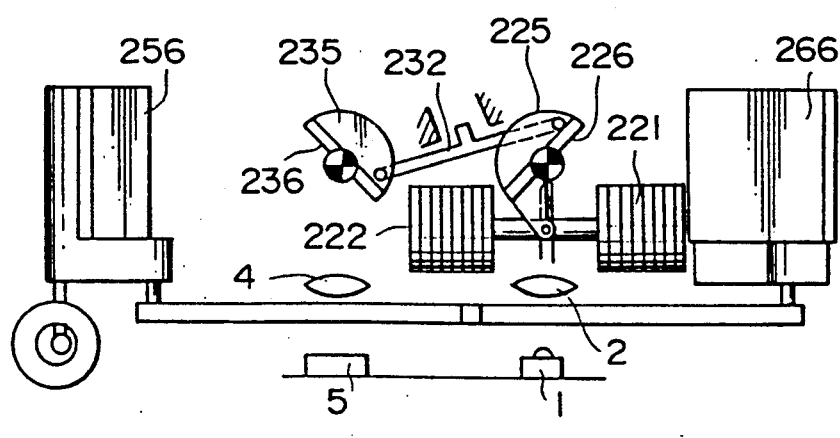
Figure 75:
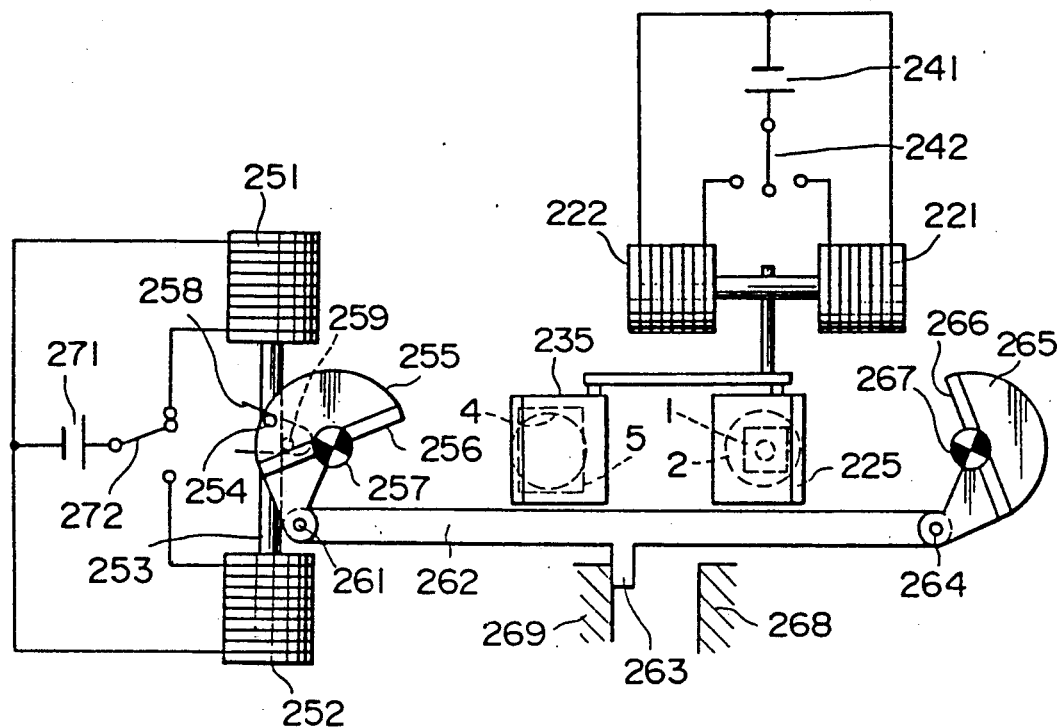
Figure 76:
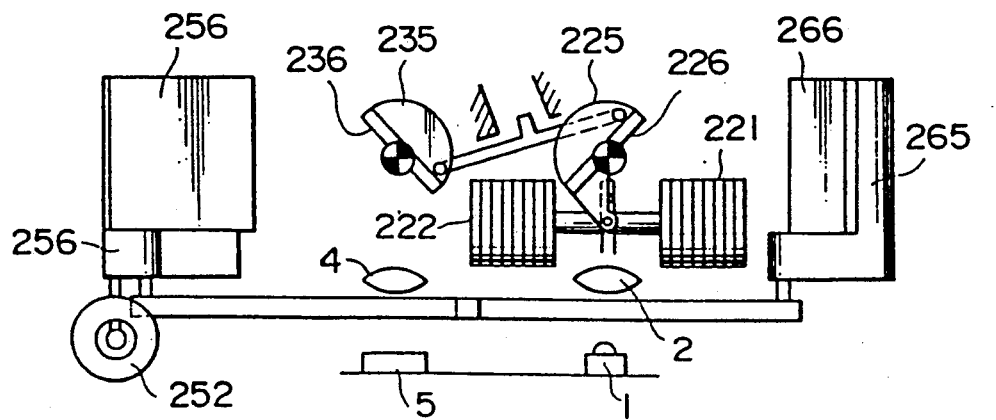
Figure 77:
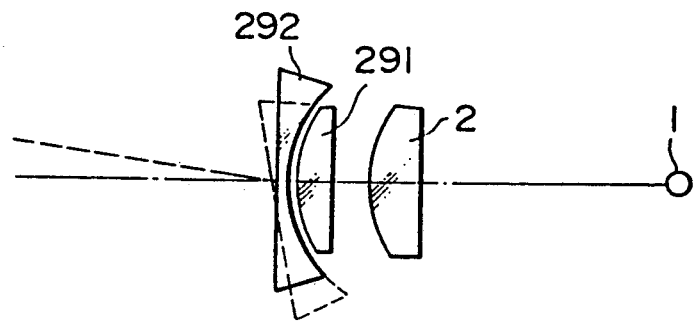
Figure 78A:
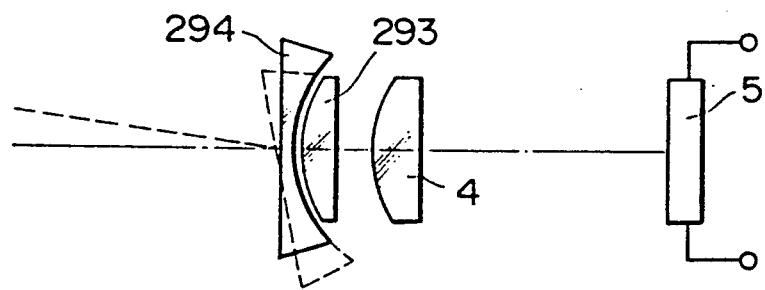
Figure 78B:
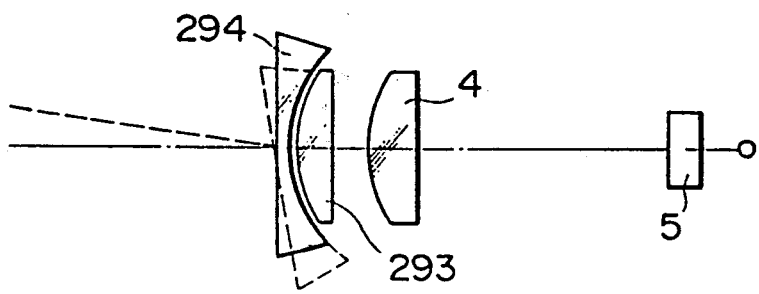
Figure 79:
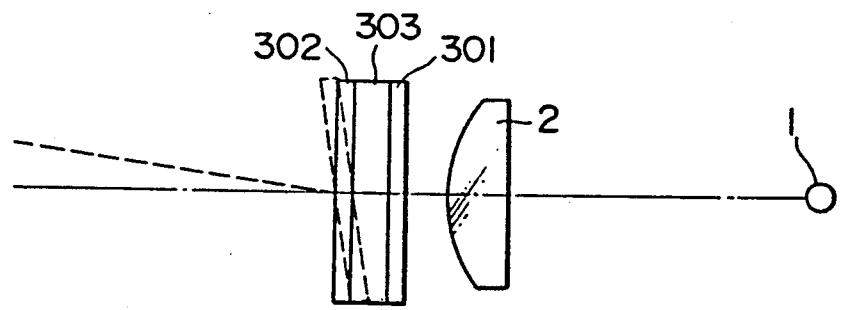
Figure 80A:
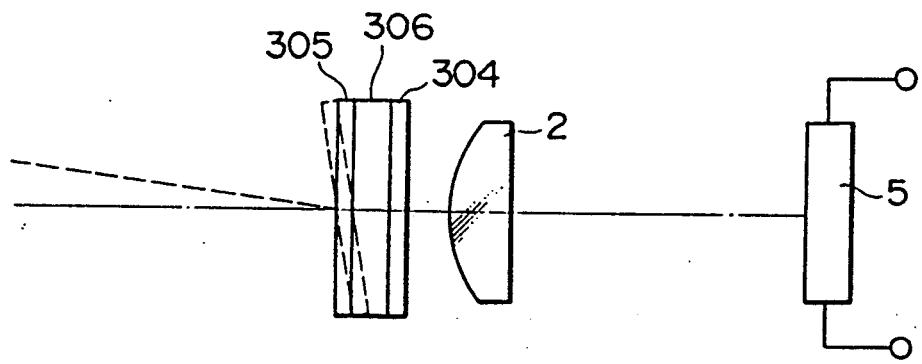
Figure 80B:
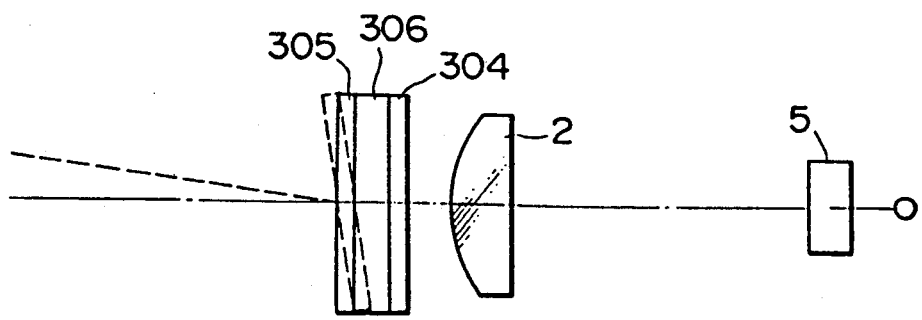

FIGS. 59(a)-59(e) shows fifth modification of the driving mechanism of the third embodiment of the present invention;

FIGS. 60(a)-60(c) shows a sixth modification of the driving mechanism of the third embodiment of the present invention;

FIG. 61 shows a seventh modification of the third embodiment;

FIGS. 62 through 64 show eighth through tenth modifications of the third embodiment of the present invention;

FIGS. 65 through 68 show a fourth embodiment of a mechanism for flatly distributing distance measurement points;

FIGS. 69 and 70 illustrate the case for measuring the distance measurement point Pa1 of FIG. 11;

FIGS. 71 and 72 illustrate the case for measuring the distance measurement point Pa2 in FIG. 11;

FIGS. 73 and 74 illustrate the case for measuring the distance measurement point Pc shown in FIG. 11;

FIGS. 75 and 76 illustrate the case for measuring the distance measurement point Pe of FIG. 11;

FIGS. 77 and 78(a)-78(b) show a first modification of the fourth embodiment;

FIGS. 79 and 80(a)-80(b) show a second modification of the fourth embodiment.

DESCRIPTION OF THE EMBODIMENTS

Figure 1:
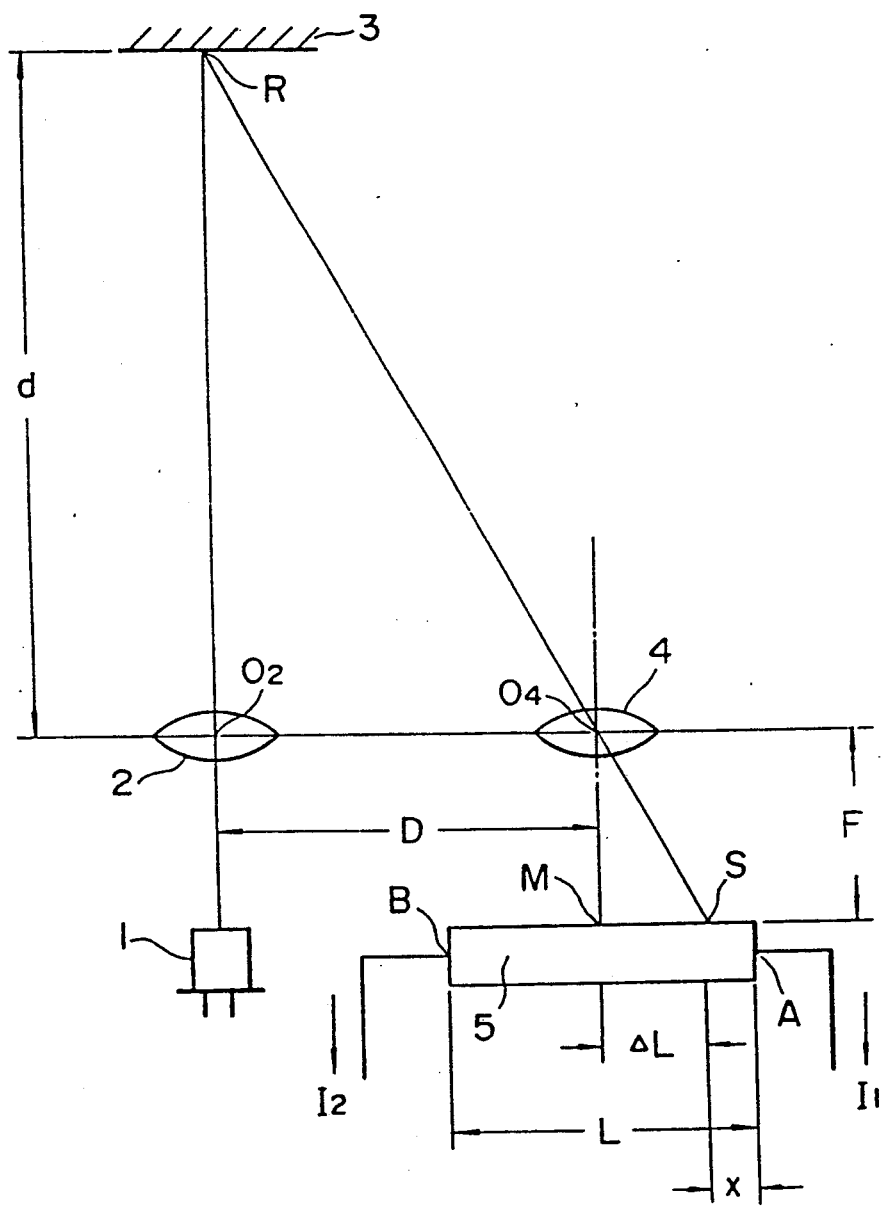
FIG. 1 shows the theory of distance measurement according to the present invention.

FIG. 1 illustrates the theory of distance measurement according to the present invention. In FIG. 1, a light beam emitted from a light source 1, consisting, for example, of an infrared LED (Light Emitting Diode) for measuring the distance, is radiated towards a subject 3 through a lens 2. The light beam is reflected at a reflection point R of the subject 3 and is received at a predetermined position on a semiconductor PSD (Position Sensing Device) 5 via a condenser lens 4.

When the optical axis of the condenser lens 4 is positioned at the center of the PSD 5, if the object 3 is positioned at an infinite distance with respect to the camera focus adjustment, the light beam is entered into the center position M of the PSD 5. As the distance d between the object 3 and the lens 2 becomes small, the spot position S, of the light beam on the PSD 5 moves to the right side, as viewed in FIG. 1.

Assuming that the distance between the right end position A of the PSD 5 and the spot position S is x, the distance between the center position M and the spot position S is $\Delta L$, the length between the left side portion B of the PSD 5 and the right side portion A thereof is L, since the length is proportional to the resistance, the output current $I_1$ from the right side portion A of the PSD 5 and the output current $I_2$ from the left side portion B thereof are expressed as follows.

$$I_1 = I_p \cdot (L-x)/L \tag{1}$$

$$I_2 = I_p \cdot x/L \tag{2}$$

where $I_p$ is an optical current (constant value).

From the above equations, the following equation can be obtained.

$$\begin{aligned} I_0 &= (I_1 - I_2)/(I_1 + I_2) \\ &= (I_p(L-x)/L - I_p \cdot x/L)/ \\ &\quad (I_p(L-x)/L + I_p \cdot x/L) \\ &= 1 - 2 \cdot x/L \end{aligned} \tag{3}$$

where $I_o$ represents the ratio of the dimensions in the first noted equation above. In addition, since the following equation is satisfied, $$x = L/2 - \Delta L \tag{4}$$

By starting with Equation (4) and substituting therein Equation (3), Equation (5) is obtained. Thus $$I_0 = 1 - 2 \cdot x/L \quad (5)$$
$$= 1 - 2(L/2 - \Delta L)/L$$
$$= 2 \cdot \Delta L/L$$

Since the triangle which is defined by vertexes at the center $O_2$ of the lens 2, at the reflection point R of the object 3, and at the center $O_4$ of the condenser lens 4 is similar to that which is defined by vertexes of the center position M, of the center point $O_4$, and of the spot position S, Equation (6) is satisfied.

$$\Delta L = DF/d \quad (6)$$

where F is the focal length of the condenser lens 4 (length distance between the condenser lens 4 and the PSD 5) and d is the base length (distance between the lens 2 and the condenser lens 4).

Thus, by starting from to Equation (5) and substituting Equation (6), the following Equation (7) is obtained.

$$I_0 = 2DF/(dL) \quad (7)$$

By re-arranging Equation (7), Equation (8) can be obtained.

$$d = 2DF/(LI_0) \quad (8)$$

In Equation (8), the values D, F, and L are known and value $I_0$ is calculated from the output currents $I_1$ and $T_2$ of the PSD 5 according to Equation (3). Thus, the distance to the object can be computed from Equation (8).

Figure 2:
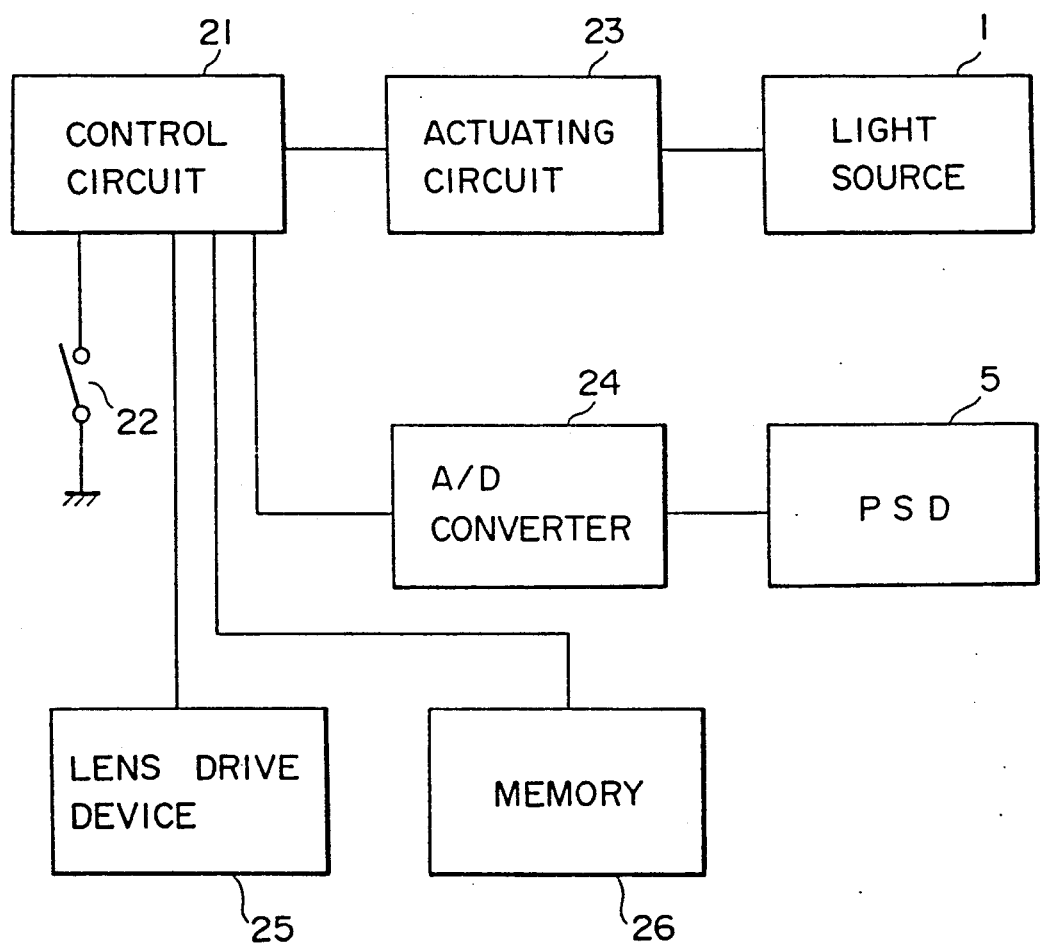
FIG. 2 is a block diagram of the distance measuring device according to the present invention.

FIG. 2 is a block diagram of the distance measuring device according to the present invention. In the FIG. 2, 21 is a control circuit comprising a microcomputer, for example. The control circuit 21 controls the photographing operation including the distance measurement operation. Component 22 represents a switch which operates in conjunction with the shutter release button (not shown). Component 23 represents a drive circuit for energizing the light source 1. Component 24 represents an A/D conversion circuit for converting analog output data of the PSD 5 to digital data and for supplying the resultant digital data to the control circuit 21. Component 25 represents a lens drive system for driving the photographing lens (not shown). Finally, component 26 represents a memory for storing programs, data, and so forth.

Thus, by pressing the switch 22, the control circuit 21 actuates the light source 1 via the actuating circuit 23 and generates a light beam. The light beam is projected onto the subject 3 via the lens 2 (refer to FIG. 1). The light beam reflected by the subject 3 enters the PSD 5 via the condenser lens 4. The output currents $I_1$ and $I_2$ of the PSD 5 are converted from analog data to digital data by the A/d converter 24 and then input to the control circuit 21. The control circuit 21 computes the distance d according to Equation (3) and Equation (8) described above. The values D, F, L, and so forth have been stored in the memory 26.

Figure 3:
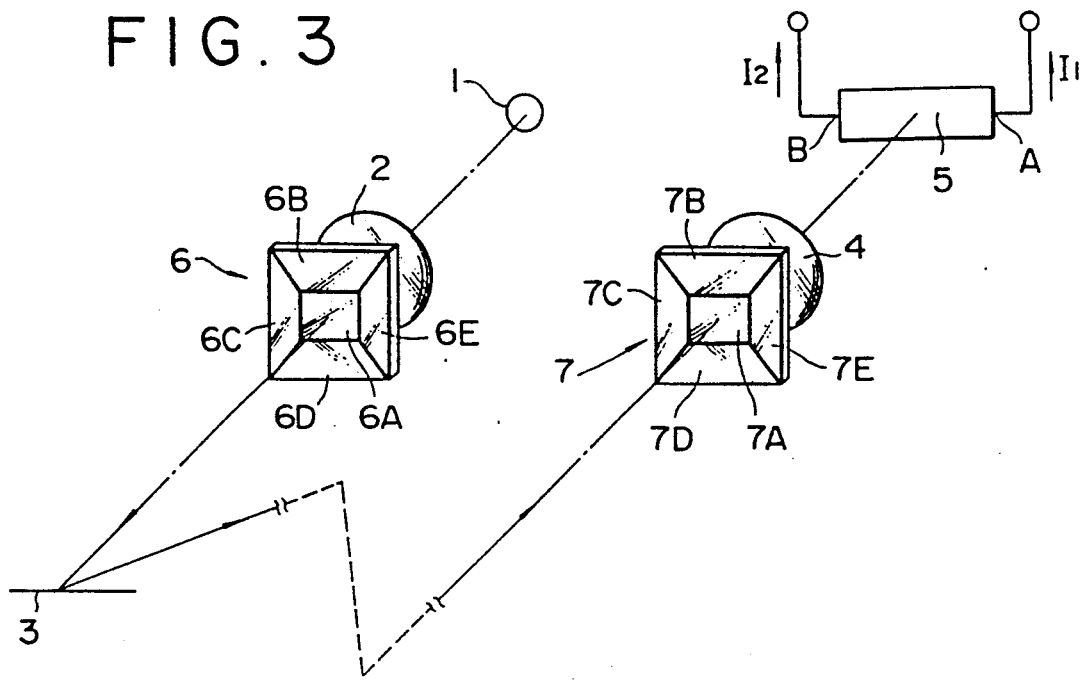
FIG. 3 is a first embodiment of the distance measuring device according to the present invention.

FIG. 3 represents a first embodiment of the distance measuring device according to the present invention.

In FIG. 3, a light beam emitted from a light source 1 is projected towards an object 3 by way of a lens 2 and a prism 6 acting as an optical element. The light beams reflected back by the object 3 enter another prism 7 as another optical element, and collected into a beam, then directed onto a PSD 5, by way of a condensor lens 4.

Figure 4A:
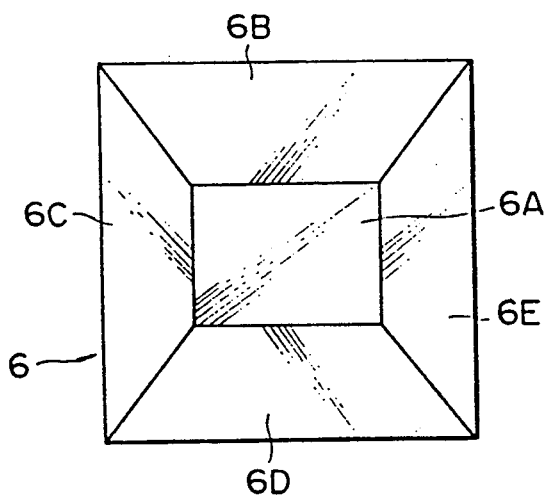
FIGS. 4a-4c shows several views of the prism of the first embodiment.
Figure 4B:
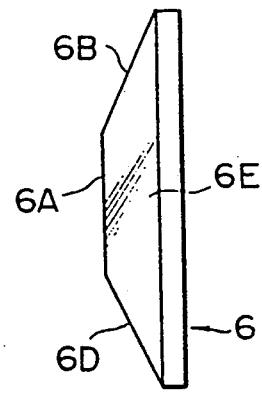
Figure 4C:
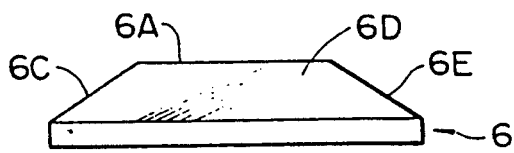

As shown in detail in FIG. 4, the prism 6 is formed as a frustum of a substantially quadrangular (with respect to the four angled surfaces 6B-6E of prism 6) pyramid having a horizontal surface 6A, and surfaces 6B through 6E forming a predetermined angle with respect to the horizontal surface 6A. Like the prism 6, the prism 7 is formed as a frustum of a quadrangular pyramid having of a horizontal surface 7A, and inclined surfaces 7B through 7E. The prism 7 may be identical to the prism 6.

Figure 5:
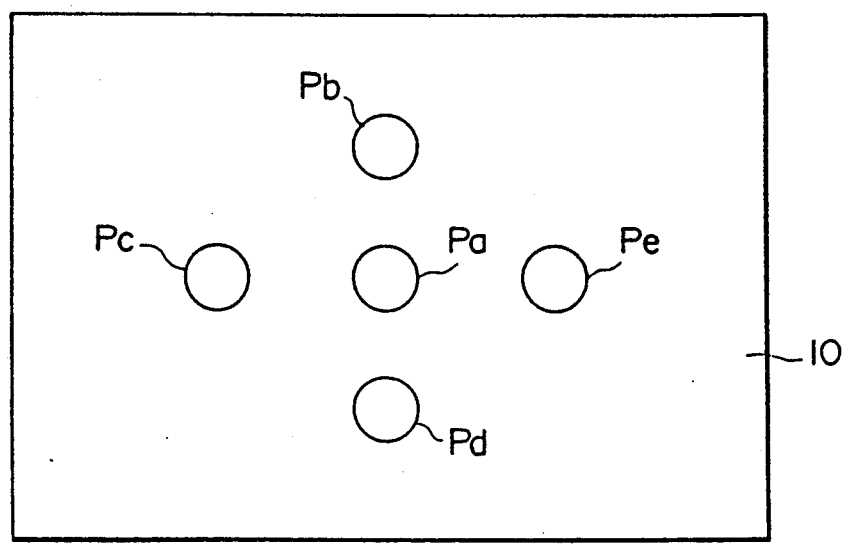
FIGS. 5 and 6 show the distance measurement points of the first embodiment.

In the first embodiment since the prism 6 is positioned in the light path, one light beam emitted from the light source 1 is separated into five light beams according to the surfaces 6A through 6E of the prism 6 so that the measuring position is distributed two-dimensionally (in a plane). The distance measurement points of such five light beams are distributed as shown in FIG. 5. The distance measurement point Pa is substantially at the center of a photographing range 10; distance measurement points Pb and Pd in the upper and lower positions thereof; distance measurement points Pc and Pe are at the left and right of the center. The distance measurement point Pa through Pe correspond to the surfaces 6A through 6E of the prism 6, respectively.

Besides the horizontal direction (for example, in the direction of the base length), a plurality of distance measurement points Pa through Pe are provided in the direction perpendicular thereto (namely, in the direction perpendicular to that of the base length). Therefore, when the object is located at the center of the photographing range 10, its distance can be precisely measured. Further, even if the object is located on the left or right of the center or in an upper or lower position thereof, its distance can be precisely measured.

Figure 6:
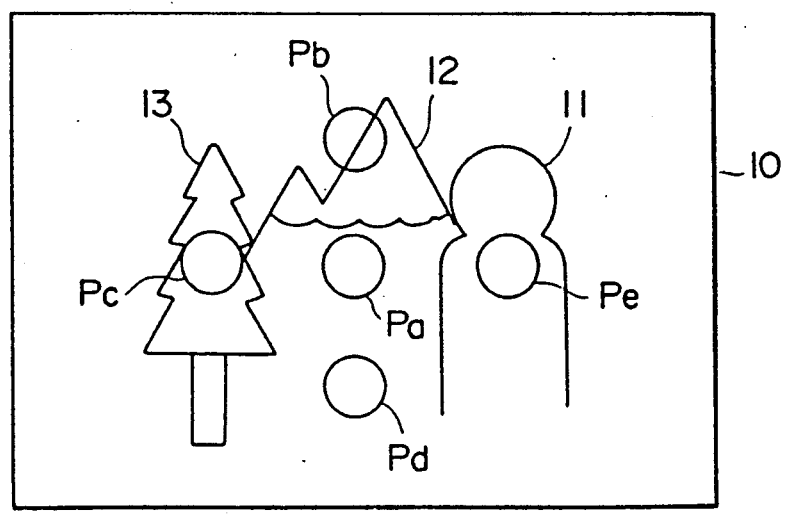

For example, as shown in FIG. 6, assume that a person 11 is located at the right of the center of the photographing range 10, a tree 13 is located at the left of the center of the photographing range 10, and a mountain 12, which is the background, is located at the center of the photographing range 10. The person 11, the tree 13 and the mountain 12 are measured at the distance measurement points Pe, Pc, and Pb (Pa and Pd), respectively these distance measurement points represent the points where light beams emitted by the light source on the camera are reflected by a subject located thereat; to be collected and processed by the light receiving circuit of the distance measurement device on the camera. Although these distance measurement points may, based on subjects positioned at different distances from the camera, form a three dimensional distribution at various distances from the camera, these points form a two dimensional pattern of points when projected onto a plane. For example, this two dimensional pattern can be seen in FIG. 6. These projected points can extend horizontally and vertically within the photographing range 10. The two dimensional pattern of points is defined by a first direction and a second direction, with each of these directions being perpendicular to the optical axis of the camera. Though preferably the first and second directions are orthogonal to each other, with the first direction extending along the baseline or horizontal direction and the second direction extending along the vertical direction, as shown in the drawings, the first and second directions do not necessarily have to be so oriented, and it is sufficient that they extend in different directions from one another.

The reflected light beams from the distance measurement points Pa through Pe enter from the surfaces 7A through 7E of the prism 7, respectively, to the condenser lens 4. The light beams from the condenser lens 4 enter to the PSD 5 (see FIG. 3).

Figure 7:
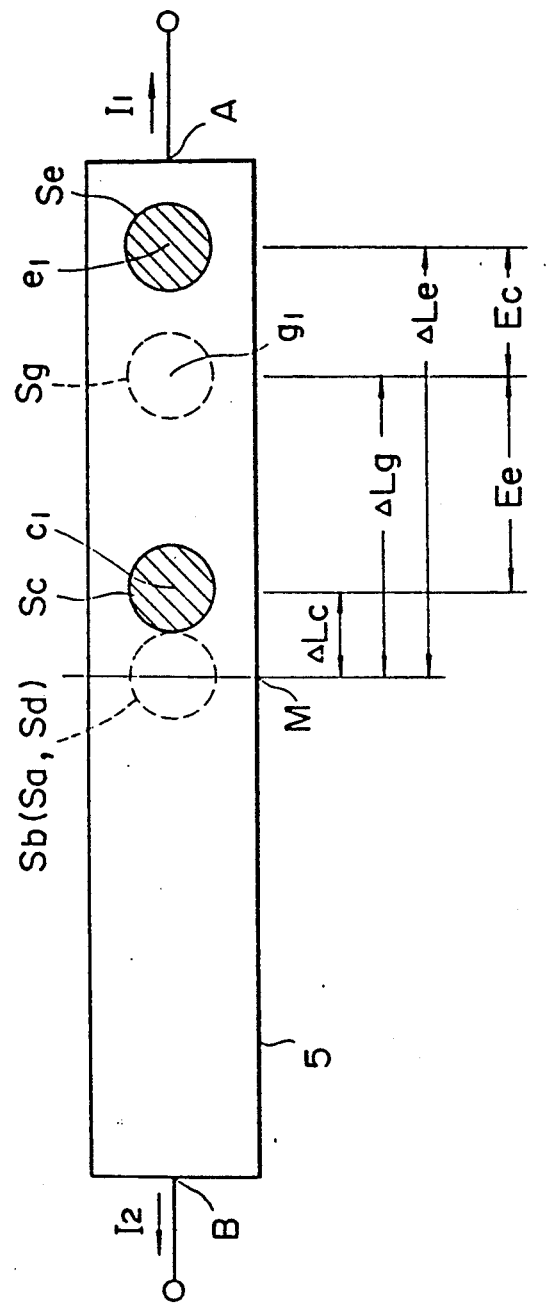
FIG. 7 illustrates the detection of the beam of the reflected light.

Now, assuming that the person 11 is the nearest to the camera, the mountain 12 is the farthest thereto, and the tree 13 is therebetween, as shown in FIG. 7, on the PSD 5, the distance $\Delta Le$ from the center position M of the spot Se according to the distance measurement point Pe becomes larger than $\Delta Lc$ from the center position M of the spot Sc according to the distance measurement point Pc. The spot Sb (Sa, Sd) according to the distance measurement point Pb (Pa, Pd) is theoretically disposed in the center position M. However, since the distance between the distance measurement point Pb (Pa, Pd) and the camera is very long, the light beam may deteriorate in intensity on the way and the spot Sb (Sa, Sd) may not be formed.

Assuming that optical energies of the spots Sc and Se are Ec and Ee, respectively; the distances between the camera and each of the distance measurement points Pc and Pe are dc and de, respectively; the reflectances at the distance measurement points Pc and Pe are Rc and Re, respectively, the following Equation (9) is satisfied.

$$Ec:Ee = Rc/(dc)^2 : Re/(de)^2 \qquad (9)$$

From Equation (9), Equation (10) is satisfied.

$$Ec/Ee = Rc(de)^2/(Re \cdot (dc)^2) \qquad (10)$$

Assuming that the center positions of the spots Sc and Se are $c_1$ and $e_1$, respectively, the center position of light energy of both the spots, g1, becomes a point where segments c1 and e1 are interpolated with the ratio of light energies Ee to Ec. Thus, the distance $\Delta Lg$ between the center position $g_1$ and the center position M can be obtained from Equation (11).

$$\Delta Lg = \Delta Le - (\Delta Le - \Delta Lc)/(1 + Ee/Ec) \qquad (11)$$

Since the PSD 5 outputs currents $I_1$ and $I_2$ according to Equation (11), if there are two or more objects in the distance measurement range, the optical center position is measured.

Generally, because the light energy of the reflected light beam from a subject at a short distance (spot Se in this embodiment) is stronger than that at a long distance (Sc in this embodiment), regardless of the presence of a subject at a further distance, the object at the nearer-distance is focused. More generally, because the main object located nearly at the center of the photographing range 10 is the nearest one in most cases, it is possible to prevent the object from being blurred.

Figure 8A:
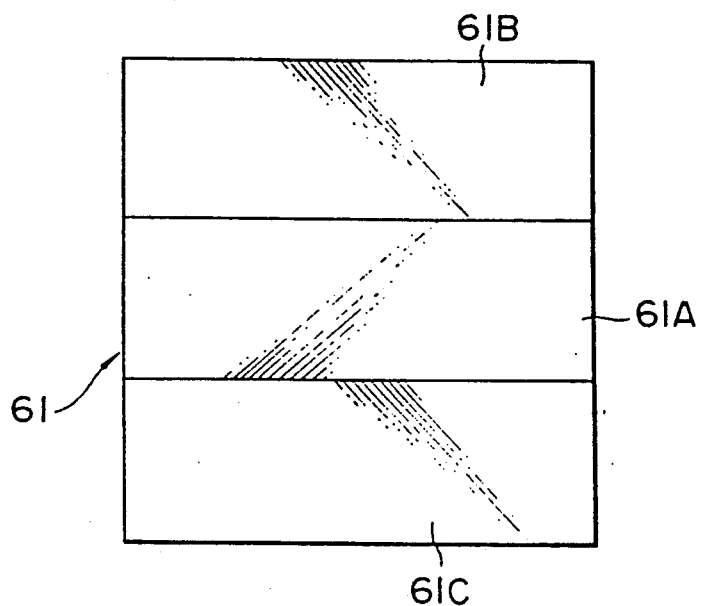
FIGS. 8a-8b shows a modification of the prism according to the present invention.
Figure 8B:
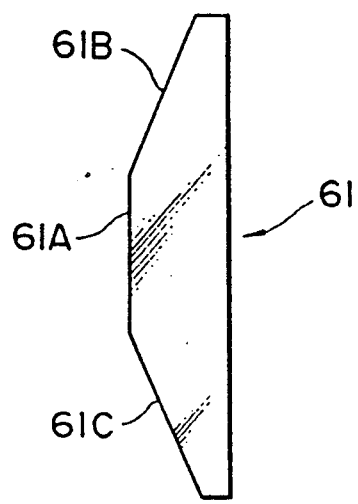

FIGS. 8(a) and 8(b) shows a modification of the prism according to the present invention. The prism 61 has a substantially quadrilateral or biangular (with respect to the two angled surfaces 61B and 61C of prism 61) shape, with one horizontal surface 61A and two inclined surfaces 61B and 61C with a predetermined angle thereto. Thus, the prism 61 can separate one light beam into three light beams which are linearly aligned. Consequently, by disposing the two prisms 61 at an angle of 90°, like the first embodiment described above, light beams which are distributed can be obtained.

The number of the distance measurement points can be selected by forming the prisms in various shapes or by using plurality of prisms whose shapes are same or different.

Figure 9:
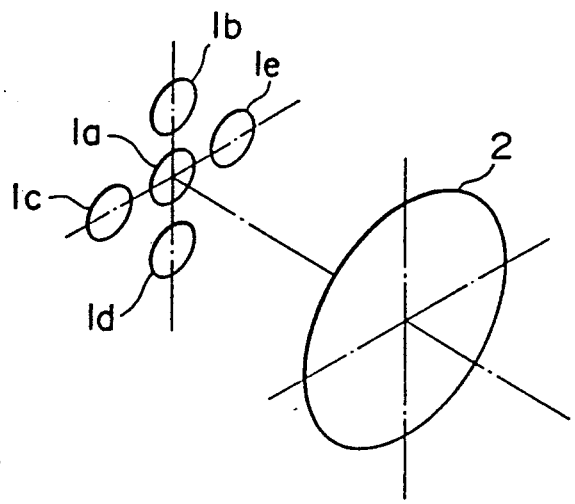
FIG. 9 shows a first modification of the light emitting system according to the present invention.

FIG. 9 shows a first modification of the light emitting system according to the present invention. In this modification, as a light source 1, five LEDs 1a through 1e are provided. The LED 1a is disposed at the center; the LEDs 1c and 1e are disposed on the left and right, respectively; the LEDs 1b and 1d are disposed in the upper and lower positions, respectively. The line formed by the three LEDs 1c, 1a and 1e is parallel to the direction of the base length. The line formed by the three LEDs 1b, 1a, and 1d extends substantially perpendicular to the former line.

Thus, as shown in FIG. 5, in the photographing range 10 of the camera, the five distance measurement points Pa through Pe are two-dimensionally (flatly) distributed corresponding to the LEDs 1a through 1e, respectively.

Figure 10:
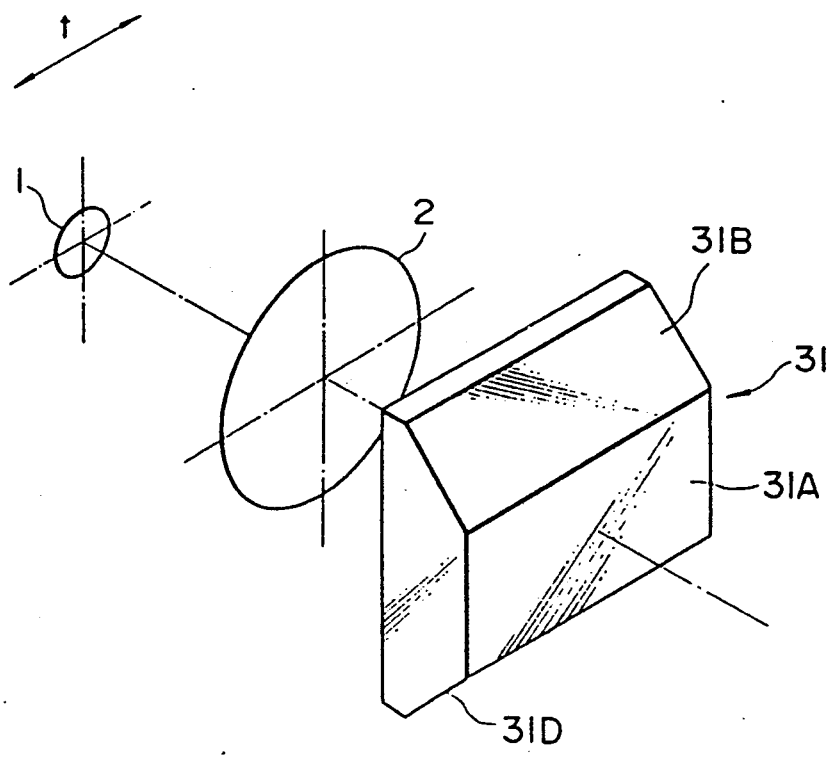
FIG. 10 is a second modification of the light emitting system of the present invention.

FIG. 10 is a second modification of the light emitting system. On the subject side of the lens 2, a prism 31 is disposed. The prism 31 has a surface 31B inclined with respect to the base length (in the upper and lower directions), a surface 31A perpendicular to the optical axis of the received light, and an inclined surface 31D. Thus, one light beam emitted from the light source 1 is separated into three light beams. They are emitted from the three surfaces 31A, 31B, and 31D. Thus, as shown in FIG. 11, the distance measurement points Pa, Pa2, and Pa1 are formed at the center and in the upper and lower portions of the photographing range 10 according to the light beams emitted from the surfaces 31A, 31B, and 31D of the prism 31. In this second modification of the light emitting system, by causing a motor 27 to drive the light source 1, the light source 1 is moved in the direction of the base length (in the left and right direction) for a predetermined distance. Thus, at the left and right of the distance measurement points Pa, Pa2, and Pa1, the distance measurement point Pc, Pe, Pc2, Pe2, Pc1, and Pe1 are formed, respectively. In other words, the distance measurement points are two-dimensionally (flatly) distributed.

Figure 12:
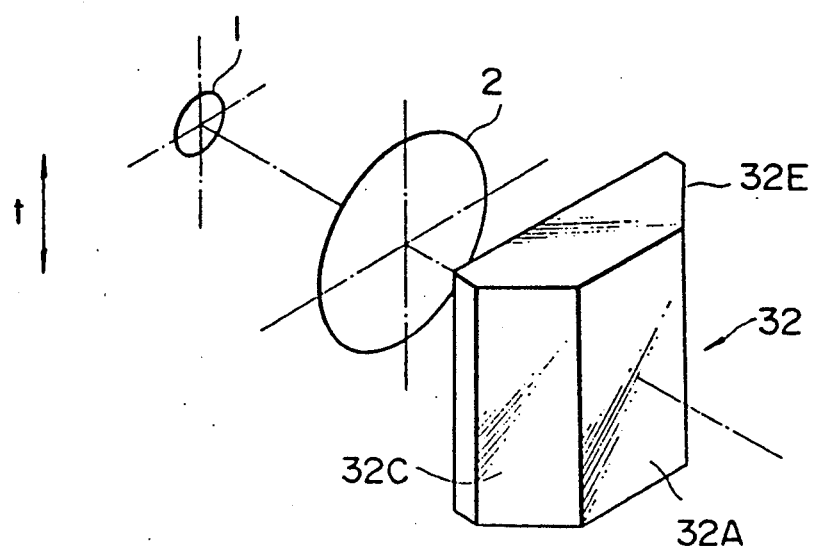
FIG. 12 shows a third modification of the light emitting system of the present invention.

FIG. 12 shows a third modification of the light emitting system of the present invention. In this modification, a prism 32 is disposed on the emission side of the lens 2, the prism 32 having an inclined surface 32C, a vertical surface 32A and an inclined surface 32E which are disposed in the direction of the base length. Thus, one light beam which is emitted from the light source 1 is separated into three light beams in the direction of the base length and distance measurement points Pa, Pa1, and Pa2 are formed. Consequently, in this case, by moving the light source 1 in a direction perpendicular to that of the base length for a predetermined distance, the distance measurement points Pa2, Pc2 and Pe2, and the distance measurement points Pa1, Pc1 and Pe1, are formed in upper and lower positions with respect to the distance measurement points Pa, Pc, and Pe, respectively.

Figure 13:
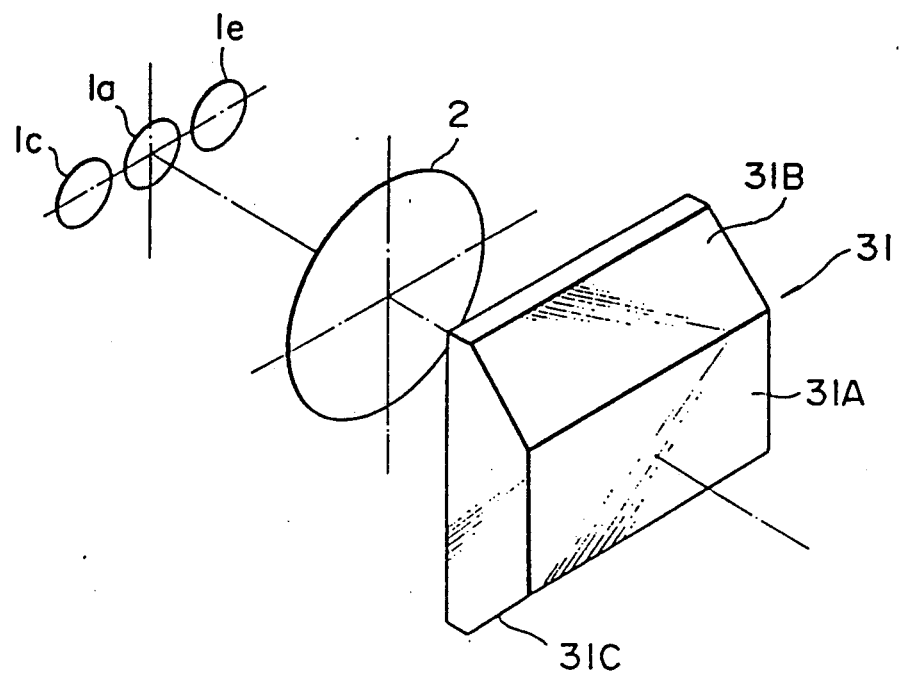
FIG. 13 shows a fourth modification of the light emitting system of the present invention.

FIG. 13 shows a fourth modification of the light emitting system of the present invention. In this embodiment, three LEDs 1c, 1a, and 1e are linearly disposed in the direction of the base length, and the prism 31 is disposed in front of the light emitting lens 2. The three light beams emitted from the LEDs 1a, 1c, and 1e are emitted from the surface 31A. The light beams are upwardly and downwardly deflected at a predetermined angle and three light beams are emitted from each of the surfaces 31B an 31C. In this case, as shown in FIG. 11, in the lower and upper positions of the distance measurement point Pa, Pc, and Pe, the distance measurement points Pa1, Pc1, and Pe1 and the distance measurement points Pa2, Pc2, and Pe2 are formed, respectively. Namely, in total, nine distance measurement points are formed.

Figure 14:
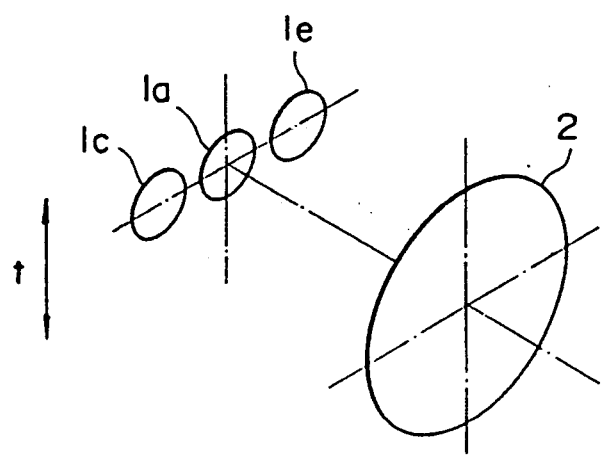
FIG. 14 shows a fifth modification of the light emitting system of the present invention.

FIG. 14 shows a fifth modification of the light emitting system of the present invention. In this modification, three LEDs 1a, 1c, and 1e are disposed. They are mechanically moved (vertically) for a predetermined distance by a mechanism (not shown) in the direction perpendicular to that in which they are disposed. Thus, the illustrated state of the LEDs 1a, 1c, and 1e can be changed to a state where they are upwardly moved by a predetermined distance therefrom, and to the state where they are downwardly moved by a predetermined distance therefrom, thereby the distance measurement operations are executed. Thus, in operation, the structure of this case becomes the same as that where nine LEDs are flatly disposed.

Figure 15:
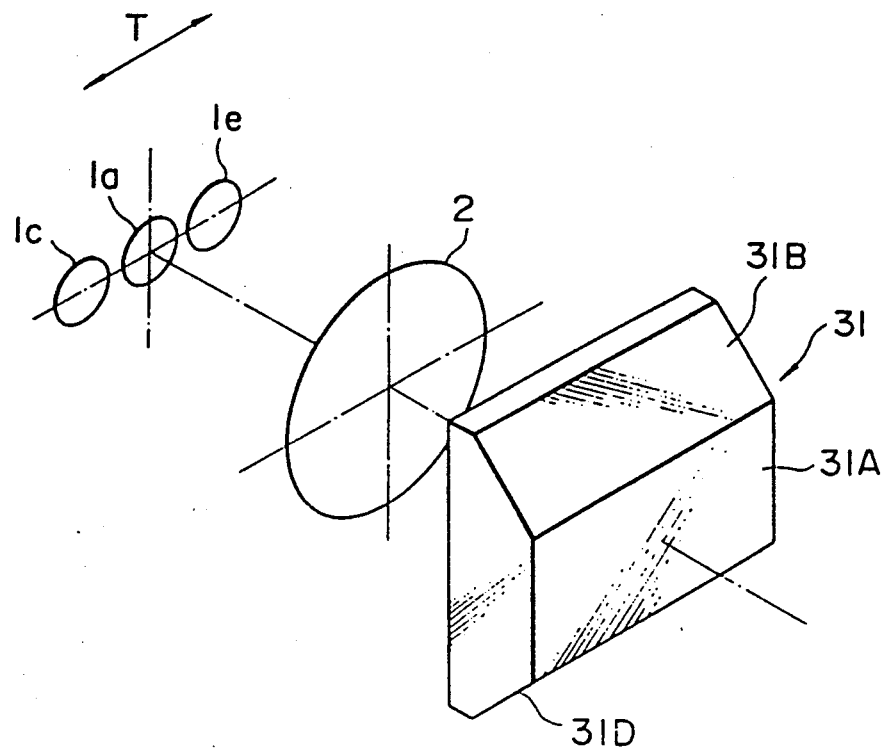
FIG. 15 shows a sixth modification of the light emitting system of the present invention.

FIG. 15 shows a sixth modification of the light emitting system of the present invention. In this modification, the three LEDs 1a, 1c, and 1e are disposed as the light source 1. The LEDs 1c, 1a, and 1e are linearly disposed in the direction parallel to the base length (in the horizontal direction of the figure). These LED 1a, 1c, and 1e are individually and sequentially energized (electrically scanned). On the object side of the lens 2, the prism 31 for two-dimensionally (flatly) distributing distance measurement points is disposed. Thus, when one LED (for example, 1a) lights, light beams are emitted from the surfaces 31A, 31B, and 31D of the prism 31. As shown in FIG. 11, in the photographing range 10, three distance measurement points (Pa, Pa1, and Pa2) are formed in the direction perpendicular to that of the base length (namely, in the vertical direction of the figure). The distance measurement points Pa, Pa1, and Pa2 correspond to the light beams emitted from the surface 31A, 31B, and 31D, respectively. Likewise, the other LEDs 1c and 1e are lighted, the distance measurement points Pc, PC1, Pc2, and the distance measurement points Pe, Pe1, and Pe2 are formed. Namely, nine distance measurement points are provided.

Figure 16:
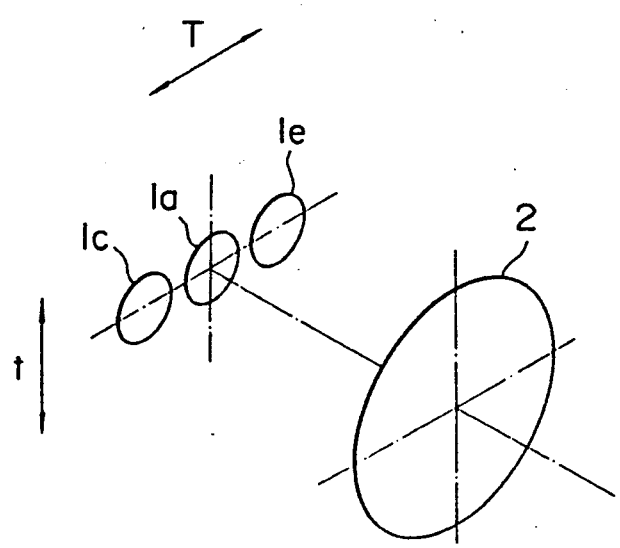
FIG. 16 shows a seventh modification of the light emitting system of the present invention.

FIG. 16 is a seventh modification of the light emitting system of the present invention, with the prism 31 of FIG. 15 being omitted, the LEDs 1a, 1c, and 1e being moved for a predetermined distance in the direction perpendicular to that of the base length (in the vertical direction of the drawing). In other words, by mechanically moving the LEDs, the distance measurement points are two-dimensionally distributed. In this case, nine distance measurement points are provided, likewise.

Figure 17:
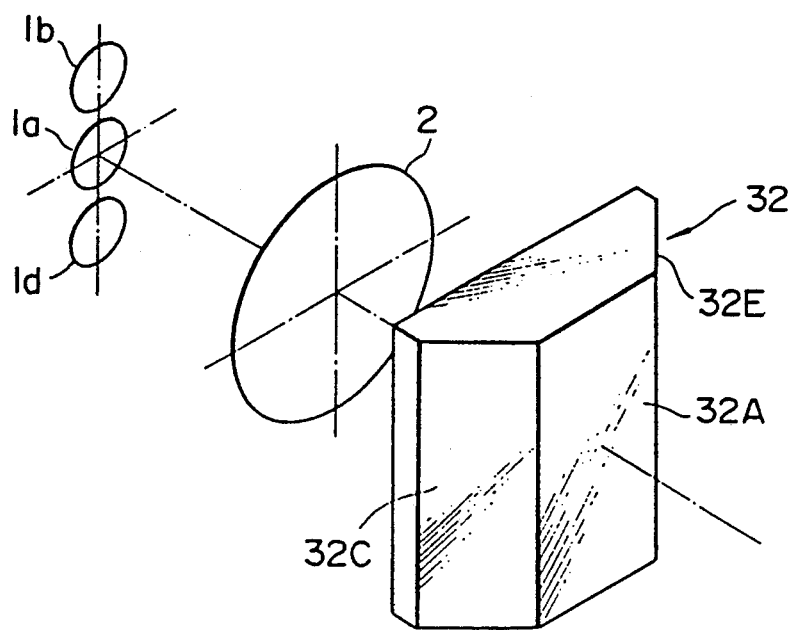
FIG. 17 shows an eighth modification of the light emitting system of the present invention.

FIG. 17 shows an eighth modification of the light emitting system of the present invention. In this modification, the three LEDs 1b, 1a, and 1d are spacedly positioned in the direction perpendicular to that of the base length, the prism 32 being disposed on the emitting side of the lens 2. The prism 32 has the vertical surface 32A and the surfaces 32C and 32E inclined with respect thereto. The surfaces 32E, 32A, and 32C are sequentially disposed in the direction parallel to the base length. In this case, three light beams are emitted from the surface 32A. Three other light beams each at an angle in the direction of the base length with respect to the former three light beams are emitted from each of the surfaces 32C and 32E. Thus, as shown in FIG. 11, nine distance measurement points are formed.

Figure 18:
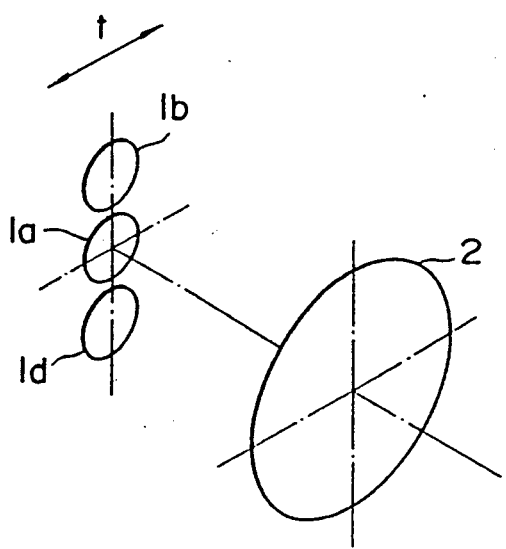
FIG. 18 shows a ninth modification of the light emitting system of the present invention.

FIG. 18 shows a ninth modification of the light emitting system of the present invention. In this modification, the prism 32 is omitted from the eighth modification shown in FIG. 17 and the three LEDs 1a, 1b, and 1d are moved in the direction of the base length. Thus, nine distance measurement points are set.

Figure 19:
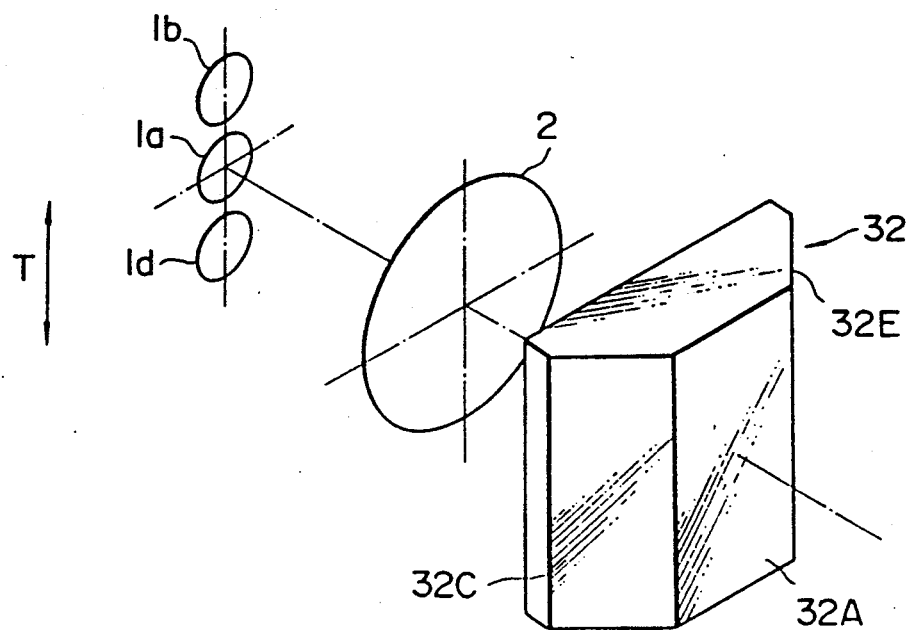
FIG. 19 shows a tenth modification of the light emitting system of the present invention.

FIG. 19 shows a tenth modification of the light emitting system of the present invention. In this modification, the three LEDs 1b, 1a, and 1d are linearly disposed in the direction perpendicular to the base length. The prism 32 has the vertical surface 32A and inclined surfaces 32C and 32E, each of which extends from surface 32A in the direction of the base length.

Figure 20:
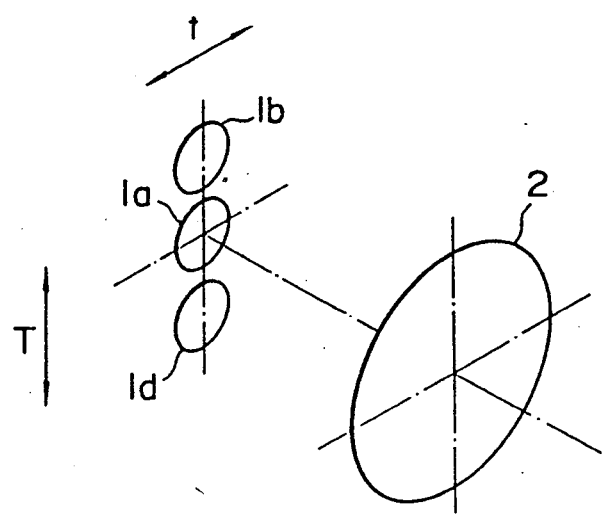
FIG. 20 shows an eleventh modification of the light emitting system of the present invention.

FIG. 20 shows an eleventh modification of the light emitting system of the present invention. In this modification, the three LEDs 1b, 1a, and 1d which are disposed in a direction perpendicular to that of the base length are electrically scanned in the direction thereof and are moved in the direction parallel to that of the base length by a predetermined distance.

Figure 21:
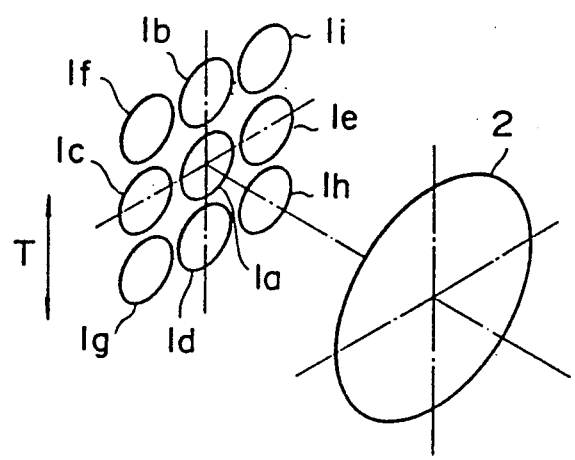
FIG. 21 shows a twelfth modification of the light emitting system of the present invention.

FIG. 21 shows a twelfth modification of the light emitting system of the present invention. In this modification, LEDs 1f through 1i are disposed at the four corners of the five LEDs 1a through 1e (see FIG. 9), namely, nine LEDs are positioned in a planar array. In this modification, three groups of three LEDs (1c, 1a, 1e), (1f, 1b, 1l), and (1g, 1d, 1h) each extending in the direction of the base length are electrically scanned in the direction perpendicular to that of the base length so that the distance measuring operations are sequentially conducted (the LEDs of each group are lighted at the same time).

Figure 22:
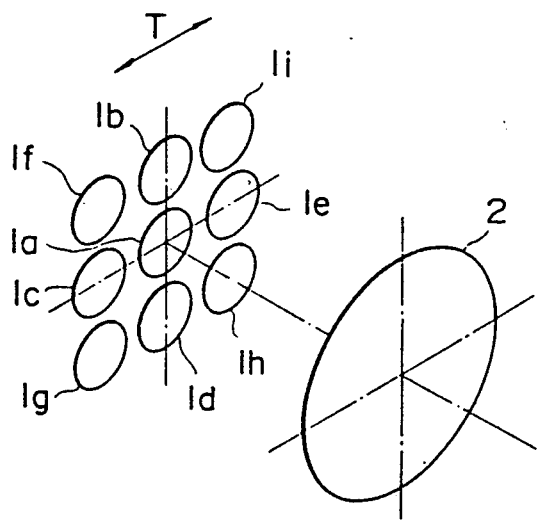
FIG. 22 shows a thirteenth modification of the light emitting system of the present invention.

FIG. 22 shows a thirteenth modification of the light emitting system of the present invention. Like the twelfth modification shown in FIG. 21, the nine LEDs 1a through 1l are disposed in a planar array. In this case, three groups of three LEDs (1f, 1c, 1g), (1b, 1a, 1d), and (1l, 1e, 1h) timesharingly emit light beams.

Figure 23:
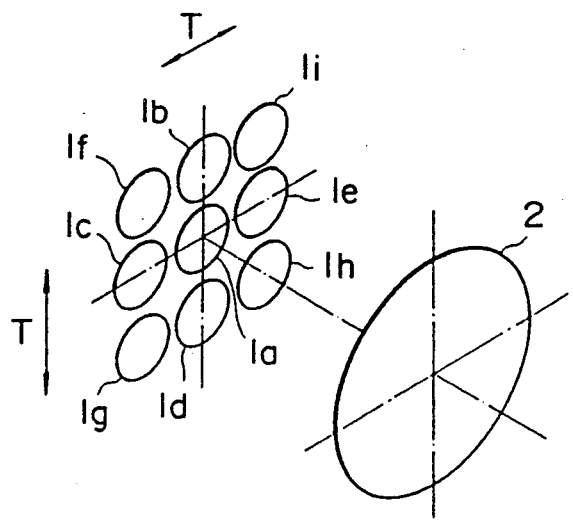
FIG. 23 shows a fourteenth modification of the light emitting system of the present invention.

FIG. 23 shows a fourteenth modification of the light emitting system of the present invention. In this modification, nine LEDs are independently operated, the nine LEDs being individually and sequentially energized in the direction parallel to the base length and also perpendicular thereto.

Figure 24A:
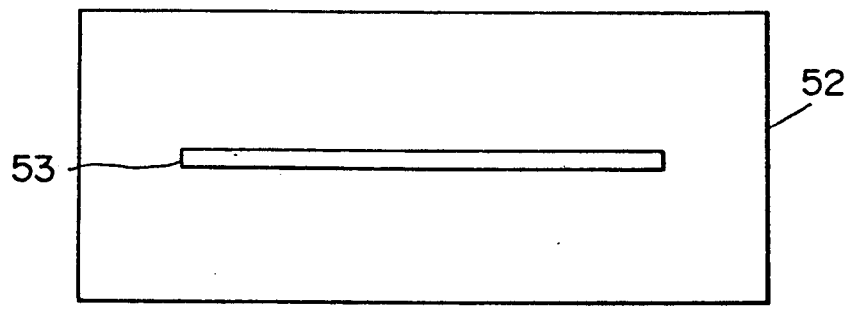
FIGS. 24a-24b show a xenon lamp and a slit as fifteenth modification of the light emitting system of the present invention.
Figure 24B:
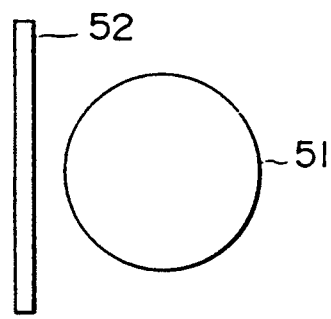

FIGS. 24(a) and 24(b) show a fifteenth modification of the light emitting system (in this embodiment, either a prism is used, or a slit moved). In this fifteenth modification, a slit plate 52 is provided having a slit 53, and a xenon lamp 51, which can be pulsed (i.e., timeshared), and is provided as the light emitting system. rather than linearly disposing a plurality of LEDs so as to emit linear light beams.

Figure 25:
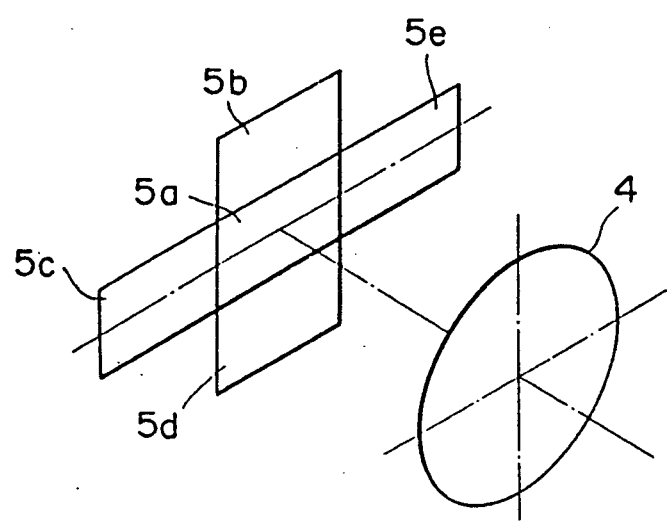
FIG. 25 shows a first modification of the light receiving system of the present invention.

FIG. 25 shows a first modification of the light receiving system of the present invention. In this modification, five PSDs 5 are provided corresponding to the light source 1 of the light emitting system shown in FIG. 9, a PSD 5a located in the center position, PSDs 5c and 5e disposed at the left and right (parallel to the base length) thereof and PSDs 5b and 5d disposed in the upper and lower positions thereof perpendicular to the base length). In other words, in this modification, the light source 1 and PSDs 5 are each two-dimensionally disposed.

Figure 26:
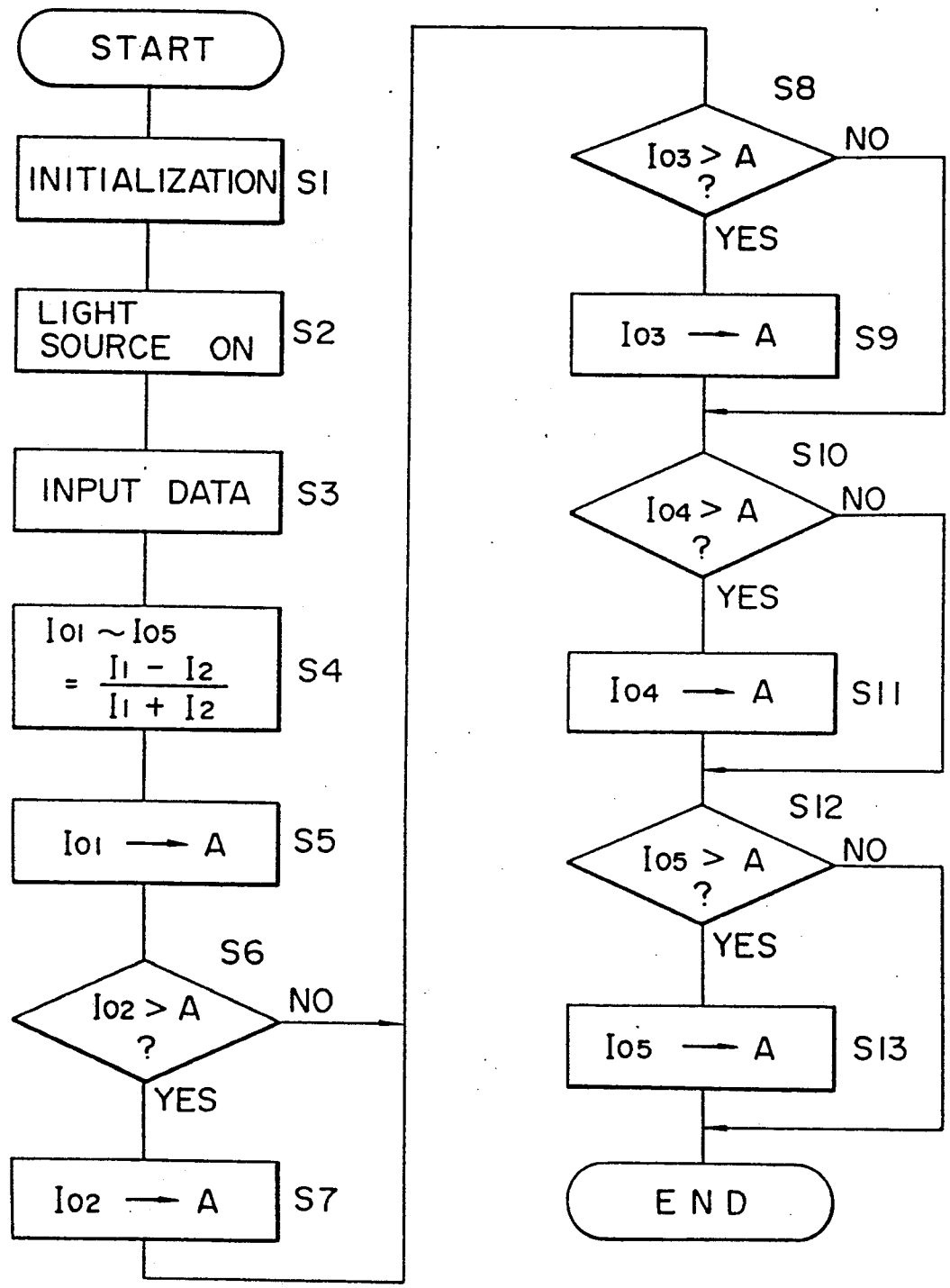
FIG. 26 shows a flowchart that illustrates the operation of the distance measuring device of the present invention.

FIG. 26 illustrates the distant measuring operations using the light source 1 and PSDs 5. The control circuit 21 firstly executes an initialization operation (in step S1). After that, it energizes the LEDs 1a through 1e to emit lights towards the lens 2 at the same time (in S2).

Thus, the LEDs 1a through 1e emit five light beams. The light beams emitted are radiated to the distance measurement points Pa through Pe via the lens.2. The five light beams reflected by the object 3 the PSDs 5a through 5e via the condenser lens 4. The control circuit 21 timesharingly reads the output data from the PSDs 5a through 5e via the A/d converter 24 and stores it in the memory 26 (in S3). In addition, the control circuit 21 computes Equation (3) wheevern each PSD outputs data to obtain $I_{01}$ through $I_{05}$ (in S4). After that, the control circuit 21 sets the value $I_{01}$ of the PSD 5a to the variable A (in S5) and compares the value $I_{02}$ of the PSD 5b with the variable A (in S6). When the value $I_{02}$ is larger than the variable A, the control circuit 21 updates the variable A to the value $I_{02}$ (in S7). When the value $I_{02}$ is smaller than the variable A, the control circuit 21 does not. Thus, the larger value is set to the variable A. Likewise, the control circuit 21 sequentially compares the value $I_{03}$ through $I_{05}$ of the PSDs 5c through 5e with the variable A and the largest value (corresponding to the distance to the nearest object) is set to the variable A (in S8 through S13).

In this manner, the control circuit 21 computes the distance to the nearest object and accordingly drives the photographing lens. When the photographing lens is moved to the proper position, the control circuit 21 activates the shutter.

For example, in FIG. 6, assuming that the person 11 is the closest to the camera; the mountain 12 is the farthest from the camera, and the tree 13 is in the middle position thereof, the control circuit 21 focuses on the person 11 and photographs him or her.

Figure 27:
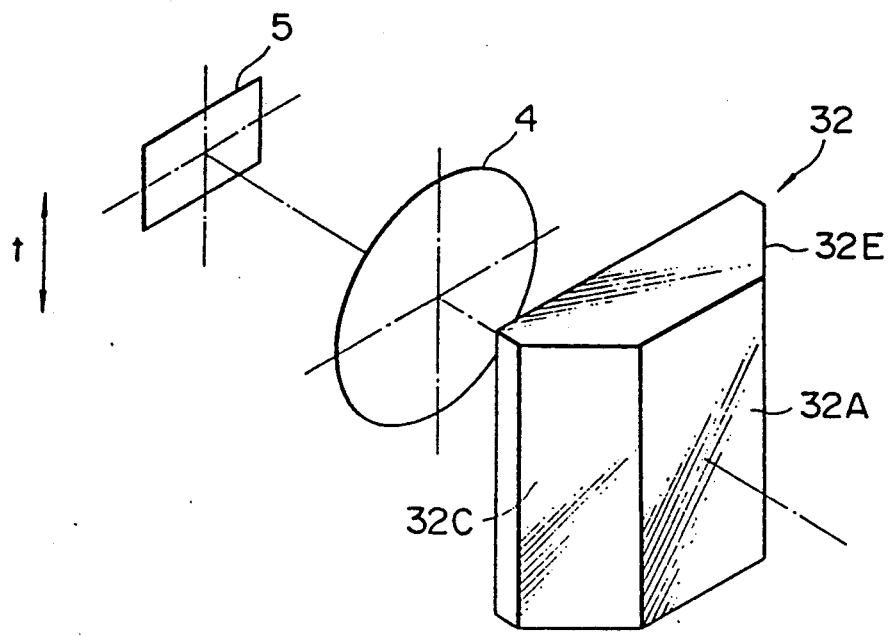
FIG. 27 shows a second modification of the light receiving system of the present invention.

FIG. 27 shows a second modification of the light receiving system of the present invention. In this modification, a prism 32 is disposed on the light receiving side of the condenser lens 4. The prism 32 has a vertical surface 32A and surfaces 32C and 32E that are inclined with respect thereto. The surfaces 32E, 32A, and 32C are sequentially disposed in the direction of the base length. Thus, the surfaces 32A, 32C, and 32E cause the reflected light beams from the three distance measurement points Pa, Pc, and Pe linearly disposed in the direction of the base length to enter the PSD 5 via the condenser lens 4. When the distance is measured using the reflected light beams from the distance measurement points Pa1, Pc1, and Pe1 or Pa2, Pc2, and Pe2 which are located on the lower positions or upper positions of the distance measurement point Pa, Pc, and Pe, and PSD 5 is mechanically moved downwardly or upwardly in the direction perpendicular to that of the base length.

Figure 28:
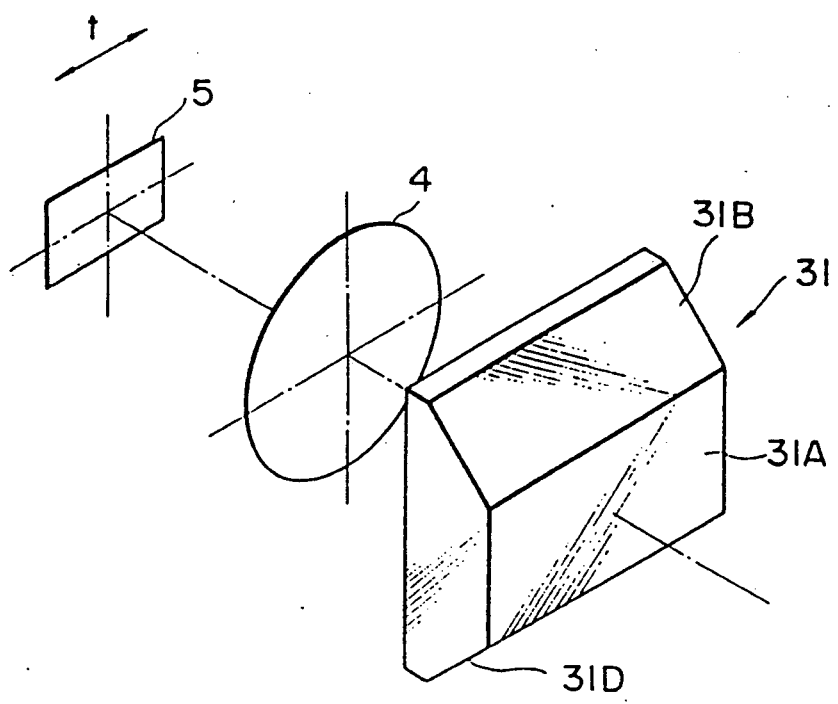
FIG. 28 shows a third modification of the light receiving system of the present invention.

FIG. 28 shows a third modification of the light receiving system of the present invention. In this modification, a prism 31 is disposed on the light receiving side of the condenser lens 4 and one PSD 5 which is moved in the direction of the base length is provided.

Figure 29:
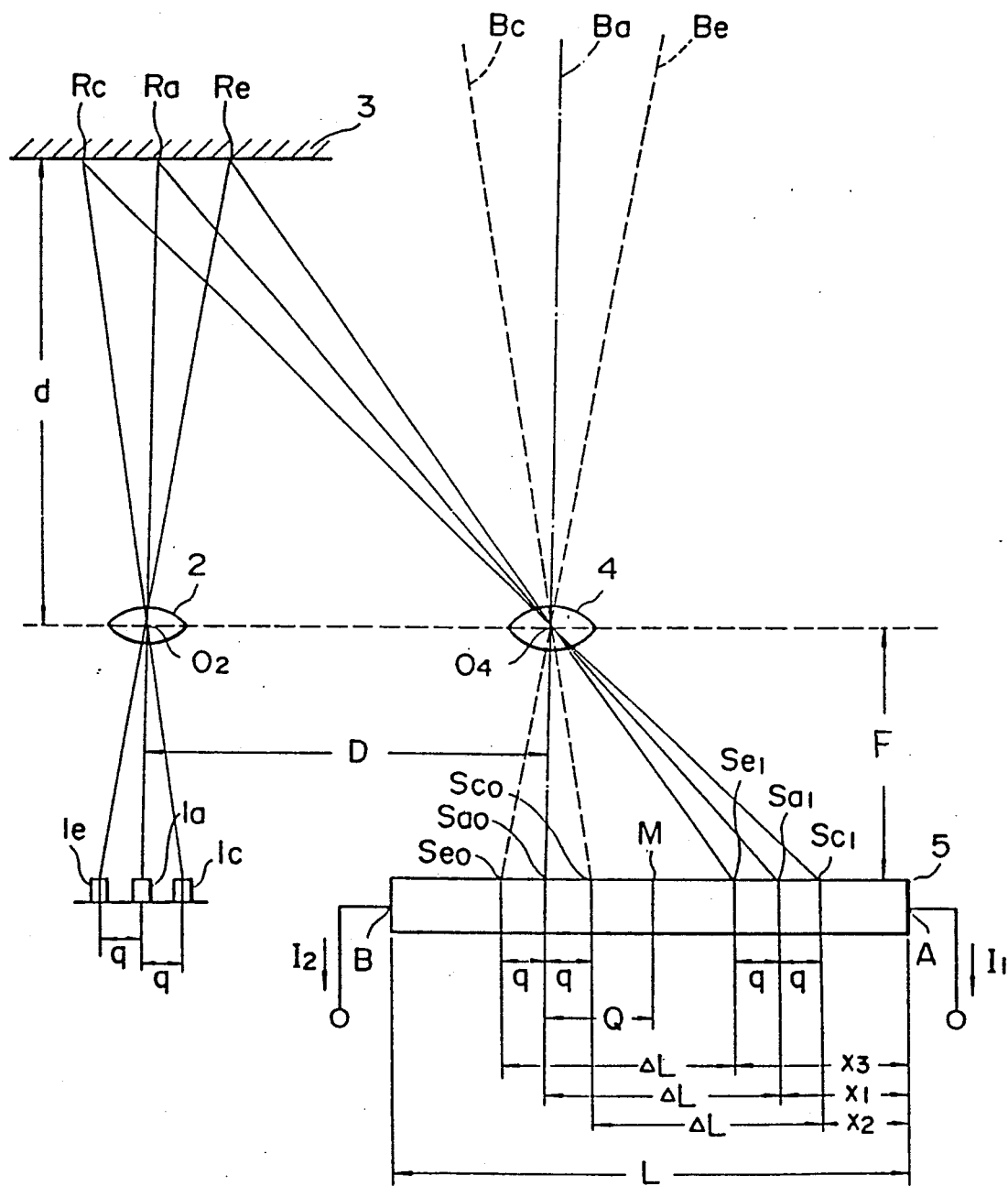
FIG. 29 illustrates the theory of the electric scanning operation.

By referring to FIG. 29, the theory of the electric scanning operation in the direction of the base length will be described. Assume that the LEDs 1e and 1c are disposed with a distance q to the LED 1a; the object 3 is located at the infinite position on the focus adjustment, the light beams emitted from the LEDs 1a, 1c, and 1e are entered into spots Sa0, Sc0, and Se0 via paths Ba, Bc, and Be; the optical axis of the condenser lens 4 is away from the center position M by distance Q; Ra, Rc, and Re are reflection points of light beams from the LEDs 1a, 1c and 1e; and Sa1, Sc1, and Se1 are receiving points on the PSD 5.

When all the reflection points Ra, Rc, and Re are on one plane away from the lens 2 by distance d, the distance between Sa0 and Sa1, that between Sc0 and Sc1, and that between Se0 and Se1 are same and equal to $\Delta L$. When the distance between the point Sa1 and the right end position A of the PSD 5, that between the point Sc1 and the position A, and that between the point Se1 and the position A are x1, x2, and x3, respectively, the following equation is satisfied.

$$x1 = L/2 - \Delta L + Q \tag{12}$$

$$x2 = L/2 - \Delta L + Q - q \tag{13}$$

$$x3 = L/2 - \Delta L + Q + q \tag{14}$$

Thus, the value Io (xi) of Equation (3) for each xi is given as follows.

$$I_0(x1) = 1 - (2/L)(x1) = 2\Delta L/L - 2Q/L \tag{15}$$

$$I_0(x2) = 1 - (2/L)(x2) = 2\Delta L/L - 2Q/L + 2q/L \tag{16}$$

$$I_0(x3) = 1 - (2/L)(x3) = 2\Delta L/L - 2Q/L - 2q/L \tag{17}$$

By using these Equations (15), (16), and (17), it is known that the values $I_0(x2)$ and $I_0(x3)$ are increased or decreased for 2q/L from $I_0(x1)$. Since the value 2q/L is determined by the distance q in the direction of the base length of each LED and the length L of the PSD 5, it is a known value. Thus, when the LEDs 1c, 1f, and 1g or the LEDs 1e, 1i, and 1h are lighted, by subtracting or adding the value 2q/L (=K) from or to the value of Equation (3), the distance d can be obtained like the same manner when the LEDs 1a, 1b, and 1d are lighted. The electric scanning in the direction in parallel with that of the base direction means the addition or subtraction of the value k for computation of the distance d.

Figure 30:
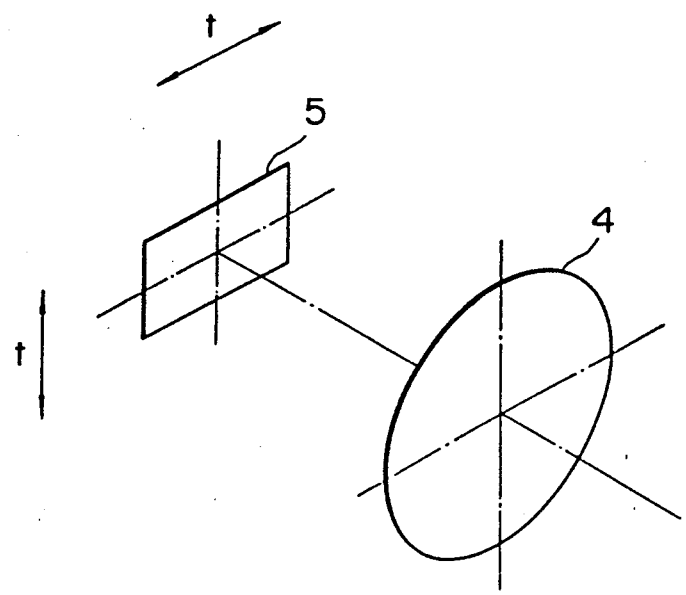
FIG. 30 shows a fourth modification of the light receiving system of the present invention.

FIG. 30 shows a fourth modification of the light receiving system of the present invention. In this fourth modification, the PSD 5 is moved in the direction perpendicular to that of the base length as well as that in parallel therewith.

Figure 31:
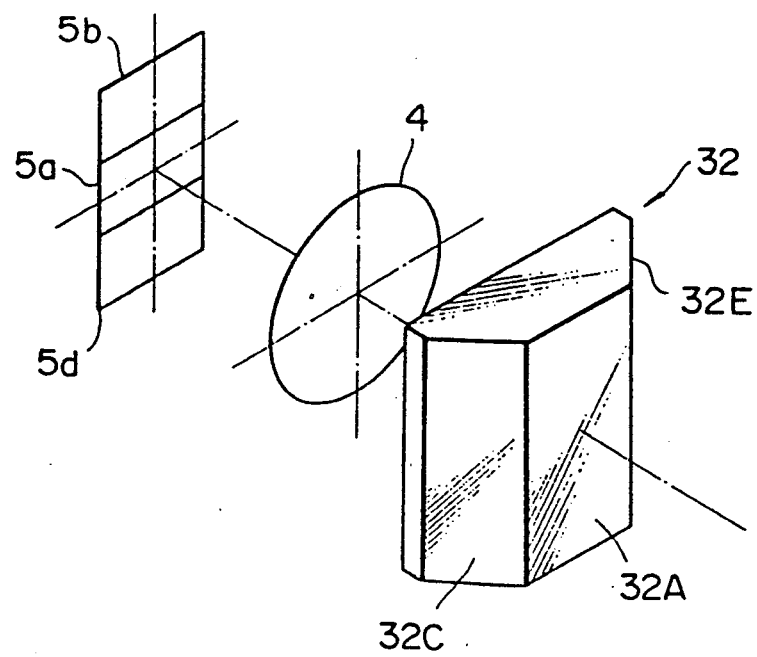
FIG. 31 shows a fifth modification of the light receiving system of the present invention.

FIG. 31 shows a fifth modification of the light receiving system of the present invention. In this modification, the PSDs 5b and 5d are disposed in the upper and lower positions of the PSD 5a. The other structure of this modification is the same as that of the second modification shown in FIG. 27. In the fifth modification, the distance measurement points Pc, Pa, and Pe; the distance measurement points Pc1, Pa1, and Pe1; and the Pc2, Pa2, and Pe2 are measured by the PSDs 5a, 5b, and 5d, respectively.

Figure 32:
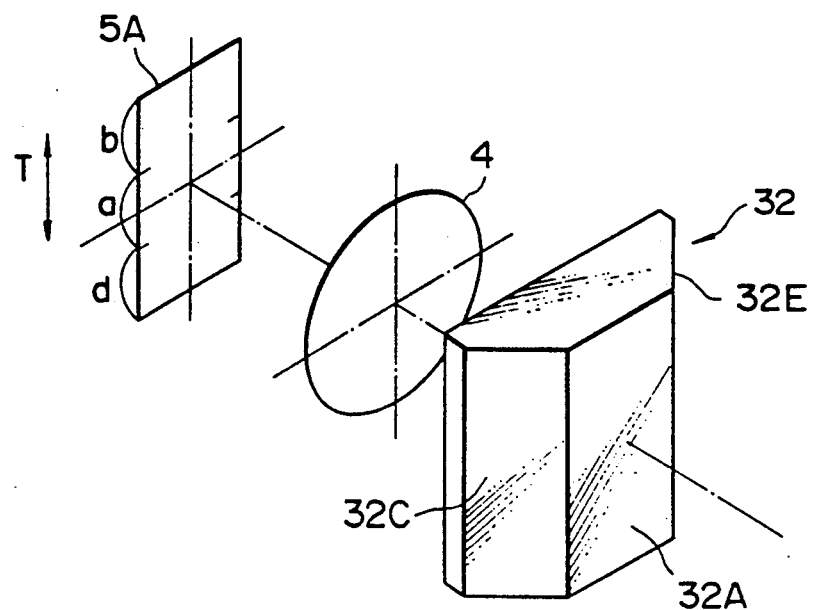
FIG. 32 shows a sixth modification of the light receiving system of the present invention.

FIG. 32 shows a sixth modification of the light receiving system of the present invention. In this modification, the PSD 5a is disposed in the direction perpendicular to that of the base length, the length of the PSD 5a being approximately three times as long as the length of that in the second modification. In other words, the three PSDs 5a, 5b, and 5d shown in FIG. 31 are replaced by one PSD. The other structure of this modification is the same as that of the second modification shown in FIG. 27. In this sixth modification, the light beam is timesharingly projected to one of three positions a, b and d of the PSD 5A.

For example, assume that the light emitting system as shown in FIG. 18 is used. When the each LED in the upper position, lower position or middle position is timesharingly lighted, the corresponding light spots on the PSD 5A are formed on the upper, lower, or middle area b, a, or d. However, although the PSD 5a for detecting a one-dimensional position detects the change of the light spot position, it cannot detect the change of the light spot position in the direction perpendicular thereto. Thus, even if the detection position upwardly or downwardly deflects, no effect takes place in the distance measurement operation. Consequently, the output of the PSD 5 is timesharingly read when a light spot is formed in the upper, lower, or middle position.

Figure 33:
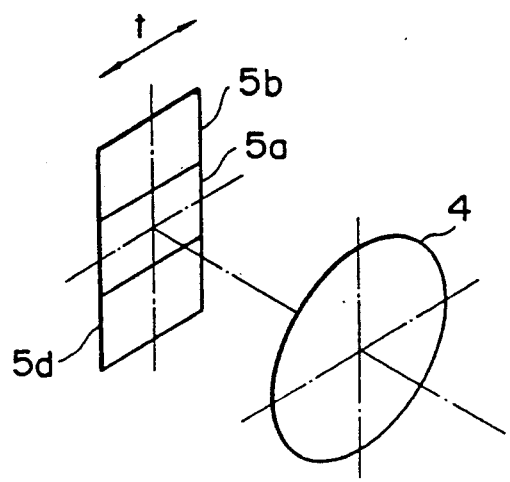
FIG. 33 shows a seventh modification of the light receiving system of the present invention.

FIG. 33 shows a seventh modification of the light receiving system of the present invention. In this modification, the prism 32 of the sixth modification shown in FIG. 32 is omitted, the PSDs 5a, 5b, and 5d being moved for a predetermined distance in the direction of the base length.

Figure 34:
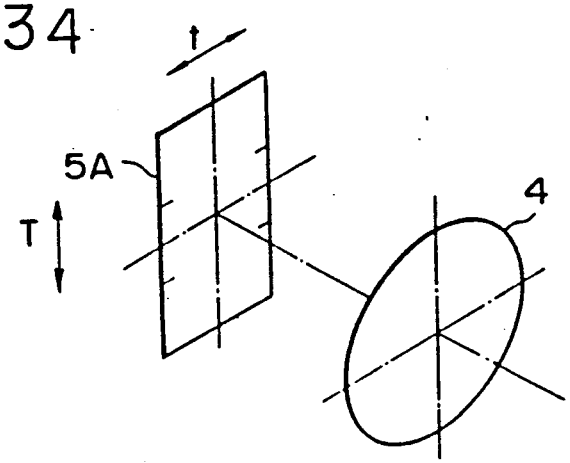
FIG. 34 shows an eighth modification of the light receiving system of the present invention.

FIG. 34 shows an eighth modification. In this modification, the PSD 5A whose length is three times that of the second modification shown in FIG. 27 both in the direction of the base length and in that perpendicular to that thereof is used. The distance is timesharingly measured in those directions with the timesharingly projected light beams.

Figure 35:
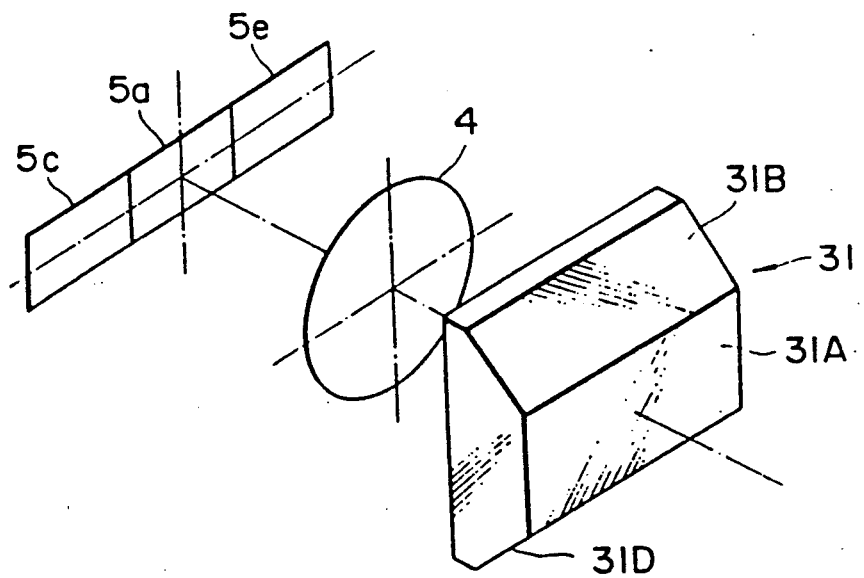
FIG. 35 shows a ninth modification of the light receiving system of the present invention.

FIG. 35 shows a ninth modification of the light receiving system of the present invention. In this modification, the prism 31 is disposed on the light receiving side of the condenser lens 4. The prism 31 has a vertical surface 31A and the surfaces 31B and 31D which are inclined thereagainst. The surfaces 31D, 31A, and 31B are sequentially disposed on the direction perpendicular to that of the base length. The PSD 5c and 5e are disposed at the left and right of the PSD 5a which is located at the center. In this embodiment, reflected light beams are entered from the distance measurement points Pa, Pc, and Pe to the surface 31A; reflected light beams are entered from the distance measurement points Pa1, Pc1, and Pe1 to the surface 31B; reflected light beams are entered from the distance measurement points Pa2, Pc2, and Pe2 to the surface 31D. Reflected light beams are entered from the distance measurement points Pa, Pa1, and Pa2 to the PSD 5a; the light beams are entered from the distance measurement points Pc, Pc1, and Pc2 to the PSD 5c; the light beams are entered from the distance measurement points Pe, Pe1, and Pe2 to the PSD 5e.

Figure 36:
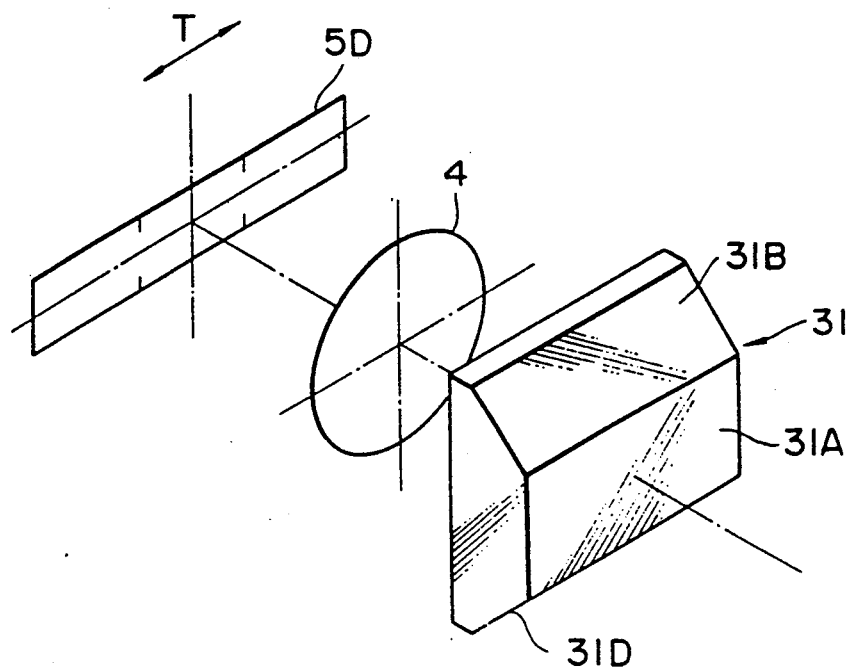
FIG. 36 shows a tenth modification of the light receiving system of the present invention.

FIG. 36 shows a tenth modification of the light receiving system. In this embodiment, the PSD 5D is disposed in the direction of the base length, the length of the PSD 5D being three times as long as that shown in FIG. 28. Light beams are sequentially and timesharingly entered from the distance measurement points (Pa, Pa1, Pa2), (Pc, Pc1, Pc2), and (Pe, Pe1, Pe2) to the PSD 5D and the output of each set is sequentially processed. In other words, the PSD 5D is electrically scanned in the direction of the base length.

Figure 37:
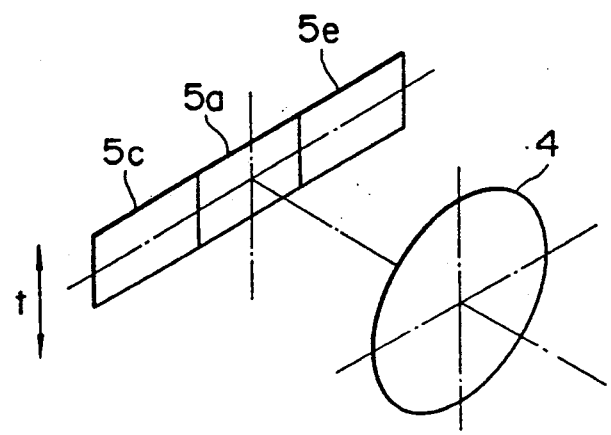
FIG. 37 shows an eleventh modification of the light receiving system of the present invention.

FIG. 37 shows an eleventh modification of the light receiving system of the present invention. In this embodiment, the prism 31 is omitted from the ninth modification shown in FIG. 36, the PSDs 5a, 5c, and 5e are vertically moved at the same time in a direction to the base length.

Figure 38:
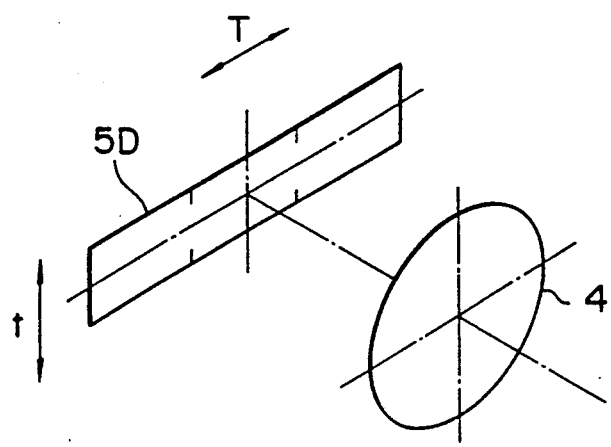
FIG. 38 shows a twelfth modification of the light receiving system of the present invention.

FIG. 38 shows a twelfth modification of the light receiving system of the present invention. In this modification, the prism 31 of the tenth modification is omitted, the PSD 5D being moved in a direction perpendicular to the base length and the light beams are timesharingly entered to the PSD 5D in a direction parallel thereto.

Figure 39:
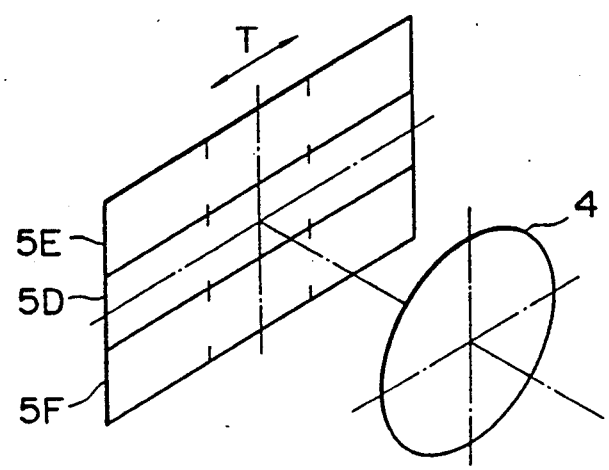
FIG. 39 shows a thirteenth modification of the light receiving system of the present invention.

FIG. 39 shows a thirteenth modification of the light receiving system of the present invention. In this modification, the prism 31 of the tenth modification shown in FIG. 36 is omitted, the PSDs 5E and 5F which are same as the PSD 5D in structure are disposed in the upper and lower positions thereof. The light beams are timsharingly entered to PSDs 5D, 5E and 5F in the direction of the base length.

Figure 40:
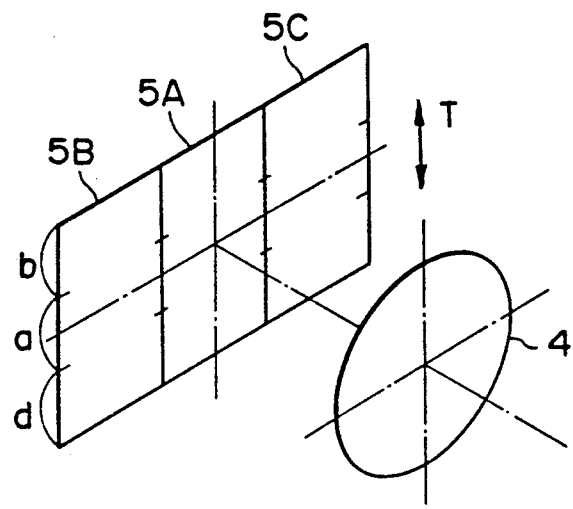
FIG. 40 shows a fourteenth modification of the light receiving system of the present invention.

FIG. 40 shows a fourteenth modification of the light receiving system of the present invention. In this modification, the PSDs 5B and 5C are disposed on the left and right of the PSD 5a shown in FIG. 32, the structure of the former being the same as that of the later, the prism 32 being omitted. In this embodiment, the reflected light beams from the distance measurement points Pa, Pa1, and Pa2 are received by the PSD 5A; from the distance measurement points Pc, Pc1, and Pc2 are received by the PSD 5B; from the distance measurement points Pe, Pe1, and Pe2 are received by the PSD 5C.

Figure 41:
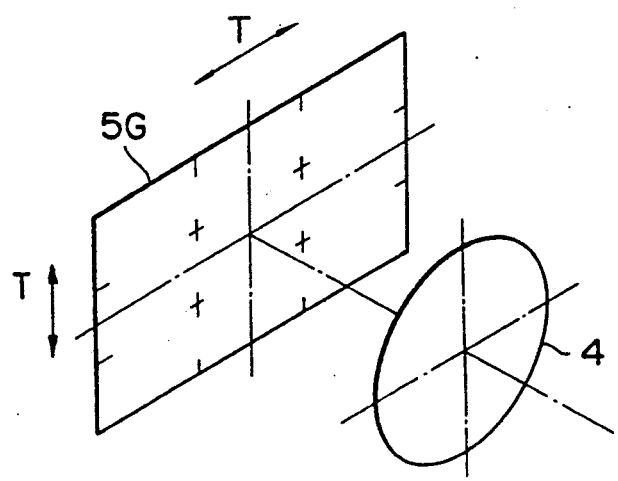
FIG. 41 shows a fifteenth modification of the light receiving system of the present invention.

FIG. 41 shows a fifteenth modification of the light receiving system of the present invention. In this modification, the three PSDs 5D, 5E, and 5F of the fourteenth modification shown in FIG. 39 are substituted with one PSD 5G. Thus, in this fifteenth modification, the light beams from the distance measurement points are timesharingly projected to the PSD 5G one at a time in the direction of the base length and in the direction perpendicular thereto.

By referring to the accompanying flowcharts, some distance measuring operations conducted by combinations of a particular light emitting system and a light receiving system described above will be described in the following.

Figure 42:
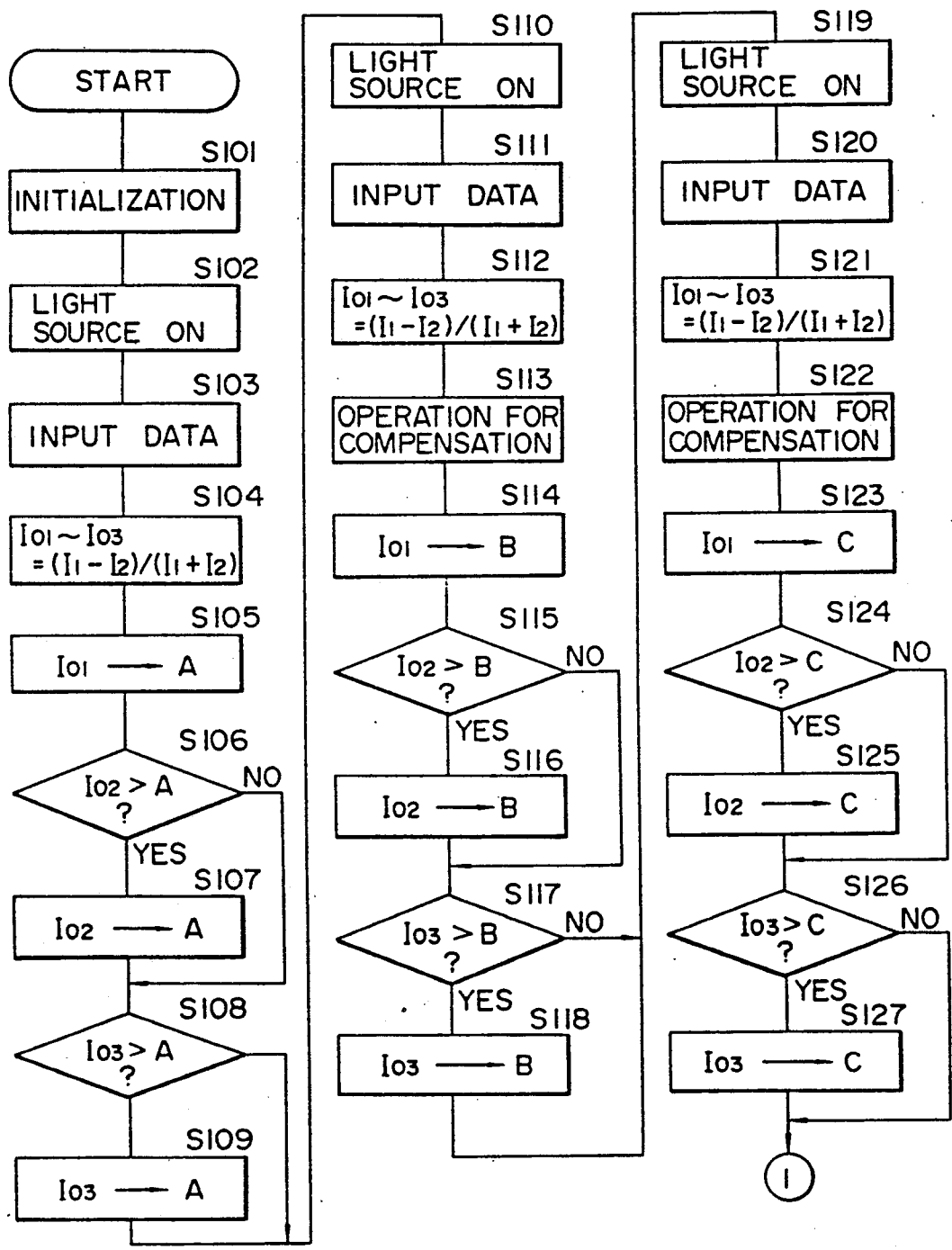
FIGS. 42 and 43 are flowcharts of the combination of the light emitting system of FIG. 22 and the light receiving system of FIG. 40.
Figure 43:
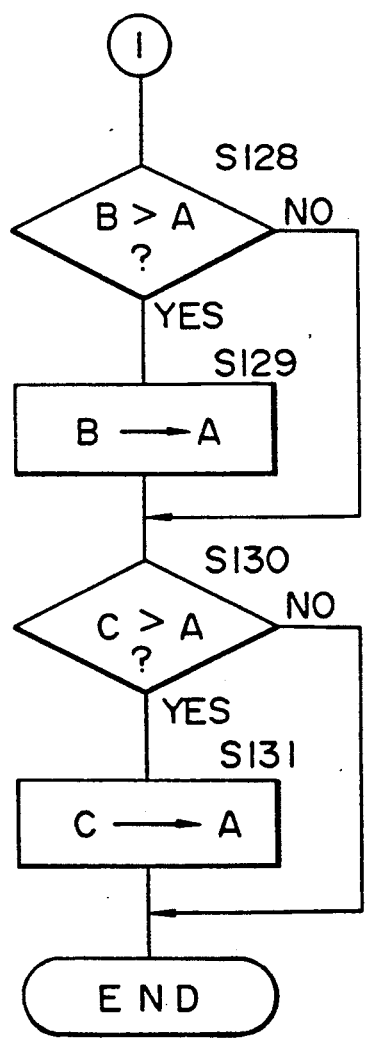

FIG. 42 and 43 show flowcharts of the combination of the light emitting system shown in FIG. 22 and the light receiving system shown in FIG. 40. The control circuit 21 firstly executes an initialize process (in step S101) and then controls the actuating circuit 23 to energize the first set LEDs 1b, 1a, and 1d (in S102). Thus, light beams are emitted to the object 3 via the lens 2. The light beams from the distance measurement points Pa1, Pa, and Pa2 are entered into the PSDs 5E, 5D, and 5F via the condenser lens 4. The output data from each PSD is A/D-converted by the A/D converter 24 and then inputted to the control circuit 21 (in S103). The control circuit 21 computes the outputs from the PSDs 5D, 5E, and 5F using Equation (3) and obtains $I_{01}$, $I_{02}$, and $I_{03}$ (in S104). The control circuit 21 sets the value $I_{01}$ to the variable A (in S105) and compares the variable A with the value $I_{02}$ (in S106). When the value $I_{02}$ is larger than the variable A, the control circuit 21 updates the variable A with the value $I_{02}$ (in S107). Then, the control circuit 21 compares the variable A with the value $I_{03}$ (in S108). When the value $I_{03}$ is larger than the variable A, the control circuit 21 updates the variable A (in S109). In the manner described above, the control circuit 21 sets the largest value (the least distance d) to the variable A.

Then, the LEDs 1f, 1c, and 1g (in S110) are energized and data from the PSDs 5D, 5E, and 5F (in S111) are inputted. After that, the control circuit 21 computes the values $I_{01}$, $I_{02}$, and $I_{03}$ according to the output of each PSD (in S112). In this case, since the LEDs 1a, 1c, and 1g are away from the LEDs 1b, 1a, and 1d for the distance q, the value k (=2 q/L) is subtracted from the values $I_{01}$, $I_{02}$, and $I_{03}$ for the compensation (in S113). After that, as described above, the control circuit 21 obtains the largest value from the values $I_{01}$, $I_{02}$, and $I_{03}$ and sets the largest value to the variable B (in S114 through S118).

After that, the LEDs 1*i*, 1*e*, and 1*h* are energized in step S119 and the data is read out in step S120. After computing the values $I_{01}$, $I_{02}$, and $I_{03}$ (in S121), the control circuit 21 executes the compensation process (in S122). Since the LEDs 1*i*, 1*e*, and 1*h* are away from LEDs 1*b*, 1*a*, and 1*d* in the reverse direction of the LEDs 1*f*, 1*c*, and 1*g* for q, the value k is added. In addition, the maximum one of the values $I_{01}$, $I_{02}$, and $I_{03}$ is set to the variable C (in S123 through S127).

Then, the control circuit 21 compares the variables A, B, and C and sets the largest value to the variable A (in S128 through S151). The control circuit 21 controls the lens drive device 25 according to the variable A obtained in this manner.

Figure 44:
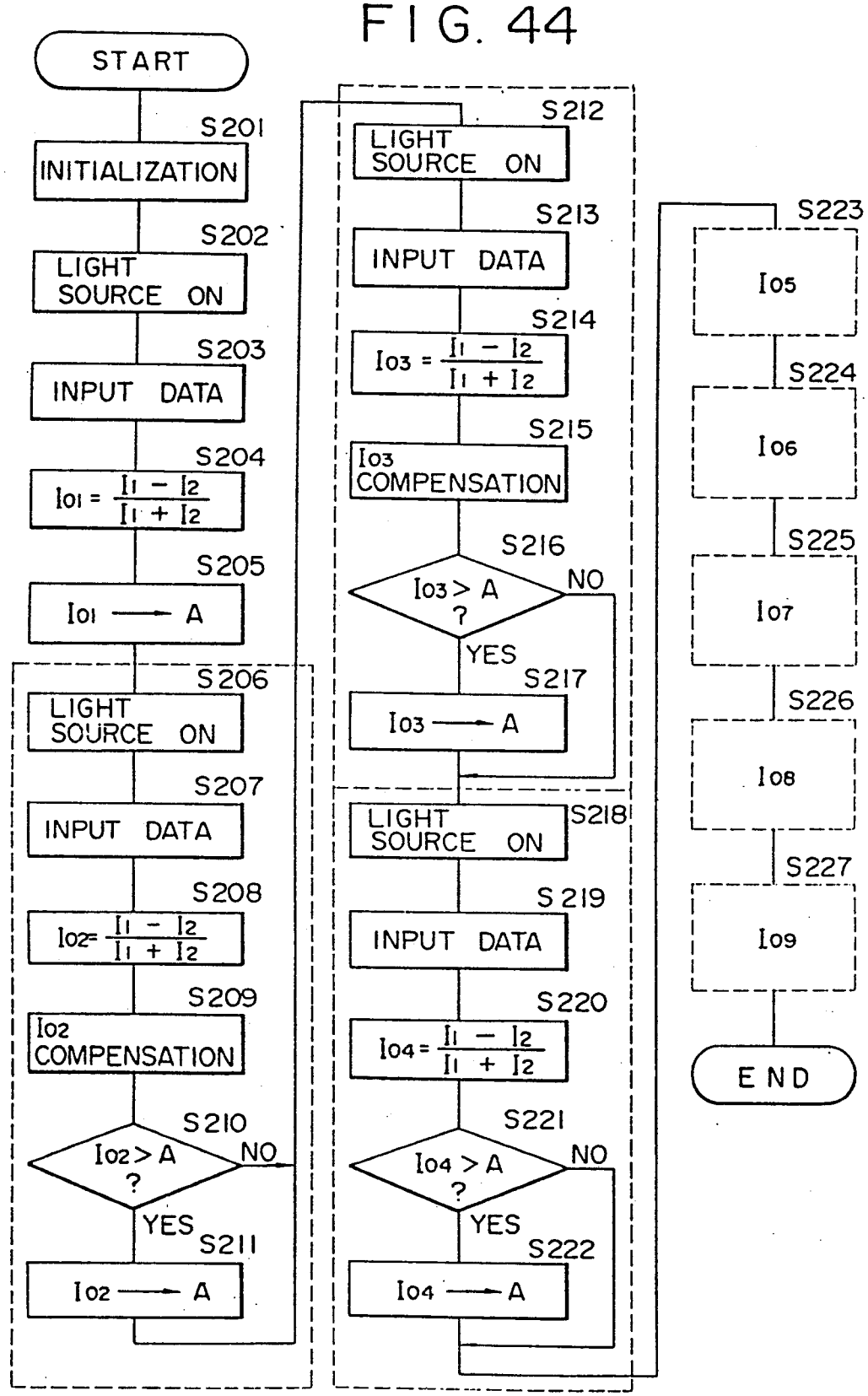
FIG. 44 is a flowchart of the combination of the light emitting system of FIG. 23 and the light receiving system of FIG. 41.

FIG. 44 is a flowchart of the combination of the light emitting system shown in FIG. 23 and the light receiving system shown in FIG. 41. After the control circuit 21 executes the initialize operation (in S201), the LED 1*a* is energized S202. In step S203, the data that the PSD 5G outputs is read out and the value $I_{01}$ is computed (in S204). In step S205, the value $I_{01}$ is set to the variable A.

Then, for example, the LED 1*c* is energized (in S206) and data is read out (in S207). The value $I_{02}$ is computed using the data being read (in 208) and the value k is subtracted from the resultant value $I_{01}$, $I_{02}$, and $I_{03}$ for the compensation (in S209). Then the value $I_{02}$ is compared with the variable A and the larger value is set to the variable A (in S210 and S211).

After that, the LED 1*e* is energized (in S212), the data is read out (in S213), and the value $I_{03}$ is computed in step S214. After that, the compensation is executed by adding the value k to the resultant value in step S215 and the larger one of the value $I_{03}$ and the variable A is set to the variable A (in S216 and S217).

Then, the LED 1*b* is energized in step S217, the data is read out (in S219), the value $I_{04}$ is computed (in S220), and the resultant value is compared with the variable A (in S221 and S222).

Figure 45:
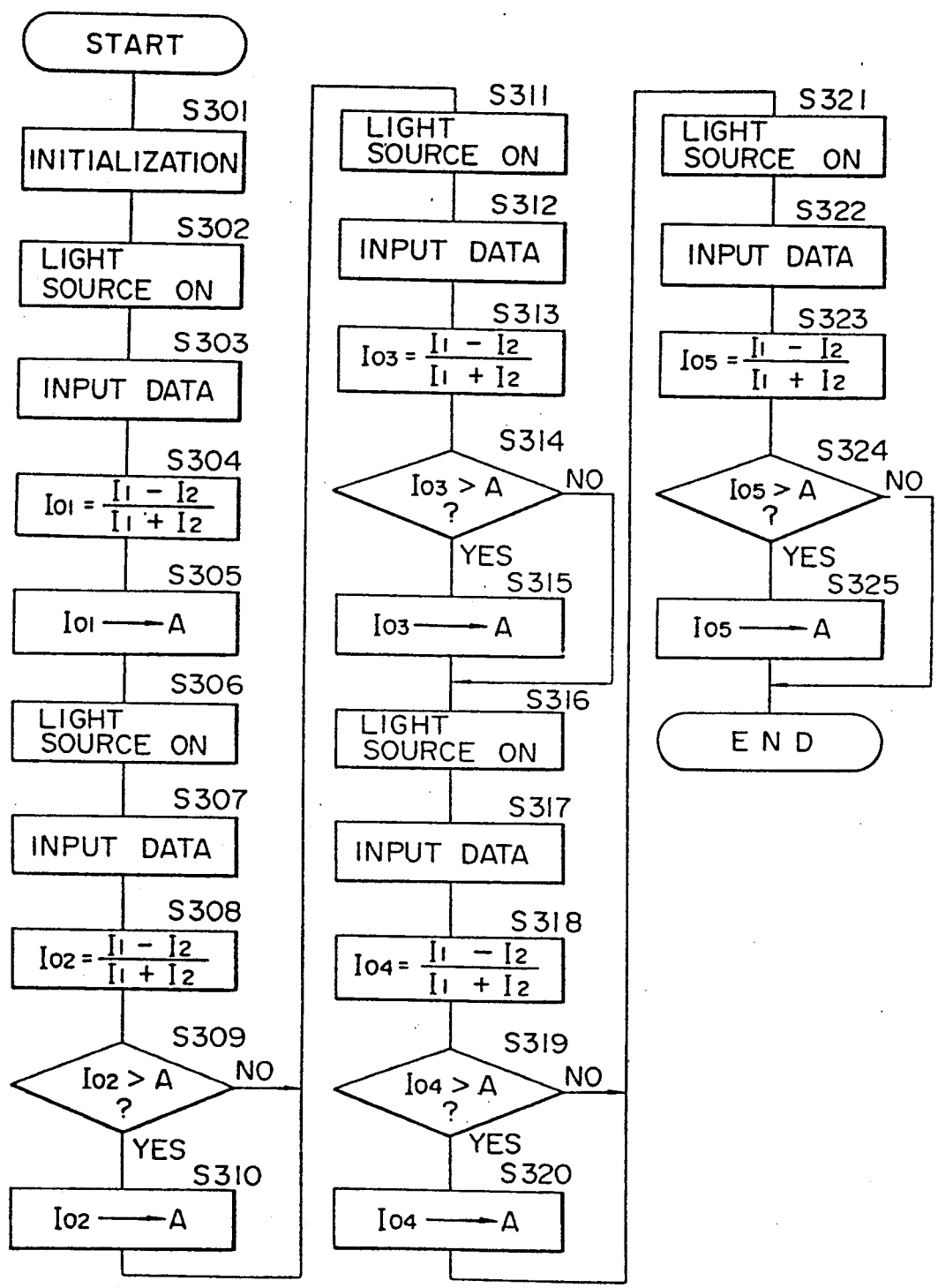
FIG. 45 is a flowchart of the combination of the light emitting system of FIG. 23 and the light receiving system of FIG. 8.

Likewisely, the LEDs 1*f*, 1*i*, 1*d*, 1*g*, and 1*h* are sequentially energized in the order and the same operations repeatedly executed in steps S223 through S227. The operations corresponding to the LED 1*d* is the same procedure of the operation corresponding to the LED 1*b* shown in steps S218 through S222; the operation corresponding to the LEDs 1*f* and 1*g* is as shown in steps S206 through S211 which is the operation corresponding to the LED 1*c*; the operation corresponding to the LEDs 1*i* and 1*h* are the same procedure as that corresponding to the LED 1*e* shown in steps S212 through S217;

FIG. 45 is a flowchart of the combination of the light emitting system shown in FIG. 23 and the light receiving system shown in FIG. 40.

After the control circuit 21 executes the initialize process (in S301), the LED 1*a* is energized (in S302). The light beam emitted from the LED 1*a* is radiated to the distance measurement point Pa of the object 3 via the lens 2. The reflected light beam is entered from the surface 7A of the prism 7 and then entered into the PSD 5 via the condenser lens 4. After that, the data being outputted from the PSD 5, the value $I_{01}$ is computed (in S304), and the resultant value is set to the variable A (in S305).

Then, the LED 1*c* is energized in step S306. The reflected light beams form the distance measurement point Pc is entered from the surface 7C of the prism 7 and then entered into the PSD 5 via the condenser lens 4. The output value of the PSD 5 is inputted (in S307) and the value $I_{02}$ is computed (in S308). After that, the value $I_{02}$ is compared with the variable A and the larger one of the value $I_{02}$ and the variable A is set to the variable A (in S309 and S310).

Likewise, the LEDs 1*e*, 1*b*, and 1*d* are sequentially energized and the same processes are repeatedly executed (in S311 through S325). In this case, the light beams from the LEDs 1*e*, 1*b*, and 1*d* are reflected by the object and the reflected light beams are entered from the surfaces 7E, 7B, and 7D of the prism 7, respectively. Since the received light beams are refracted on the surfaces 7B through 7E, when the distance between the measuring point and each of the LEDs 1*e*, 1*b*, and 1*d* is the same, the reflected light beams are entered into the same position as the surface 7A. Thus, in this case, the compensation process of the value is not required.

Figure 46:
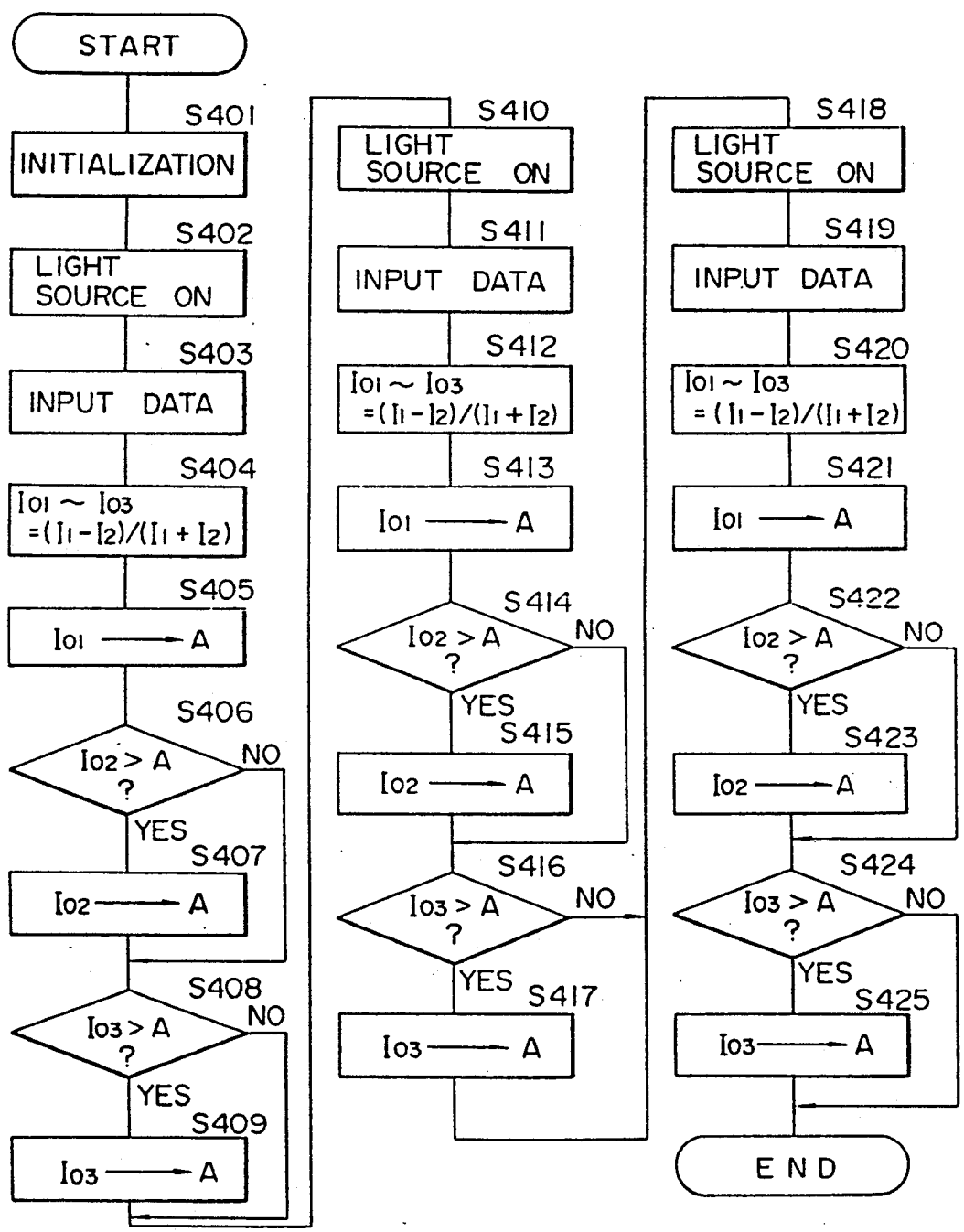
FIG. 46 shows a flowchart of the combination of the light emitting system of FIG. 21 and the light receiving system of FIG. 40.

FIG. 46 shows a flowchart of the combination of the light emitting system shown in FIG. 21 and the light receiving system shown in FIG. 40.

After the control circuit 21 executes the initialize process in (S401), the LEDs 1*c*, 1*a*, and 1*e* are energized at the same time (in S402). The light beams emitted from the LEDs 1*c*, 1*a*, and 1*e* and then reflected by the objects 3 are entered into the PSDs 5B, 5A, and 5C, respectively. The control circuit 21 computes the values $I_{01}$, $I_{02}$, and $I_{03}$ according to the output vlues of the PSDs 5A, 5B, and 5C (in S404). The values $I_{01}$, $I_{02}$, and $I_{03}$ are compared and the largest one of them is set to the variable A (in S405 through S409).

Likewise, the group of the LEDs 1*f*, 1*b*, and 1*i*, and the group of the LEDs 1*g*, 1*d*, and 1*h* are sequentially energized and executes the same processes as described above (in S410 through S425). In this manner, the largest one of the nine values is set to the variable A.

The number of distance measurement points can be changed by using a variously shaped prism or by using a plurality of prisms whose shape is the same or different. Besides the prism, it is also possible to use another optical element such as diffraction grating.

Although in the above modifications PSD is used as a light receiving element, it is also possible to use a charge coupled device and the like.

Figure 47:
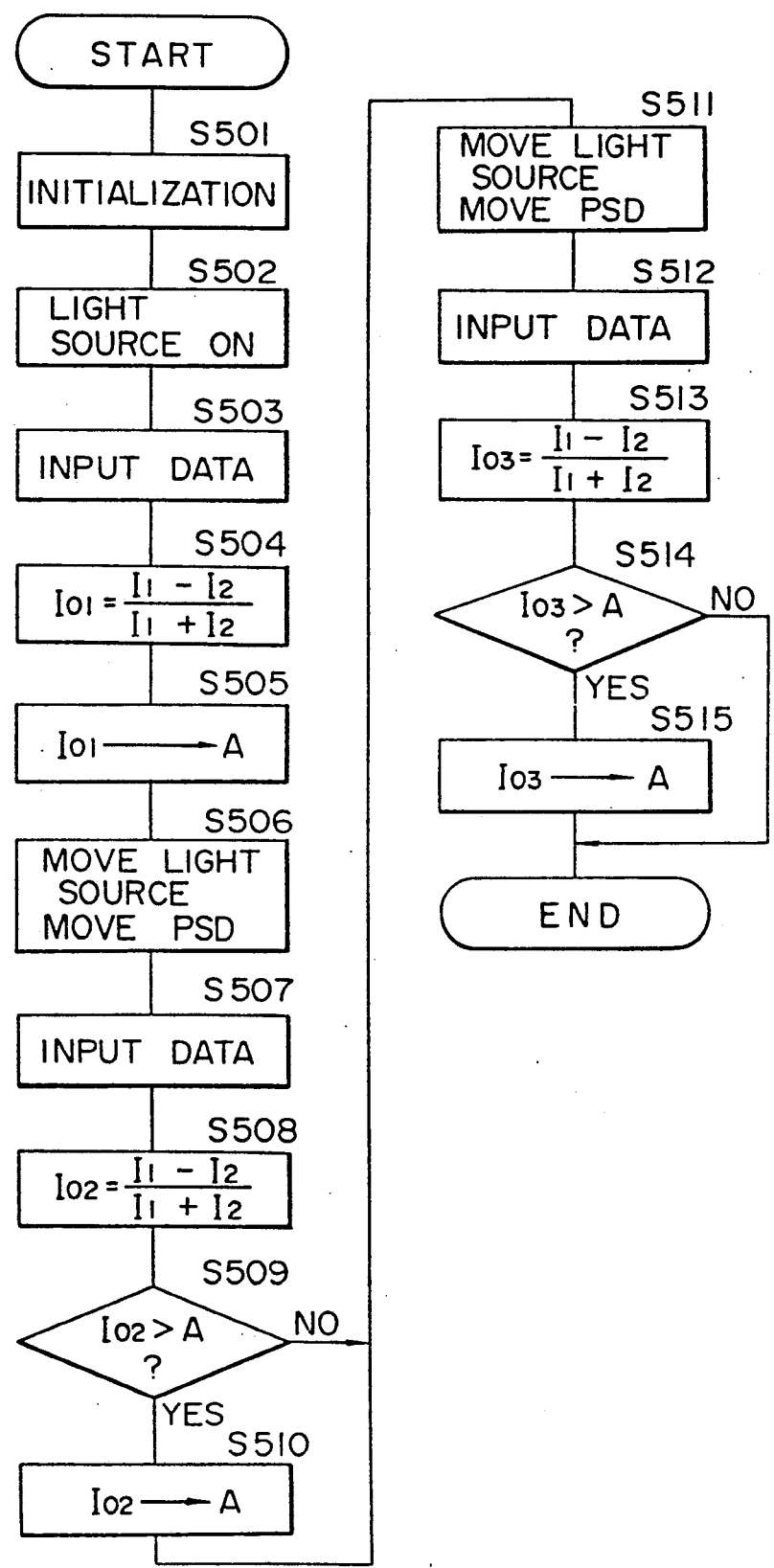
FIG. 47 is a flowchart of the combination of the light emitting system of FIG. 10 and the light receiving system of FIG. 28.

FIG. 47 shows a flowchart of the combination of the light emitting system shown in FIG. 10 and the light receiving system shown in FIG. 28.

The control circuit 21 firstly executes the initialize process (in S501) and the light source 1 is then energized (in S502). The light beam which is emitted from the light source 1 is entered into the prism 31 via the lens 2 and separated into three light beams. The separated light beams are radiated to the distance measurement points Pa, Pb, and Pd of the object 3. The reflected light beams from the distance measurement points Pa, Pb, and Pd are entered into the surfaces 31A, 31B, and 31D of the prism 31 and then entered into the PSD 5 via the condenser lens 4. The output value of the PSD 5 is inputted to the control circuit 21 via the A/D converter 24 (in S503). The control circuit 21 computes the input data using Equation (3) and obtains the value $I_{01}$ (in S504). After that, the control circuit 21 sets the value to the variable A (in S505).

Then, the motor 28 is driven by a driving circuit 27 so as to move the light source 1 to the left shown in FIG. 10 for a predetermined distance where the light source 1 is to be energized (in S506). At this time, the PSD 5 is also leftwardly moved along with the light source 1. Thus, the light beams are radiated to the distance measurement points Pa1, Pb1, and Pd1 and the reflected light beams are entered into the PSD 5. The output value of the PSD 5 is read out and the value $I_{02}$ is computed (in S507 and S508). After that, the value $I_{02}$ is compared with the variable A and the larger one of them is set to the variable A (in S509 and S510).

After that, the control circuit 21 moves the light source 1 in the reverse direction, the data is read out, and the value $I_{03}$ is computed (in S511, S512, and S513). The value $I_{03}$ is compared with the variable A and the larger one of the values is set to the variable A (S514 and S515). In this manner, the largest value is set to the variable A (the nearest distance d). According to this value, the control circuit 21 executes the focus control.

A mechanism for moving either or both the light emitting system and the light receiving system will be described in the following.

Figure 48:
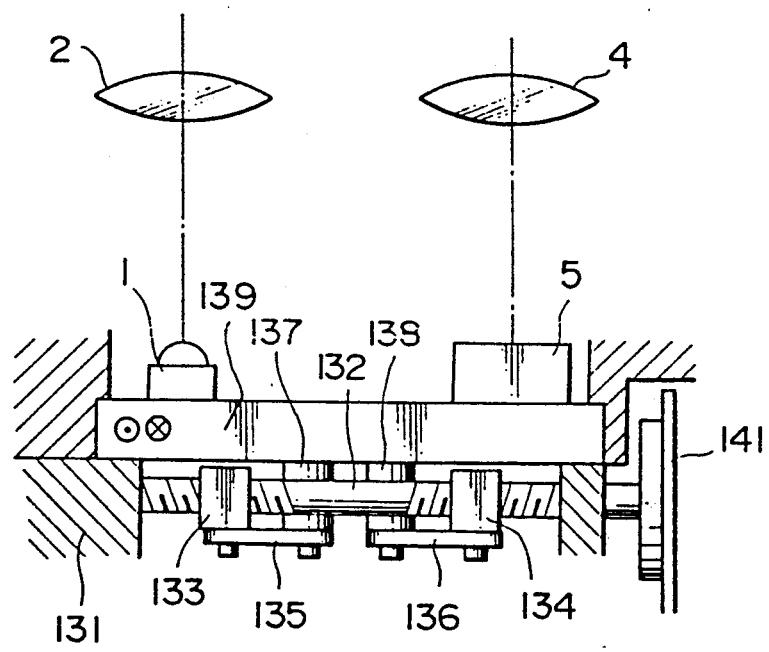
FIGS. 48 and 49 show a third embodiment of the distance measuring device according to the present invention.
Figure 49:
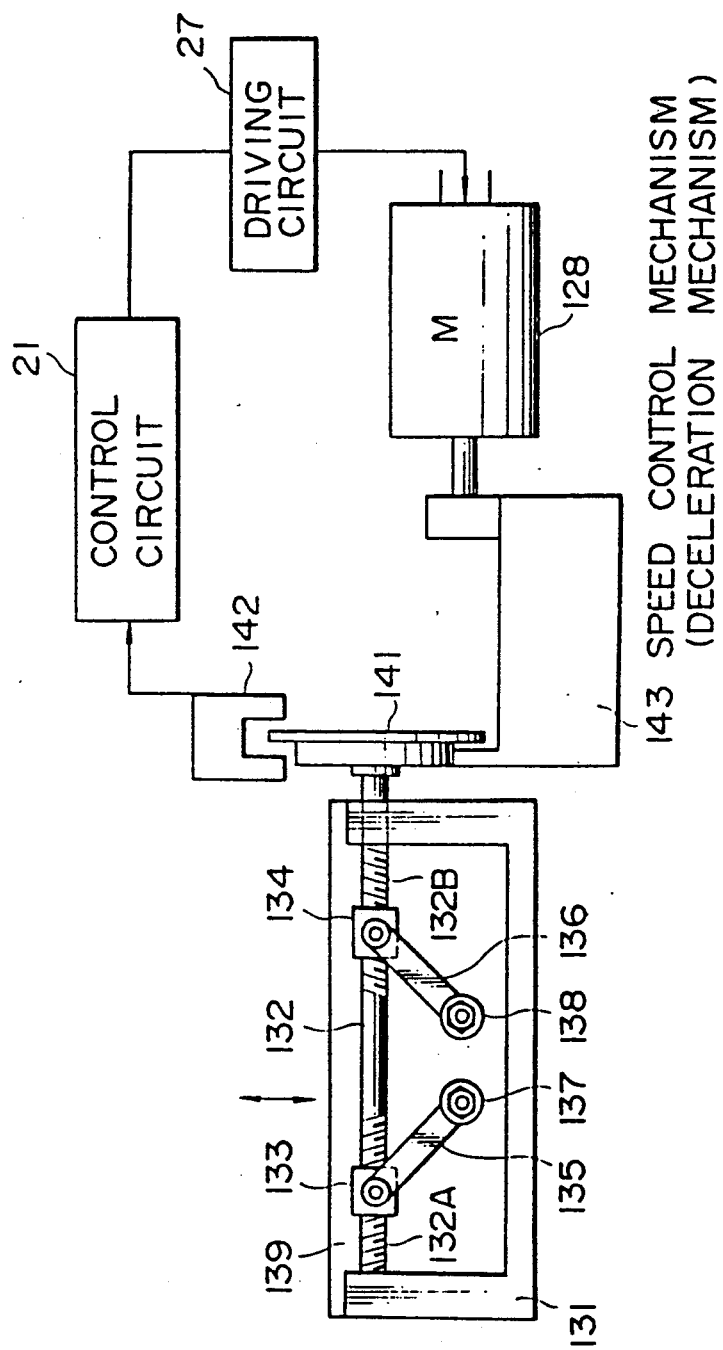
Figure 50A:
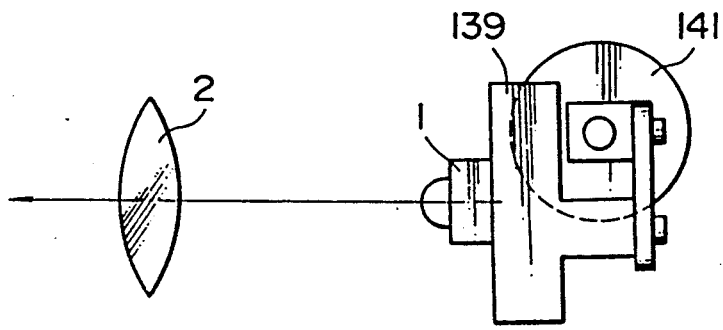
FIGS. 50a-50c illustrates the directions of the beam of light of the third embodiment of FIGS. 48 and 49.

FIGS. 48 and 49 show a third embodiment of the distance measuring device according to the present invention. On a fixing plate 131, a rod shaped screw 132 is rotatably supported, the screw 132 being engaged with nuts 133 and 134. These nuts 133 and 134 are connected to extruded portions 137 and 138 on a base plate 139 via links 136. The light source 1 and the PSD 5 are mounted on the base plate 139. A gear 141 is engaged with the screw 132, the gear 141 being driven by a motor 128 by way of a speed adjustment mechanism 143. 142 is a detecting section for detecting the rotational position of the gear 141. In the initial state, the nuts 133 and 134 are placed in the positions shown in FIG. 48. At this time, the optical path of the light source 1 accords with that of the light emitting lens 2. In addition, the condenser lens 4 is placed such that the optical axis of the condenser lens 4 passes a predetermined reference position (for example, at the center) of the PSD 5. Thus, as shown in FIG. 50(a), the light source 1 is opposed to the lens 2. In this state, for example, the distance measurement point Pa at the center of FIG. 11 is measured.

When the control circuit 21 controls the drive circuit 27 to cause the motor 128 to rotate, for example, in the clockwise direction, the gear 141 is rotated in the counterclockwise direction via the speed adjustment mechanism 143, and the screw 132 is also rotated in the counterclockwise direction. Since the nut 133 is thread engaged with a right side screw 132A of the screw 132 and the nut 134 is engaged with a left side screw 132B of the screw 132, the nuts 133 and 134 are moved in the left direction and right direction shown in FIGS. 48 and 49, respectively.

Figure 50B:
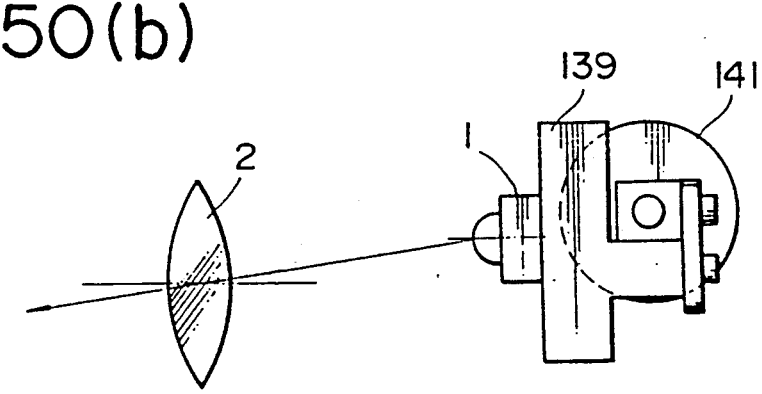

Since the nuts 133 and 134 are moved so that they are mutually separated, the extruded portions 137 and 138 (namely, the base plate 139) connected to the nuts 133 and 134 via the link 136 are moved in the upper direction as shown in FIG. 49 (in the upper direction perpendicular to the drawing surface in FIG. 48). At this time, the base plate 139 is guided by the fixing plate 131. The control circuit 21 monitors the output of the detecting section 142. When the gear 141 rotates to a predetermined position (namely, when the base plate 139 moves to the predetermined position), the control circuit 21 controls the driving circuit 27 to stop rotating the motor 128. In this manner, as shown in FIG. 50(b), the light source 1 is disposed at a position over the lens 2 and the distance measurement point Pa2 shown in FIG. 11 is measured.

Figure 50C:
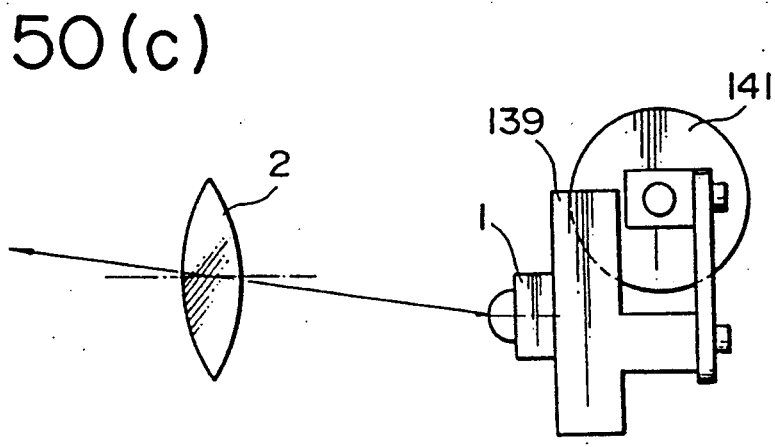

Likewise, when the motor 128 rotates in the clockwise direction, the nuts 133 and 134 are moved so that they are mutually approached. Thus, the base plate 139 downwardly moves (in the lower direction perpendicular to the drawing surface of FIG. 48) and thereby the light source 1 is located at a position below the lens 2 as shown in FIG. 50(c). Thus, the distance measurement point Pa1 shown in FIG. 11 is measured.

Figure 51:
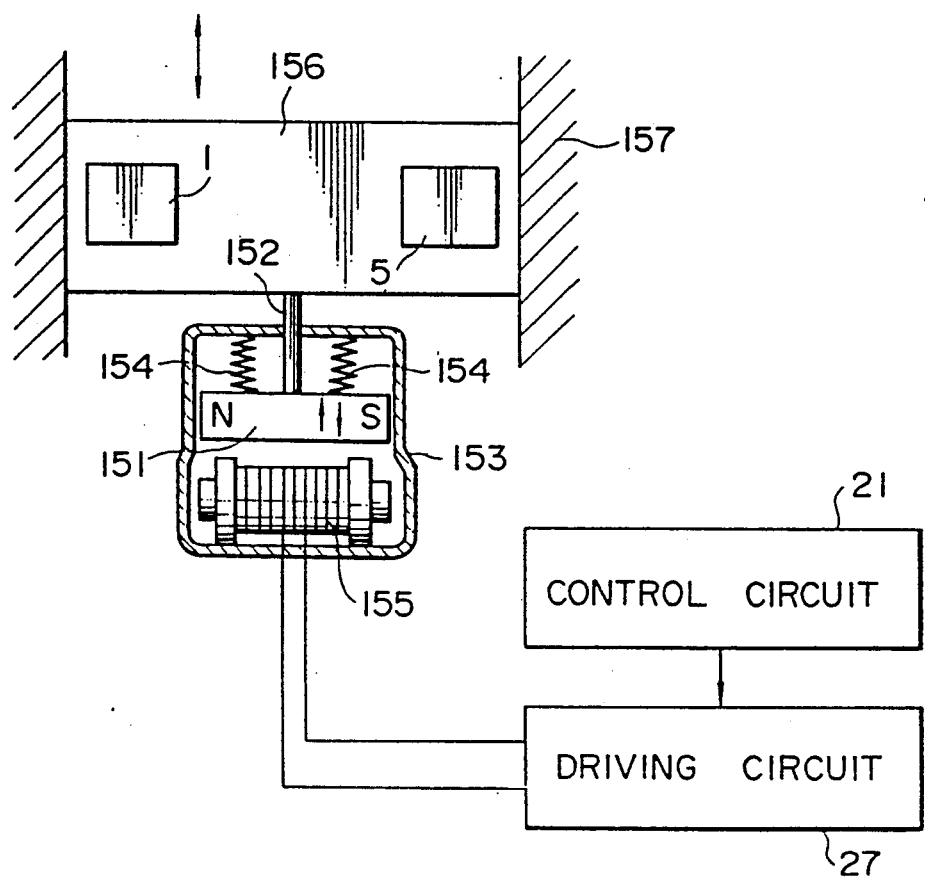
FIG. 51 shows a first modification of the driving mechanism of the present invention.

FIG. 51 shows a first modification of the driving mechanism of the present invention. In this modification, a magnet 151 is connected via a shaft 152 to a base plate 156 where the light source 1 and PSD 5 are mounted. A spring 154 is disposed between the magnet 151 and a case 153. 155 is an electromagnet which is used instead of a motor. A fixing base plate 157 is provided for guiding the vertical motion of the base plate 156.

Figure 52A:
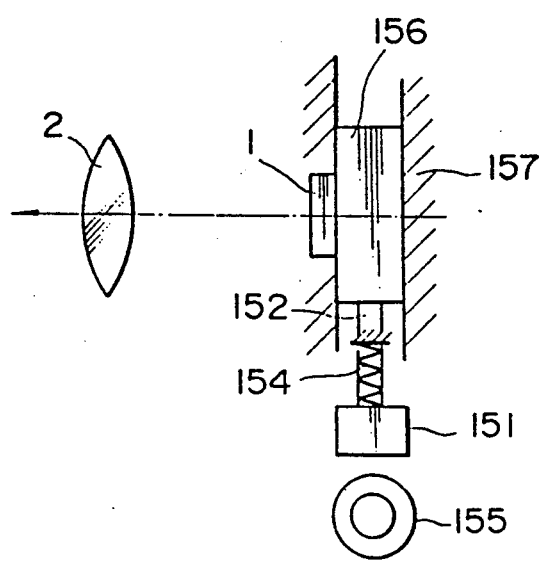
FIGS. 52a-52c shows a side view of the driving mechanism of the first modification of FIG. 51.

When the electromagnet 155 is not magnetized, as shown in FIG. 52(a), the light source 1 is opposed to the lens 2 so that the former optical path accords with the latter one. In this state, the distance measurement point Pa of FIG. 11 is measured.

Figure 52B:
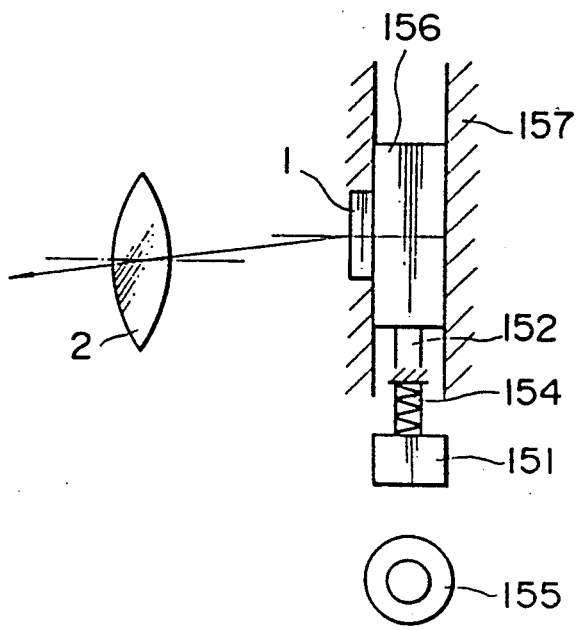

When the distance measurement point Pa2 is measured, the driving mechanism 27 causes the electromagnet 155 to be magnetized so that the disposition of the magnetic pole of the electromagnet 155 accords with that of the magnet 151. In other words, in this modification, since the left end portion and the right end portion of the magnet 151 are magnetized as the N pole and the S pole, respectively, the electromagnet 155 is magnetized so that the left end portion and the right end portion become the N pole and S pole, respectively. Thus, the same poles are repelled and thereby the base plate 156 connected to the magnet 151 via the shaft 152 is moved to a upper position shown in FIG. 51 against the resilient force of the spring 154. Consequently, as shown in FIG. 52 (b), the light source 1 is moved to an upper position of the optical axis. The light beam emitted from the light source 1 downwardly orients via the lens 2.

After the distance is measured, when the electromagnet 155 is demagnetized, the magnet 151, namely, the base plate 156 is moved to the former position by the tension force of the spring 154.

Figure 52C:
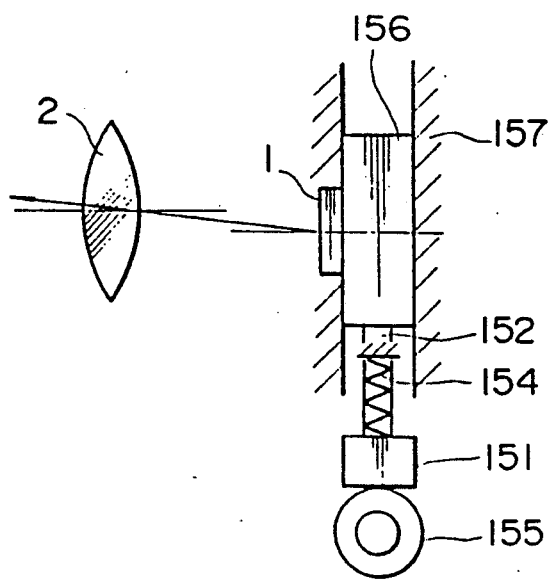

When the distance measurement point Pa1 is measured, the electromagnet 155 is magnetized so that the left end portion and the right end portion thereof become the S pole and the N pole, respectively. Thus, the different poles are attracted and the magnet 151, namely, the base plate 156 is moved to a lower position shown in the figure. Consequently, as shown in FIG. 52(c), the light source 1 is placed in a lower position of the optical axis of the lens 2 and the light beam is upwardly radiated via the lens 2.

Figure 53:
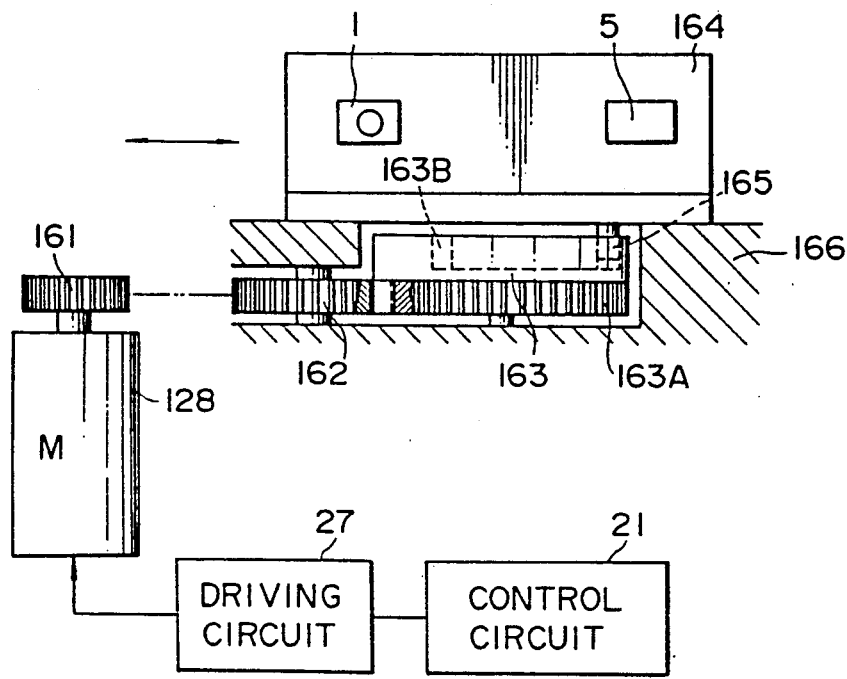
FIG. 53 is a second modification of the driving mechanism of the third embodiment.

FIG. 53 is a second modification of the drive mechanism of the distance measuring device according to the present invention. In the drive mechanism shown in FIG. 53, a base plate 164 is provided with the light source 1 and the PSD 5 mounted thereon. The base plate 164 is guided to a fixing base plate 166, the base plate 164 being movable in the horizontal direction (the direction of the base length). A speed adjustment mechanism 161 is provided for adjustably transferring the rotation of a motor 128 to a gear 162. A cam plate 163 having a cam Groove 163B is provided as shown in FIG. 54, a gear 163A formed on the outer periphery thereof being engaged with the gear 162. On the base plate 164, a pin 165 is disposed which is engaged with the cam groove 163B.

Figures 54A, 54B, 54C:
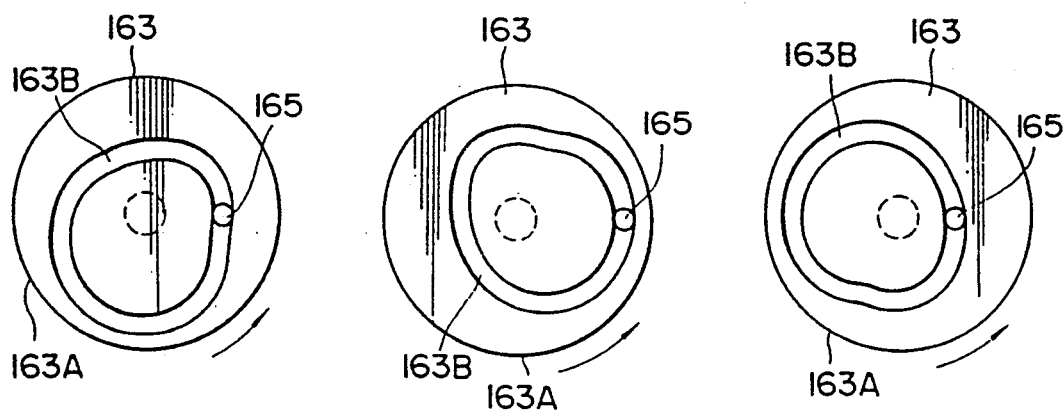
FIGS. 54a-54c illustrate the operation of the second modification of the driving mechanism of the third embodiment.
Figure 55:
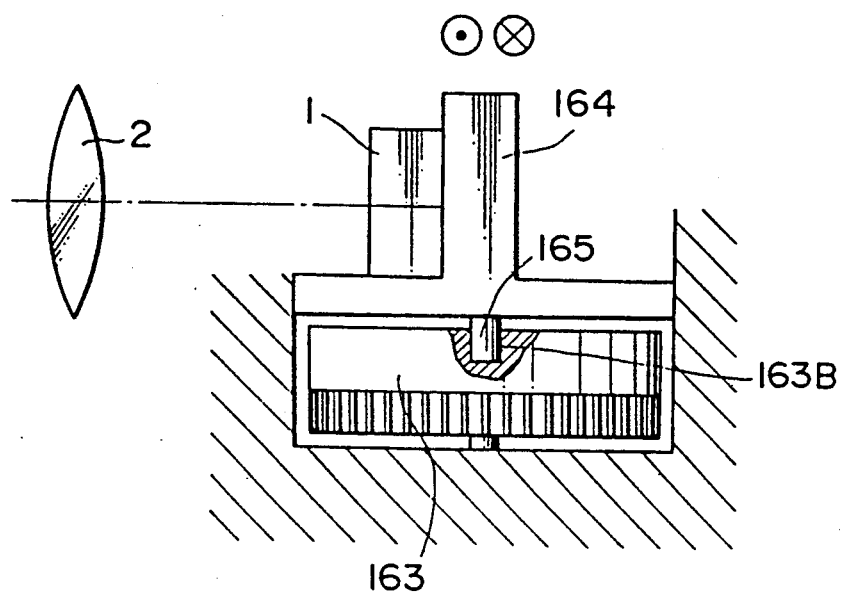
FIG. 55 shows a side view of the second modification of FIG. 53.

In the initial state, the pin 165 is placed on the cam plate 163 as shown in FIG. 54(a). At this time, as shown in FIG. 55, the light source 1 is opposed to the lens 2 so that the former optical axis accords with the latter one. In this state, for example, the center distance measurement point Pa is measured.

When the distance measurement point Pal of FIG. 11 is measured, the motor 128 is rotated. When the rotation of the motor 128 is transferred to the gear 162 via the speed adjustment mechanism 161, since the gear 162 is engaged with the gear 163A, the cam plate 163 is rotated in the counterclockwise direction shown in FIG. 54. Thus, the pin 165, accordingly, the base plate 164 is guided to the cam groove 163B and then moved in the right direction (in the lower direction perpendicular to the drawing surface). As shown in FIG. 54(b), when the pin 165 is moved to the rightmost position, the rotation of the motor 128 is stopped and the distance is measured. At this time, since the light source 1 is placed at the right of the optical axis of the lens 2, the light beam emitted from the light source 1 is radiated to the distance measurement point Pal at the left of the optical axis of the lens 2.

When the distance measurement point Pa2 which is placed at the right of the center distance measurement point Pa is measured, the cam plate 163 is rotated to the position shown in FIG. 54(c). At this time, the pin 165 is moved to the leftmost position (in the upper direction perpendicular to the drawing surface of FIG. 55) and the light source 1 is placed at the left of the optical axis of the lens 2. Thus, the light beam emitted from the light source 1 is radiated to the distance measurement point Pa2.

Figure 56:
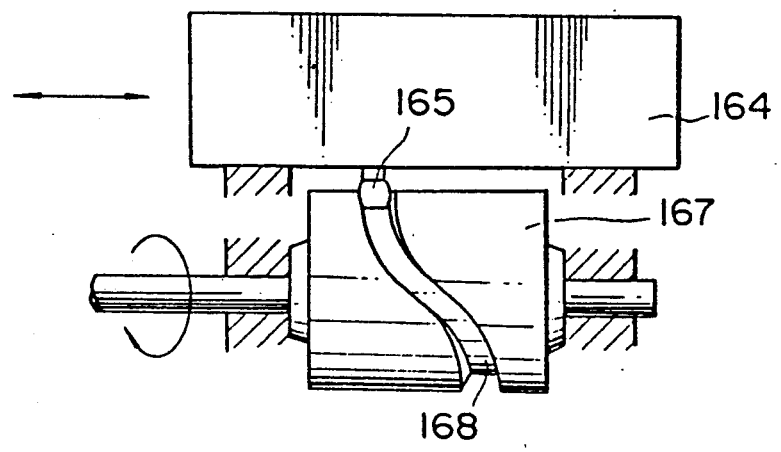
FIG. 56 shows a third modification of the driving mechanism of the third embodiment.

FIG. 56 shows a third modification of the driving mechanism of the third embodiment. It is possible to obtain the same result by using a cam cylinder 167 having a cam groove 168 as the case using the cam plate 163 (refer to FIG. 53).

FIGS. 57(a)-57(d) and 58 show a fourth modification of the driving mechanism of a third embodiment. The light source 1 and the PSD 5 are mounted on a base plate 71. The base plate 71 is guided to a fixing base plate 75 so that it is movable in the direction of the base length.

Figure 57A:
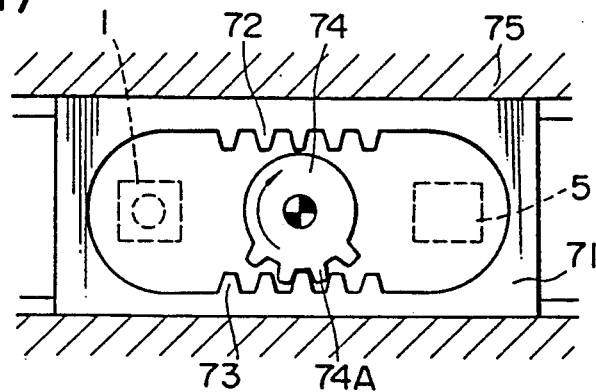
FIGS. 57a-57d and 58 show a fourth modification of the driving mechanism of a third embodiment.

As shown in FIG. 57(a), in the initial state, a intermittent pinion 74 is engaged substantially with the center portion of a rack 72 in a lower position of the base plate 71. At this time, the light source 1 is opposedly arranged to the lens 2 so that the former optical axis accords with the latter optical axis. In this manner, a light beam is radiated to the center distance measurement point Pa of FIG. 11.

Figure 57B:
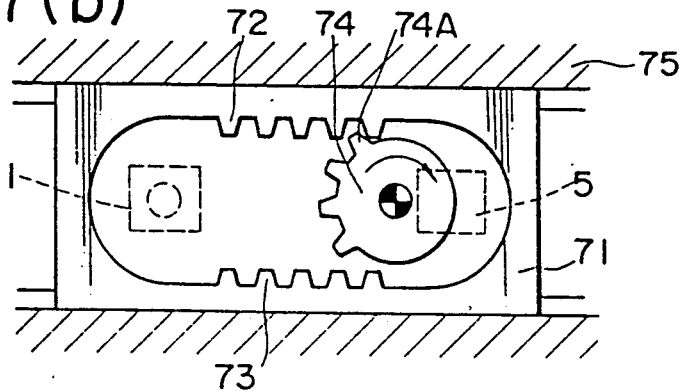

When the distance measurement point Pe at the right of the distance measurement point Pa is measured, the driving circuit 27 causes the motor 28 to rotate the intermittent pinion 74 via a speed adjustment mechanism 76 in the clockwise direction shown in FIG. 57(a). Thus, the rack 73, accordingly, the base plate 71 is moved in the left direction of FIG. 57(a) (in the upper direction perpendicular to the drawing surface of FIG. 58). A detecting section 77 detects the rotation position of the intermittent pinion 74 and outputs the position signal to the control circuit 21. As shown in FIG. 57(b), when a threaded section 74A of the intermittent pinion 74 rotates until it separates from the rack 73, the rotation of the intermittent pinion 74 is stopped. At this time, the base plate 71 is placed in the leftmost position and the light source 1 is placed at the left of the optical axis of the lens 2.

Figure 57C:
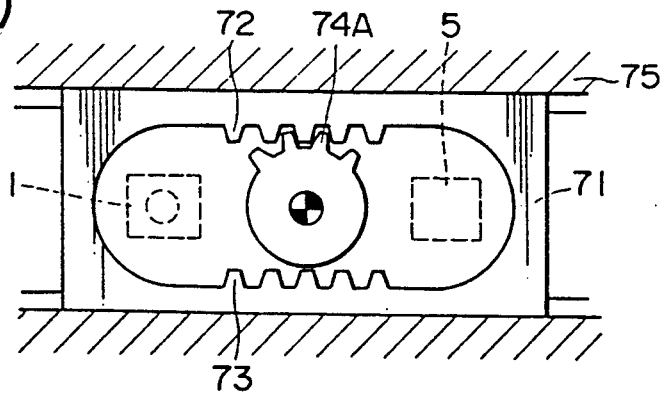
Figure 57D:
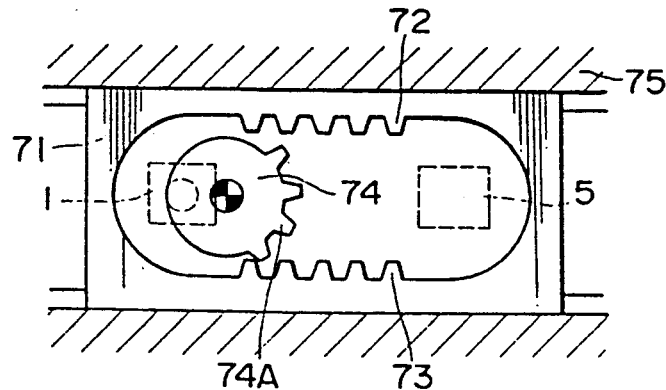
Figure 58:
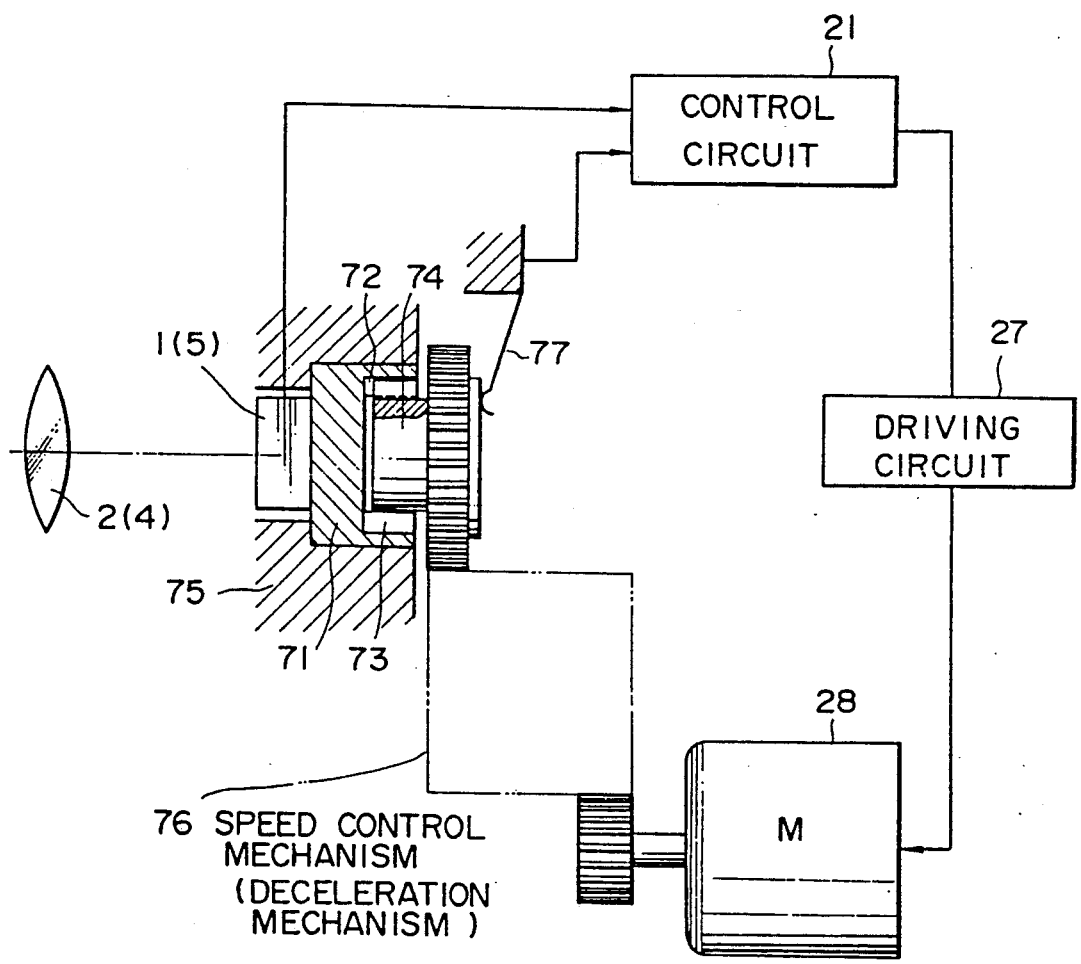

When the distance measurement point Pc at the left of the distance measurement point Pa is measured, the intermittent pinion 74 is rotated in the clockwise direction from the state shown in FIG. 57(b). Thus, as shown in FIG. 57(c), the threaded section 74A is engaged with the rack 72 in the upper position and the rack 72, accordingly, the base plate 71 is moved in the right direction (in the lower direction perpendicular to the drawing surface of FIG. 58). As shown in FIG. 57(d), when the threaded section 74A separates from the rack 72, the base plate 71 is placed in the rightmost position. At this time, the light source 1 is placed at the right of the optical axis of the lens 2 and the light beam emitted therefrom is radiated to the distance measurement point Pa1.

Figure 59A:
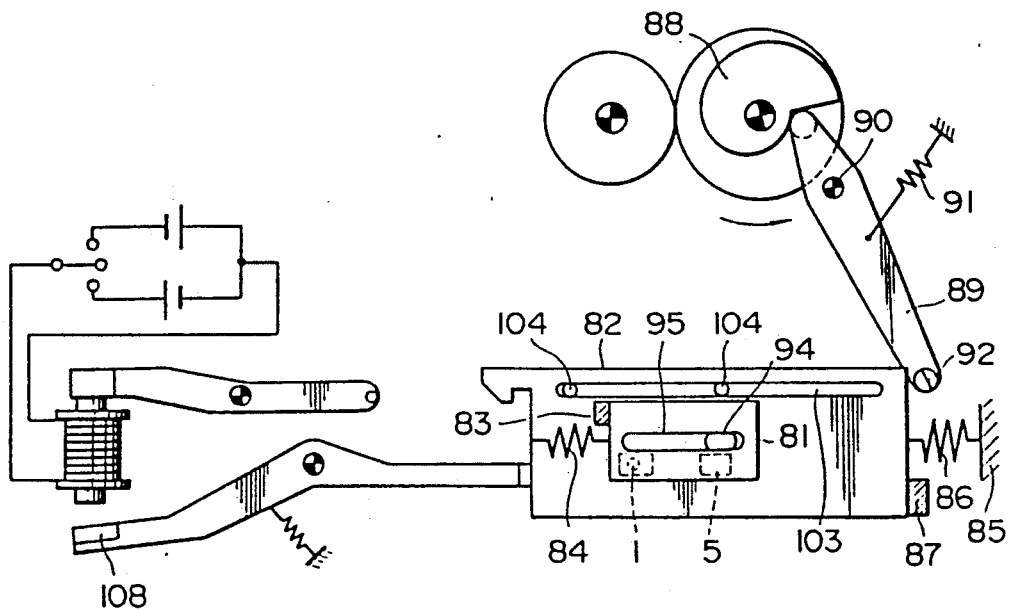

FIGS. 59(a)-59(e) shows a fifth modification of the driving mechanism of a third embodiment of the present invention. In this modification, the light source 1 and PSD 5 are mounted on a base plate 81. The base plate 81 is tensioned by a spring 84 so that it is in contact with a stopper 83 provided on the slide plate 82. A spring 86 is disposed between the slide plate 82 and the fixing base plate 85. Thus, as shown in FIG. 59(a), in the initial state, the slide plate 82 is in contact with a stopper 87 which is secured to the fixing base plate 85 with the resilient force of the spring 86.

Figure 59B:
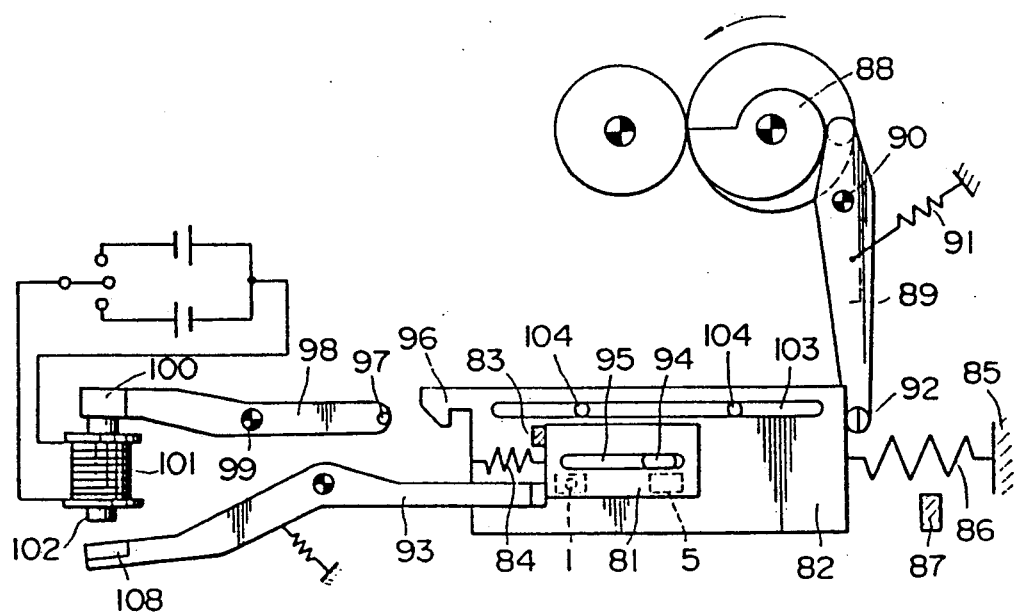

When the center distance measurement point Pa of FIG. 11 is measured, a cam plate 88 is rotated counterclockwise by the motor (not shown). Thus, a lever 89 is rotated clockwise about a pivoting point 90 against the resilient force of a spring 91. Thus, as shown in FIG. 59(b), a pin 92 at the end of the lever 89 presses the left end portion of the slide plate 82, thereby moving the slide plate 82 in the left direction against the resilient force of the spring 86. At this time, the base plate 81 which is pressed by the stopper 83 with the tension force of the spring 84 is moved in the left direction along with the slide plate 82.

When the base plate 81 is moved to a predetermined position, as shown in FIG. 59(b), since the left end portion of the base plate 81 is in contact with the right end portion of a stop lever 93, the base plate 81 stops at this position. However, since the slide plate 82 is pressed by the pin 92, it is further moved to the left direction. At this time, the slide plate 82 is guided by a long hole 103 formed on the slide plate 82 and a fixing pin 104 which is inserted thereinto. On the other hand, since a long hole 95 is formed on the base plate 81, a pin 94 provided on the slide plate 82 being engaged with the long hole 95. Thus, the slide plate 82 can be moved.

Figure 59C:
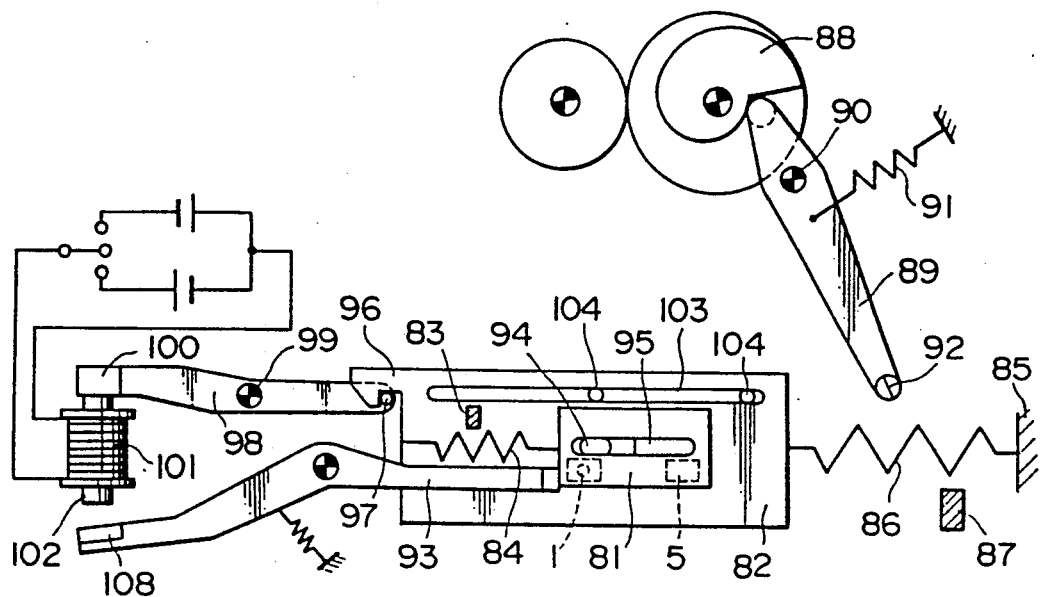

When the slide plate 82 arrives at a predetermined position, as shown in FIG. 59(c), a hook 96 formed at the left end portion of the slide plate 82 is in contact with a pin 97 at the right end portion of the slide plate 82. At the left end portion of a stop lever 98, a magnet 100 is secured. Since the magnet 100 is attracted to an iron core 102 of an electromagnet 101, when the hook 96 is in contact with the pin 97, the stop lever 98 is slightly rotated in the clockwise direction about a pivoting point 99 against the resilient force of the magnet 100. After the hook 96 is secured to the pin 97, the stop lever 98 is rotated in the counterclockwise direction by the tension force of the magnet 100 and the securing operation is completed. At this time, since the pressure by the cam plate 88 is released, the lever 89 is rotated in the counterclockwise direction about the supporting point 90 by the tension force of the spring 91 and it is moved to the former position.

As described above, the state shown in FIG. 59(c) takes place and the distance measurement operation at the center distance measurement point Pa is executed.

Figure 59D:
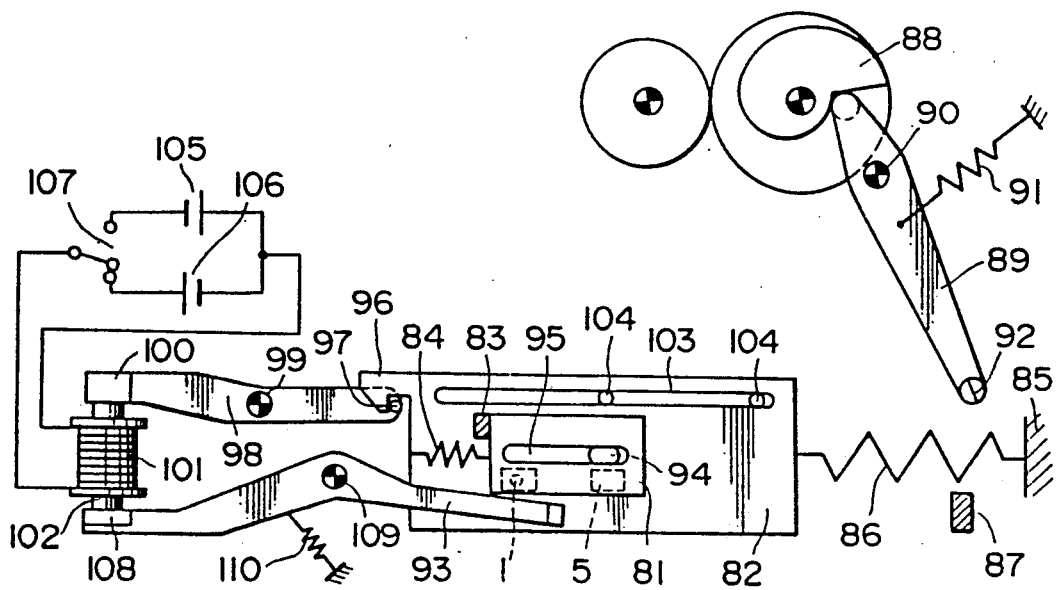

When the right side distance measurement point Pe of FIG. 11 is measured, as shown in FIG. 59(d), a switch 107 is placed in the lower position of the figure and a battery 106 is connected to the electromagnet 101. At this time, the electromagnet 101 is magnetized so that the magnetic pole of the electromagnet 101 differs from that of the magnet 100. Thus, while the magnet 100 is attracted to the iron core 102, an iron piece 108 secured at the left end portion of the stop lever 93 is attracted to the iron core 102. Consequently, the stop lever 93 is rotated in the clockwise direction about a pivoting point 109 against the resilient force of a spring 110. Thus, the right end portion of the stop lever 93 is lowered. The securing of the base plate 81 is released and the base plate 81 is moved in the left direction by the resilient force of the spring 84. The base plate 81 is stopped when it is in contact with the stopper 83. At this time, the light source 1 is placed on the left of the optical axis of the lens 2 and a light beam is emitted to the distance measurement point Pa2.

Figure 59E:
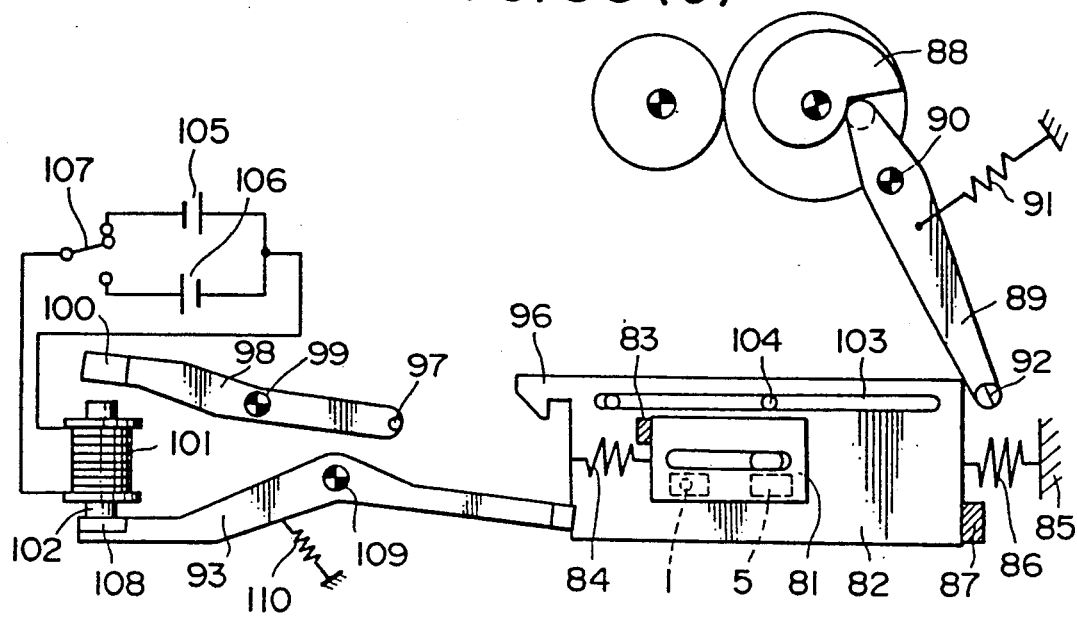

When the left side distance measurement point Pc of FIG. 11 is measured, as shown in FIG. 59(e), the switch 107 is placed in the up position of the figure and the reverse polarity battery 105 is connected to the electromagnet 101. Thus, the electromagnet 101 is magnetized in the reverse magnetic polarity of that shown in FIG. 59(d). Consequently, the magnet 100 separates from the iron core 102 by the repulsive force and the stop lever 98 is rotated in the clockwise direction about the supporting point 99. Thus, the hook 96 which is secured by the pin 97 is released and the slide plate 82 is moved in the right direction by the resilient force of the spring 86. At this time, since the base plate 81 is pressed to the stopper 83 of the slide plate 82 by the resilient force of the spring 84, the base plate 81 is moved along with the slide plate 82. The slide plate 82 is stopped when it is in contact with the stopper 87. At this time, the light source 1 is placed on the right of the optical axis of the lens 2.

FIGS. 60(a)-60(c) shows a sixth modification of a driving mechanism of the third embodiment of the present invention. In this modification, a light emitting system and a light receiving system comprising the light source 1 and the PSD 5 are provided in a block 328. When the center distance measurement point Pa of FIG. 11 is measured, as shown in FIG. 60(a), a switch 324 is placed in the neutral potion of the figure. Both solenoids 321 and 322 are in the demagnetized state. Since a spring 346 is provided between slide plates 333 and 341, the slide plate 333 is stopped in the position where the left end portion of a slot 334 is in contact with a fixed pin 335 and the slide plate 341 is stopped in the position where the right end portion of a slot 342 is in contact with the fixing pin 343. At this time, a pin 332 is nipped both with an extruded portion 336 of the slide plate 333 and an extruded portion 344 of the slide plate 341. Since the block 328 is provided at the other end of the lever 331 where the pin 332 is provided, the block 328 is oriented on the front side of the camera and the center distance measurement point Pa is measured.

When the left side distance measurement point Pc of FIG. 11 is measured, as shown in FIG. 60(b), the switch 324 is placed in the right position and the solenoid 322 is magnetized by the battery 323. Thus, an iron core 325 is attracted by the solenoid 322. A lever 327 is pivotally fixed on the iron core 325 via a pin 326. Since the block 328 is secured to the other end of the lever 327, the block 328 is rotated in the counterclockwise direction about a pivoting point 329. Thus, since the pin 332 at one end of the lever 331 whose other end is secured to the block 328 presses the extruded portion 336 of the slide plate 333 in the left direction, the slide plate 333 is moved in the left direction against the tension force of the spring 346. The slide plate 333 is guided by the fixing pin 335 which is inserted into the slot 334 of the slide plate 333.

When the slide plate 333 arrives at a predetermined position, since a pin 337 provided on the slide plate 333 is in contact with the left side wall of the slide plate 333, the slide plate 333 is stopped in this position. At this time, since the block 328 is oriented slightly on the left of the front side of the camera, the distance measurement point Pa1 is measured.

On the other hand, when the right side distance measurement point Pe of FIG. 11 is measured, as shown in FIG. 60(c), the switch 324 is placed in the left position and the solenoid 321 is magnetized. Thus, the iron core 325 is attracted by the solenoid 321 and the block 328 is rotated in the clockwise direction about the supporting point 329. At this time, since the pin 332 presses the extruded portion 344 of the slide plate 341 in the right direction, the slide plate 341 is moved in the right direction against the tension force of a spring 346. The slide plate 341 is guided by the fixed pin 343 which is inserted into the detecting section 342 formed on the slide plate 341. Thus, as can be understood from the above and from the drawings, spring 346, when acting in conjunction with the fixed pins 335, 343 and slots 334, 342, serves to center the support member 328 by biasing the support member towards a predetermined center position.

When the slide plate 341 is moved to a predetermined position, since a pin 345 provided on the slide plate 341 is in contact with the right side wall of a stopper 338, the slide plate 341 stops at this position. At this time, since the block 328 is oriented slightly at the right of the front side of the camera, the distance measurement point Pa can be measured.

FIG. 61 shows a seventh modification of the third embodiment of the present invention, and FIGS. 62 through 64 show eighth through tenth modifications of the driving mechanism of the third embodiment.

In the seventh modification shown in FIG. 61, the lens 2, the condenser lens 4, and the PSD 5 are provided in a block 351. The block 351 is rotated in the direction perpendicular to the base length about a shaft 352 in the direction in parallel with that of the base length. Thus, the center distance measurement point Pa and the upper and lower distance measurement point Pd and Pb can be measured.

FIG. 62 shows a eighth modification of the driving mechanism of the third embodiment. In this modification, a mirror 361 is disposed in front of a block 351. The mirror 361 is rotatable about the shaft 362 in the direction of the line length. In this manner, the same operation as the embodiment shown in FIG. 39 can be performed.

FIG. 63 shows a ninth modification of the third embodiment. In this modification, a flat convex cylindrical lens 371 and a flat concave cylindrical lens 372 are disposed in front of the block 351 so that the sides with the same curvature sides are contacted. When the block 351 is rotated along with the flat convex cylindrical lens 371 about the shaft 152, the direction of the light beam emitted from the cylindrical lens 372 can be changed.

FIG. 64 shows a tenth modification of the third embodiment. In this modification, flat plates 381 and 383 are disposed with a predetermined distance in front of the block 351, a liquid layer 382 being inserted therebetween. Thus, by rotating the flat plate 381 about a shaft 384, the direction of the light beam can be changed.

FIGS. 65 through 68 show a fourth embodiment of a mechanism for flatly distributing distance measurement points. In these Figures, 221 and 222 are solenoids. By connecting a battery 241 to a switch 242, the solenoids 221 and 222 are selectively magnetized. An iron core 223 is driven by the solenoids 221 and 222. A support member 225 is connected to the iron core 223 via a pin 224. The support member 225 supports a mirror 226, the support member 225 being rotatable about a supporting point 227 supported by a chassis and the like (not shown). 228 is a torsion spring 228, the circularly wound portion being inserted into a supporting point 227, two open end portions being disposed so as to nip the pins 224 and 229. The pin 229 is secured to the chassis and the like.

A link 232 is connected to the support member 225 via a pin 231, the other end of the link 232 being connected to a support member 235 via a pin 234. Substantially at the center, an extruded portion 233 securable to stoppers 238 and 239 is formed. The support member 235 supporting a mirror 236 is rotatably disposed about a supporting point 237 supported by the chassis and the like.

In the structure described above, for example, a deflector for deflecting the light beam in the direction perpendicular to that of the base length is formed.

By connecting a battery 271 to a switch 272, solenoids 251 and 252 are selectively magnetized. An iron core 253 is driven by the solenoids 251 and 252. A support member 255 is connected to the iron core 253 via a pin 254. The support member 255 supports a mirror 256, the support member 255 being rotatable about a supporting point 257 supported by a chassis and the like. The circularly wound portion of a torsion spring 258 is inserted into a supporting point 257, two open end portions being disposed so as to nip the pins 254 and 259. The pin 259 is secured to the chassis and the like.

A link 262 is connected to the support member 255 via a pin 261, the other end of the link 262 being connected to a support member 265 via a pin 264. Substantially at the center of the link 262, an extruded portion 263 securable to stoppers 268 and 269 is formed. The support member 265 supporting a mirror 266 is rotatably disposed about a supporting point 267 supported by the chassis and the like.

In the structure described above, a deflector for deflecting the light beam in the direction in parallel with that of the base length is formed.

Figure 65:
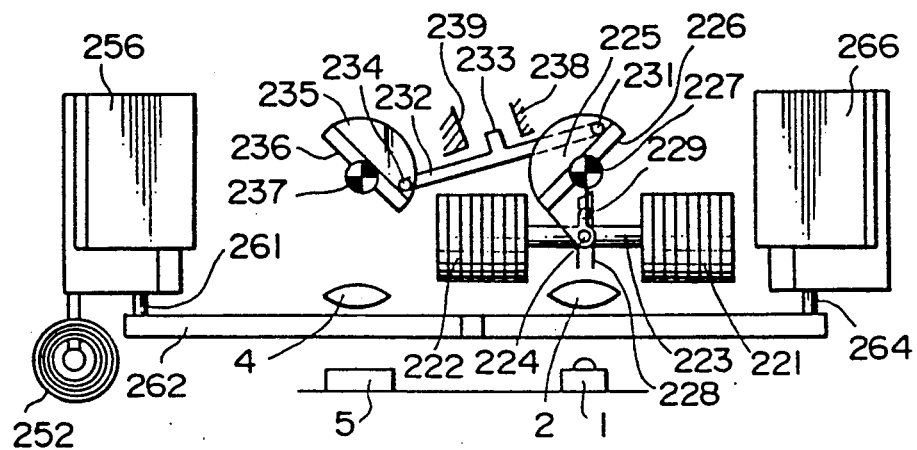

When the distance measurement point Pa shown in FIG. 11 is measured, the switches 242 and 272 are placed in the neutral positions and solenoids 221, 222, 251, and 252 are not magnetized. At this time, iron cores 223 and 253 are stopped by the torsion springs 228 and 258. The pins 224 and 254 are disposed so that they are placed at the center of each end portion of the torsion springs 228 and 258 (as shown in FIGS. 65 through 68). At this time, the light beam which is upwardly emitted from the light source 1 as shown in FIG. 65 is entered into the mirror 226 via the lens 2. The mirror 226 deflects the light beam for 90° and horizontally reflects it to the right. The reflected light beam is entered to the mirror 266. The light beam entered from the left horizontal direction is deflected by the mirror 266 for 90° and downwardly radiated. This light beam is radiated to the object.

Figure 66:
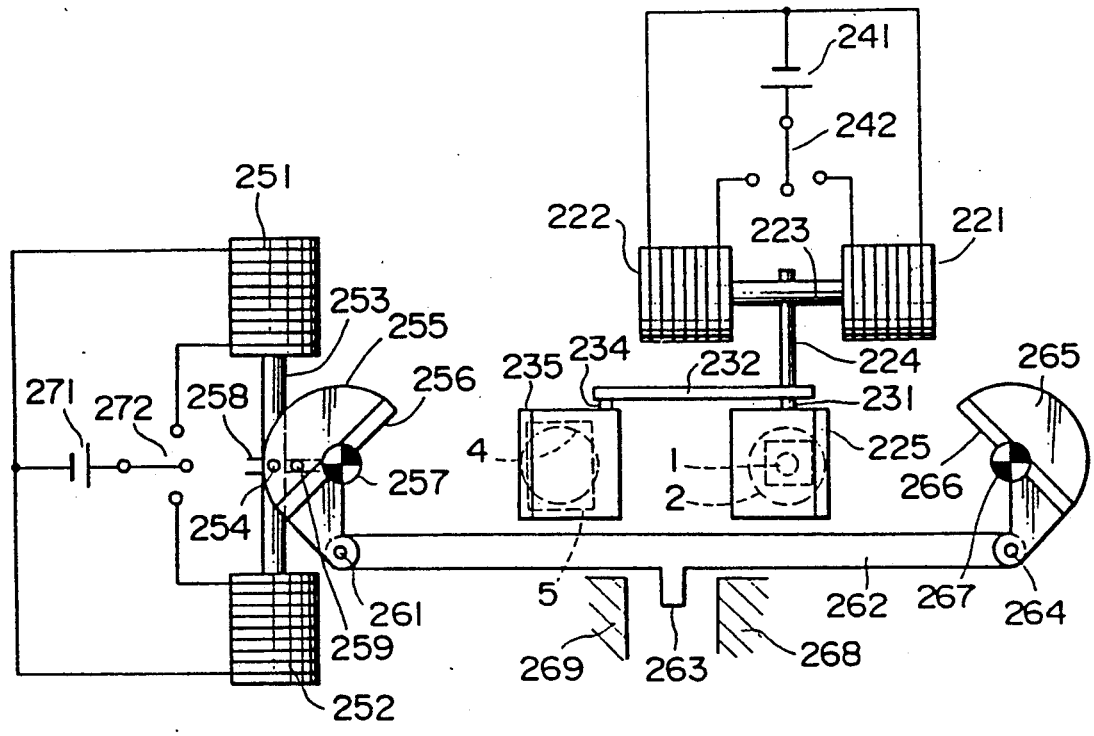
Figure 67:
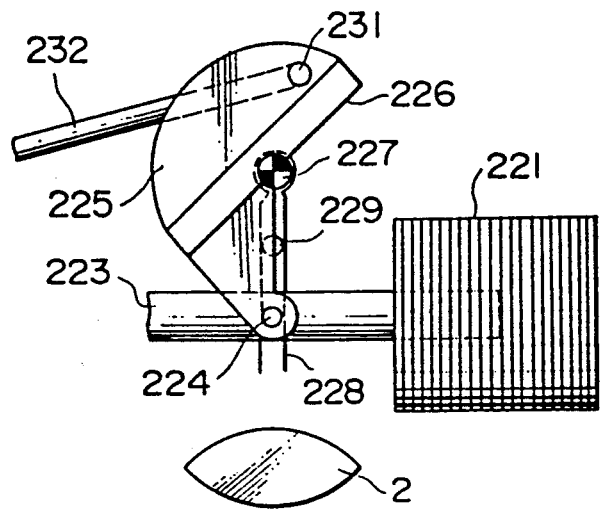
Figure 67:
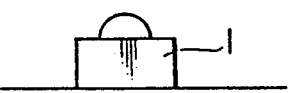
Figure 68:
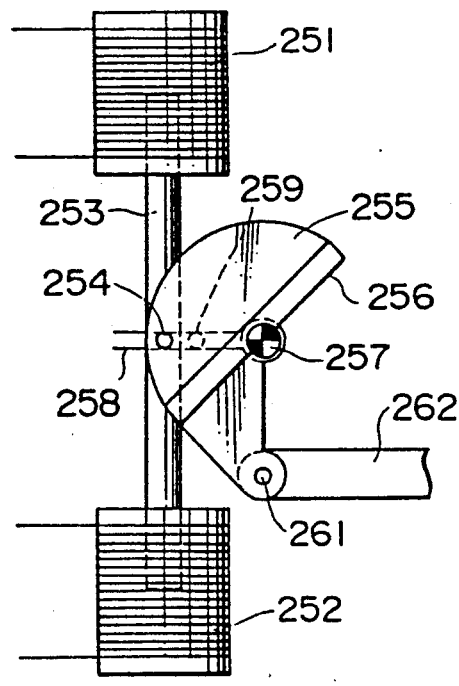

The light beam reflected by the object is upwardly entered to the mirror 256 with some angle as shown in FIG. 66. The mirror 256 rightwardly reflects this light beam with some angle to the horizontal direction. The light beam entered from the left side shown in FIG. 66 is deflected by the mirror 236 for approximately 90° and then downwardly oriented. This light beam is entered to the PSD 5 via the condenser lens 4.

By referring to FIGS. 69 and 70, the case for measuring the distance measurement point Pa1 of FIG. 11 will be described in the following. At this time, the switch 242 is placed in the right position of the figure and the solenoid 221 is magnetized. Thus, the iron core 223 is attracted in the right direction of the figure. Since the support member 225 is connected to the iron core 223 via the pin 224, the support member 225 is rotated in the counterclockwise direction of FIG. 70 about the supporting point 227. In synchronization with the rotation, the support member 235 connected to the support member 225 is rotated about the supporting point 237 via the link 232. The rotations of the support member 225 and 235 are stopped by the extruded portion 233 of the link 232 which is in contact with the stopper 239.

At this time, the light beam which is upwardly radiated from the light source 1 as shown in FIG. 70 is entered into the mirror 226 via the lens 2. Since the mirror 226 is rotated in a more counterclockwise direction than that shown in FIG. 65, the light beam is oriented slightly in an upper direction than the horizontal direction. In FIG. 69, since the light beam is entered horizontally from the left direction, the mirror 266 downwardly reflects it. Since the light beam orients slightly in an upper direction than the horizontal direction (when viewed from the right side of FIG. 69), it is radiated to the distance measurement point Pd of FIG. 11.

The reflected light beam from the object is entered upwardly to the mirror 256 and reflected at a predetermined angle to the horizontal direction. When this light beam is observed as shown in FIG. 70, it is entered into the mirror 236 while it orients in a slightly lower direction than the horizontal direction.

Since the mirror 36 is rotated in a more counterclockwise direction than that shown in FIG. 65, the light beam which is reflected by the mirror 236 is correctly entered into the condenser lens 4 and then radiated to the PSD 5.

When the distance measurement is completed, the switch 242 is placed in the neutral position and thereby the solenoid 221 is demagnetized. At this time, as shown in FIG. 70, the left end portion and the right end portion of the torsion spring 228 are in contact with the pins 229 and 224, respectively. Thus, the torsion spring 228 is in the extended state. When the solenoid 221 is demagnetized, the torsion spring 228 is compressed and thereby the iron core 223 and the mirrors 226 and 236 are restored to the conditions shown in FIGS. 65 and 68 through 74.

Then, by referring to FIGS. 71 and 72, the case for measuring the distance measurement point Pa2 of FIG.

11 will be described in the following. In this case, the switch 42 is placed in the left position shown in FIG. 71 and the solenoid 222 is magnetized. Thus, since the iron core 223 is leftwardly attracted, unlike the case shown in FIGS. 69 and 70, the mirror 226 and the mirror 236 are rotated in the clockwise direction and in the counterclockwise direction shown in FIG. 72, respectively. The rotations are stopped by the extruded portion 233 and the stopper 238. Thus, the light beam which is entered from the lower direction is rightwardly reflected in a slightly lower direction than the horizontal direction. Thus, when the light beam which is downwardly reflected by the mirror 266 in FIG. 71 is observed on one side (on the right side of FIG. 71), since this light beam orients in a slightly lower direction than the horizontal direction, it is radiated to the distance measurement point Pa2 of FIG. 11.

Since the mirrors 236 and 226 are supplementally rotated, the light beam reflected from the object is correctly entered into the PSD 5 via the condenser lens 4.

When the solenoid 222 is demagnetized, the torsion spring 228 causes the mirrors 226 and 236 to be moved to the former positions as described above.

Then, by referring to FIGS. 73 and 74, the case for measuring the distance measurement point Pc shown in FIG. 1 will be described in the following. At this time, the switch 272 is placed in the down position of FIG. 73 and thereby the solenoid 52 is magnetized. Thus, the iron core 253 is attracted in the lower direction of the figure. Since the support member 255 is connected to the iron core 253 via the pin 254, the support member 255 is rotated in the counterclockwise direction of FIG. 73 about the supporting point 257. In synchronization with this rotation, the support member 265 which is connected to the support member 255 via the link 262 is rotated in the counterclockwise direction. The rotations of the support members 255 and 256 are stopped by the extruded portion 263 of the link 262 which is in contact with the stopper 268.

At this time, the light beam emitted from the light source 1 is entered into the mirror 226 via the lens 2 in the upward direction of FIG. 74 and then horizontally reflected in the right direction. This light beam is horizontally entered into the mirror 266 from the left direction of FIG. 73. Since the mirror 266 is rotated in a more counterclockwise direction than that shown in FIG. 65, the light beam downwardly orients in a slightly more right direction than the vertical direction. When the light beam is observed from the upper position to the object, since it orients in a slightly more left direction than the front side direction. Thus, the light beams are radiated to the distance measurement point Pc of FIG. 11.

The light beam reflected from the object is entered to the mirror 256 in the upward direction of FIG. 73. Since the mirror 256 is rotated in a more counterclockwise direction than that shown in FIG. 65, the light beam reflected by the mirror 256 is correctly entered into the condenser lens 4 via the support member 235 and then radiated to the PSD 5.

When the distance measurement is completed, the switch 272 is placed in the neutral position and thereby the solenoid 252 is demagnetized. At this time, as shown in FIG. 73, the upper end portion and the lower end portion of the torsion spring 258 are in contact with the pin 259 and the pin 254, respectively. Thus, the torsion spring 258 is in the extended state. When the solenoid 252 is demagnetized, the torsion spring 258 causes the iron core 253 and the mirrors 256 and 266 to be moved to the former positions as shown in FIGS. 65 through 68.

By referring to FIGS. 75 and 76, the case for measuring the distance measurement point Pe of FIG. 11 will be described in the following. In this case, the switch 272 is placed in the up position of FIG. 75 and thereby the solenoid 251 is magnetized. Thus, since the iron core 253 is upwardly attracted, unlike the case shown in FIGS. 73 and 74, the mirrors 256 and 266 are rotated in the clockwise direction of FIG. 75. The rotations are stopped by the extruded portion 263 and the stopper 269. Thus, the light beam entered horizontally from the left direction to the mirror 266 is reflected by the mirror 266 in a slightly more left direction than the vertical direction. When this light beam is observed from the upper position to the object, since the light beam orients in a slightly more right direction than the front direction, it is radiated to the distance measurement point Pe of FIG. 11.

Since the mirrors 256 and 266 are supplementally rotated, the light beam reflected from the object is correctly entered into the PSD 5 via the condenser lens 4.

When the solenoid 251 is demagnetized, the torsion spring 258 causes the mirrors 256 and 266 to be moved to the former positions like the case as described above.

Likewise, by the combination of solenoids to be magnetized, the distance measurement point Pc1, Pc2, Pe1, and Pe2 can be observed.

In addition, it is possible to drive the photographing lens according to the average value of the measured results, for example, at five measurement points. Moreover, it is also possible to select one of five measurement points to drive the photographing lens according to the measured distance values. In this case, a selection switch is provided, the selection being input to the base plate 81.

FIGS. 77 and 78(a)–78(b) show a first modification of the fourth embodiment of the distance measuring device according to the present invention. In this modification, a light emitting deflector and a light receiving deflector are structured by contacting flat convex lenses 291 and 293 with flat concave lenses 292 and 294, each of which has the same curvature radius, so that the same curvature sides are matched (in the Schwenkkeil method). For example, by synchronously rotating the flat concave lenses 292 and 294 for a predetermined angle in a predetermined direction, the light beam can be deflected for a predetermined angle as described above.

FIGS. 79 and 80(a)–80(b) show a second modification of the fourth embodiment. In this modification, liquid layers 303 and 306 are disposed between flat plates 301 and 302 and between flat plates 304 and 305, respectively. By rotating the flat plates 302 and 305 in a predetermined direction, the emitting and reflecting light beams are deflected.

As described above, according to the present invention, by lighting a plurality of LEDs and the like linearly disposed at the same time or by disposing a slit plate and the like in front of the light source, a light beam can be generated. In addition, by using a prism and the like, the light beam can be flatly distributed. Moreover, the linear light source itself is mechanically moved or a plurality of light sources flatly disposed are timesharingly driven. Furthermore, two linear light sources are perpendicularly disposed. Thus, a plurality of measurement points can be flatly (two-dimensionally) distributed and thereby the distance of the main object can be accurately measured regardless of the camera position and the disposition of the object.

In addition, the number of distance measurement points can be changed by using a various shaped prism or using a plurality of prisms in the same or different shape.

Moreover, beside the prisms, it is also possible to use diffraction grating and other optical elements.

Furthermore, as mentioned above, detection elements, such as CCD's and the like can be used instead of a PSD.

What is claimed is:

1. A distance measuring device for projecting light beams to a plurality of distance measurement points to measure the distance from said device to an object located at least at one of said distance measurement points, said device comprising:
    source means for emitting light;
    means for projecting the light emitted by said source means to a plurality of said distance measurement points, said projecting means comprising a prism for separating the light into a plurality of light beams, said prism having an optical axis, said distance measurement points forming at least a two dimensional distribution of points extending along first and second directions substantially perpendicular to the optical axis of said prism;
    means for collecting the light reflected from at least one of said distance measurement points; and
    means for detecting the light collected by said light collecting means.

2. The distance measuring device according to claim 1, wherein said collecting means comprises a prism, and said prism of said projecting means and of said collecting means has a substantially quadrangular pyramid shape.

3. The distance measuring device according to claim 1, further comprising means for moving said source means in one of said first and second directions.

4. The distance measuring device according to claim 3, wherein said light detection means comprises a plurality of light detection members aligned in one of said first and second directions, each said light detection member extending in the other of said first and second directions.

5. The distance measuring device according to claim 3, wherein said prism separates the emitted light into light beams spaced in the other of said first and second directions.

6. The distance measuring device according to claim 5, further comprising means for moving said detecting means along one of said first and second directions, and wherein said light collecting means comprises a prism for directing, to said light detecting means, the light beams reflected by said distance measuring points aligned in at least at one of said first and second directions.

7. The distance measuring device according to claim 6, wherein each of said prisms has a substantially biangular pyramid shape.

8. The distance measuring device according to claim 6, wherein said prism of said projecting means deflects light in both of said first and second directions.

9. The distance measuring device according to claim 5, further comprising means for moving said light detection means in one of said first and second directions.

10. The distance measuring device according to claim 5, further comprising means for moving said light detection means in both of said first and second directions.

11. The distance measuring device according to claim 5, wherein said light detection means comprises a plurality of light detection members disposed along said first and second directions.

12. The distance measuring device according to claim 5, wherein said light collecting means comprises a prism having a substantially quadrangular pyramid shape.

13. The distance measuring device according to claim 5, wherein said light collecting means comprises a prism for directing, to said light detecting means, the light reflected by said distance measuring points aligned in said other direction with respect to the direction of movement of said light source means.

14. The distance measuring device according to claim 5, wherein said light detecting means comprises a plurality of light detection members linearly arranged in one of said first and second directions.

15. The distance measuring device according to claim 14, wherein said light collection means comprises a prism for directing the light beams reflected by said distance measurement points aligned in the other said direction with respect to the direction of the arrangement of said light detection means.

16. The distance measuring device according to claim 14, further comprising means for moving said plurality of light detection members along the other of said first and second directions with respect to the direction of the arrangement of said light detection members.

17. The distance measuring device according to claim 14 further comprising means for moving said light detection members in one of said first and second directions.

18. The distance measuring device according to claim 5, where said light collection means comprises a prism for directing the light beams reflected by said distance measurement points aligned in the same direction as the direction of movement of said source means.

19. The distance measuring device according to claim 5, wherein said light detecting means comprises a plurality of light detectors aligned in one of said first and second directions and each extending in the other said direction.

20. The distance measuring device according to claim 1, further comprising means for moving said light detection means in both said first and second directions.

21. The distance measuring device according to claim 1, further comprising means for computing the distance to one of said distance measurement points from the light detected by said light detection means.

22. The distance measuring device according to claim 1, wherein said light detecting means comprises a plurality of light detection members linearly arranged along one of said first and second directions.

23. The distance measuring device according to claim 22, wherein said light collecting means comprises a prism for directing the light beams reflected at said distance measurement points, extending in said one of said first and second directions, to said light detection members.

24. The distance measuring device according to claim 1, wherein said light detecting means comprises a plurality of light detection members disposed in said first and second directions.

25. The distance measuring device according to claim 1, said light detecting means comprising a charge coupled device.

26. The distance measuring device according to claim 1, wherein said collecting means comprises a prism and said prism of said projecting means and of said collecting means has a substantially biangular pyramid shape.

27. A distance measuring device for projecting light beams to a plurality of distance measurement points, to measure the distances from said device to an object located at least at one of said distance measurement points, said device comprising:
- source means for emitting light;
- means for projecting the light emitted by said light source means to a plurality of distance measurement points, said distance measuring points extending in first and second directions and located at positions having different distances from said device;
- means for collecting the light beams reflected by said distance measurement points, said light collecting means comprising a prism for collecting the light reflected into a beam; and
- means for detecting the light collected by said light collecting means, wherein said light source means comprises a plurality of light sources extending in said first and second directions.

28. The distance measuring device according to claim 27, wherein said light detecting means comprises a plurality of light detecting members aligned in one of said first and second directions, each said detection member extending in the other of said directions.

29. The distance measuring device according to claim 27, further comprising means for moving said light detecting means along one of said first and second directions.

30. The distance measuring device according to claim 27, wherein said light detecting means extends in said first and second directions.

31. The distance measuring device according to claim 27, wherein said light detecting means comprises a charge coupled device.

32. The distance measuring device according to claim 27, further comprising means for sequentially energizing said light source means to emit light in a predetermined manner.

33. The distance measuring device according to claim 32, further comprising means for moving said light detection means in one of said first and second directions.

34. The distance measuring device according to claim 32, further comprising means for scanning the light detection means in a predetermined manner for signals corresponding to the light received from said distance measurement points for calculating the distance to at least one of said points.

35. The distance measuring device according to claim 27, further comprising means for moving said light detecting means in said first and second directions.

36. The distance measuring device according to claim 32, wherein said prism of said light collecting means has a substantially quadrangular pyramid shape.

37. The distance measuring device according to claim 32, wherein said sequential energizing means comprises means for simultaneously energizing said light sources extending in one of said first and second directions and for sequentially energizing said light sources extending in the other of said first and second directions.

38. The distance measuring device according to claim 32, wherein said light detection means comprises a plurality of light detection members aligned along one of said first and second directions, and extending in the other of said first and second directions.

39. The distance measuring device according to claim 32, wherein said light detection means comprises a plurality of light detection members extending in each of said first and second directions.

40. The distance measuring device according to claim 39, wherein said plurality of light detection members are arranged in a cross fashion extending along both said first and second directions.

41. The distance measuring device according to claim 32, wherein said sequential energizing means is operative to energize said plurality of light sources individually.

42. The distance measuring device according to claim 33, wherein said light detecting means comprises a plurality of light detection members linearly arranged in the other of said first and second directions with respect to the direction in which said light detecting means are moved.

43. The distance measuring device according to claim 42, further comprising means for scanning said light detecting means for signals corresponding to the light received from said distance measuring points to measure the distance from said device to at least at one of said points.

44. The distance measuring device according to claim 32, further comprising means for moving said light detecting means in both said first and second directions.

45. The distance measuring device according to claim 32, wherein said light detecting means comprises a plurality of light detecting members linearly arranged in one of said first and second directions.

46. The distance measuring device according to claim 45, further comprising means for moving said light detecting members in the other direction with respect to the direction of arrangement of said light detecting members.

47. The distance measuring device according to claim 27, wherein said light source means comprises a plurality of light sources arranged at the vertices of a polygon and a light source provided in the center of said polygon, wherein said center light source is equidistant from the plurality of light sources.

48. The distance measuring device according to claim 27, further comprising means for sequentially controlling the emission of light from said light source means in one of said first and second directions.

49. The distance measuring device according to claim 48, further comprising means for moving said light detecting members along the other said direction with respect to said direction of sequential emission of light from said light source means.

50. A distance measuring device for projecting light beams to a plurality of distance measurement points, to measure the distance from said device to an object located at least at one of said distance measurement points, said device comprising:
- source means for emitting light;
- a prism for separating the light emitted by said source means into a plurality of light beams, said prism having an optical axis and projecting said light beams to said distance measurement points, said distance measurement points extending in a first direction and in a second, traverse direction and located at positions that can have different distances from said device;

means for collecting light reflected by said distance measurement points; and means for detecting the light collected by said light means;

wherein said light source means comprises a plurality of light sources linearly arranged in one of said first and second directions.

51. The distance measuring device according to claim 50, further comprising means for moving said light detection means along one of said first and second directions, and wherein said collecting means comprises an optical element for directing, to said light detection means, the light beams reflected by said distance measurement points arranged in the other of said first and second directions with respect to the direction of movement of said light detecting means.

52. The distance measurement device according to claim 51, further comprising means for scanning the light detection means for signals corresponding to the light received from said distance measuring points to calculate the distance from said device to said distance measurement points.

53. The distance measuring device according to claim 50, further comprising means for computing the distance to at least at one of said distance measuring points.

54. The distance measuring device according to claim 50, wherein said light collecting means comprises a prism having a substantially quadrangular pyramid shape.

55. The distance measuring device according to claim 50, wherein said light detecting means comprises a plurality of light detection members extending in both said first and second directions.

56. The distance measuring device according to claim 50, further comprising means for moving said light detection means along said first and said second directions.

57. The distance measuring device according to claim 54, further comprising means for sequentially controlling the emission of light from said light source means along one of said first and second directions.

58. The distance measuring device according to claim 57, further comprising means for moving said light detection means along one of said first and second directions.

59. The distance measuring device according to claim 58, wherein said collecting means comprises an optical element for directing, to said light detection means, the light beams reflected by said distance measurement points arranged in the other of said first and second directions with respect to the direction of movement of said light detecting means.

60. The distance measuring device according to claim 57, wherein said light detecting means comprises a plurality of light detectors aligned along one of said first and second directions, wherein each of said light detectors extend in the other of said first and second directions with respect to the direction of alignment of said light detectors.

61. The distance measuring device according to claim 54, wherein said light detecting means comprises a plurality of light detectors extending along said first and second directions.

62. The distance measuring device according to claim 57, wherein said light detecting means comprises a plurality of light detection members linearly arranged in one of said first and second directions.

63. The distance measuring device according to claim 62, further comprising means for moving said light detection members along the other of said first and second directions with respect to the direction of arrangement of said light detection members.

64. The distance measuring device according to claim 62, wherein said light collection means comprises an optical element for directing said light beams, reflected by said distance measurement points aligned in either of said first and second directions, to said light detection means.

65. The distance measuring device according to claim 62, wherein said light collecting means comprises an optical element for directing, to said light detection means, the light reflected by said distance measurement points aligned in the other of said directions with respect to the direction of arrangement of said light detection members.

66. The distance measuring device according to claim 65, further comprising means to scan the light detection members for signals corresponding to the light received from said distance measuring points.

67. A distance measuring device for projecting light beams to a plurality of distance measurement points, to measure the distance from an object located at least at one of said points to said device, said distance measurement points forming at least a two-dimensional distribution of points extending in first and second directions and located at positions having different distances from said device, said device comprising:

source means for emitting light to be reflected from at least one of said distance measurement points, said emitting means comprising a plurality of light emitters linearly arranged along one of said first and second directions;

means for collecting light reflected from said distance measurement points;

means for detecting light reflected from said distance measuring points; and means for moving said light emitters along the other of said first and second directions with respect to the direction of linear arrangement of said light emitters.

68. The distance measuring device according to claim 67, wherein said light detecting means comprises a plurality of light detection members aligned in one of said first and second directions, and extending in the other of said first and second directions.

69. The distance measuring device according to claim 67, wherein said light detecting means comprises a plurality of light detection members arranged along said first and second directions.

70. The distance measuring device according to claim 67, further comprising means for sequentially energizing said light emitters of said light emitting means to emit light in a predetermined manner in one of said first and second directions.

71. The distance measuring device according to claim 67, further comprising means for computing the distance to at least one of said distance measuring points from the light detected by said light detecting means.

72. The distance measuring device according to claim 71, further comprising means for moving said light detecting means along one of said first and second directions.

73. The distance measuring device according to claim 71, wherein said collecting means comprises a prism having a substantially quadrangular pyramidal shape.

74. The distance measuring device according to claim 71, wherein said light collecting means comprises an optical element for collecting the light beams reflected by the distance measuring points in one of said first and second directions and means for moving said light detecting means along the other of said first and second directions with respect to said direction of collection of light beams by said optical element.

75. The distance measuring device according to claim 73, wherein said light collecting means comprises an optical element for directing, to said light detecting means, the light reflected by said distance measurement points aligned along said direction of sequential emission of light from said light emitting means.

76. The distance measuring device according to claim 70, wherein said light detecting means comprises a plurality of light detectors linearly arranged along one of said first and second directions and extending in the other of said directions.

77. The distance measuring device according to claim 76, further comprising means for moving said light detecting means in the other of said directions with respect to the direction in which said light detectors are arranged.

78. The distance measuring device according to claim 76, wherein said light collecting means comprises an optical element for directing the light, reflected by said distance measurement points aligned in one of said first and second directions, to said light detecting means.

79. The distance measuring device according to claim 74, wherein said light detecting means comprises a plurality of light detection members extending along said first and second directions.

80. The distance measuring device according to claim 74, wherein said light detecting means comprises a plurality of light detection members aligned in one of said first and second directions and extending in the other of said first and second directions.

81. The distance measuring device according to claim 74, further comprising means for moving said light detecting means in said first and second directions.

82. The distance measuring device according to claim 67, further comprising means for computing the distance to at least one of said distance measuring points from the light received by said the light detecting means.

83. The distance measuring device according to claim 67, wherein said collecting means comprises a prism having a substantially quadrangular pyramid shape.

84. The distance measuring device according to claim 82, further comprising means for moving said light detecting means along one of said first and second directions.

85. The distance measuring device according to claim 82, wherein said light collecting means comprises an optical element for directing the light beams reflected by said distance measuring points extending in one of said first and second directions to said light detecting means.

86. The distance measuring device according to claim 82, wherein said light detecting means comprises a plurality of light detection members extending along one of said first and second directions and said collecting means comprises an optical element for collecting the light beams reflected by said distance measurement points extending in one of said first and second directions.

87. The distance measuring device according to claim 86, further comprising means for moving said light detectors along the other of said first and second directions, with respect to the direction in which said light detectors extend.

88. The distance measuring device according to claim 86, further comprising means for moving said light detection means in the other of said first and second directions with respect to the direction that said optical element collects light beams.

89. The distance measuring device according to claim 86, wherein said optical element collects light beams reflected by distance measurement points aligned in the other of said directions with respect to the direction in which said light detection members extend.

90. The distance measuring device according to claim 67, said light detection means comprising a charge coupled device.

91. The distance measuring device according to claim 66, further comprises means for moving said light emitters along the direction of linear arrangement of said light emitters.

92. A distance measuring device for projecting light beams to a plurality of distance measurement points forming at least a two-dimensional distribution of points extending in first and second transverse directions, to measure the distance from said device to an object located at least at one of said distance measurement points, said device comprising:
source means for emitting light, said light source means comprising means for projecting a plurality of discrete light beams to said distance measurement points;
means for detecting the light reflected from said distance measuring points;
means for supporting said light source means and said light detecting means so that the optical axis of said light source means is parallel to the optical axis of said light detecting means; and
means for driving said supporting means along at least one of said first and second directions; wherein said driving means comprises a pin member operatively connected to said supporting means, a cam groove for receiving said pin member and means for rotating said cam, whereby said supporting means is moved by said rotating means.

93. The distance measuring device according to claim 92, wherein said cam groove is disposed on the periphery of a cam cylinder, whereby rotating said cam cylinder reciprocates said supporting means.

94. The distance measuring device according to claim 92, wherein said cam groove is disposed on a cam plate, whereby rotating said cam plate reciprocates said supporting means.

95. A distance measuring device for projecting light beams to a plurality of distance measurement points forming at least a two-dimensional distribution of points extending in first and second transverse directions, to measure the distance from said device to an object located at least at one of said distance measurement points, said device comprising:
source means for emitting light, said light source means comprising means for projecting a plurality of discrete light beams to said distance measurement points;

means for detecting the light reflected from said distance measuring points;

means for supporting said light source means and said light detecting means so that the optical axis of said light source means is parallel to the optical axis of said light detecting means; and means for driving said supporting means along at least one of said first and second directions; wherein said driving means comprises a motor including a shaft that is operatively connected to said supporting means.

96. The distance measuring device according to claim 95, further comprising means for controlling the speed of said motor.

97. The distance measuring device according to claim 95, further comprising control means for determining the position of said supporting means by detecting the position of said motor shaft.

98. A distance measuring device for projecting light beams to a plurality of distance measurement points forming at least a two-dimensional distribution of points extending in first and second transverse directions, to measure the distance from said device to an object located at least at one of said distance measurement points, said device comprising:

source means for emitting light, said light source means comprising means for projecting a plurality of discrete light beams to said distance measurement points;

means for detecting the light reflected from said distance measuring points;

means for supporting said light source means and said light detecting means so that the optical axis of said light source means is parallel to the optical axis of said light detecting means; and means for driving said supporting means along at least one of said first and second directions; wherein said driving means comprises a magnet operatively connected to said supporting means, an electromagnet arranged adjacent to said magnet, means for biasing said magnet, and means for energizing said electromagnet to move said magnet, against said biasing means, whereby said supporting means is moved in one of said first and second directions.

99. The distance measuring device according to claim 98, said energizing means comprising a control circuit to sequentially change the polarity of said electromagnet to attract and repel said magnet.

100. A distance measuring device for projecting light beams to a plurality of distance measurement points forming at least a two-dimensional distribution of points extending in first and second transverse directions, to measure the distance from said device to an object located at least at one of said distance measurement points, said device comprising:

source means for emitting light, said light source means comprising means for projecting a plurality of discrete light beams to said distance measurement points;

means for detecting the light reflected from said distance measuring points;

means for supporting said light source means and said light detecting means so that the optical axis of said light source means is parallel to the optical axis of said light detecting means; and means for driving said supporting means along at least one of said first and second directions; wherein said supporting means comprising two slide plates slidably mounted with respect to one another, and said driving means comprises a lever operatively connected to reciprocate said slide plates along a path and a cam for driving said lever, whereby said supporting means is moved in one of said first and second directions.

101. The distance measuring device according to claim 100, further comprising a first spring attached between said slide plates to bias said plates with respect to each other, and a second spring for biasing both said slide plates in a direction opposite to the direction of reciprocation.

102. The distance measuring device according to claim 101, further comprising a latch to engage and retain said slide plates at one end limit of said path and means for disengaging said latch to allow reciprocal motion of said supporting means away from said end limit.

103. A distance measuring device for projecting light beams to a plurality of distance measurement points forming at least a two-dimensional distribution of points extending in first and second transverse directions, to measure the distance from said device to an object located at least at one of said distance measurement points, said device comprising:

source means for emitting light, said light source means comprising means for projecting a plurality of discrete light beams to said distance measurement points;

means for detecting the light reflected from said distance measuring points;

means for supporting said light source means and said light detecting means so that the optical axis of said light source means is parallel to the optical axis of said light detecting means; and means for driving said supporting means along at least one of said first and second directions; wherein said driving means comprises:

a rotatably supported screw member;

at least one nut member drivingly engaged with said screw member;

a linkage operatively connected between said at least one nut member and said supporting means; and means for rotating said screw member to drive said supporting means.

104. The distance measuring device according to claim 103, further including means, operably connected to said screw member, for sensing the position of said supporting means.

105. A distance measuring device for projecting light beams to a plurality of distance measurement points forming at least a two-dimensional distribution of points extending in first and second transverse directions, to measure the distance from said device to an object located at least at one of said distance measurement points, said device comprising:

source means for emitting light, said light source means comprising means for projecting a plurality of discrete light beams to said distance measurement points;

means for detecting the light reflected from said distance measuring points;

means for supporting said light source means and said light detecting means so that the optical axis of said light source means is parallel to the optical axis of said light detecting means; and means for driving said supporting means along at least one of said first and second directions; wherein said supporting means comprises means for mounting said supporting means for rotation about a pivot, said driving means rotating said supporting means about said pivot.

106. The distance measuring device according to claim 105, wherein the driving means comprises at least one solenoid operative to rotate said supporting means about said pivot.

107. The distance measuring device according to claim 106, further comprising a lever connected to said supporting means and a slide plate operatively connected to said lever, and means for biasing said lever, so that when said at least one solenoid is deactivated, said biasing means will rotate said supporting means to a predetermined position.

108. A distance measuring device for projecting light beams to a plurality of distance measurement points forming at least a two-dimensional distribution of points extending in first and second transverse directions, to measure the distance from said device to an object located at least at one of said distance measurement points, said device comprising:
source means for emitting light, said light source means comprising means for projecting a plurality of discrete light beams to said distance measurement points;
means for detecting the light reflected from said distance measuring points;
means for supporting said light source means and said light detecting means so that the optical axis of said light source means is parallel to the optical axis of said light detecting means; and
means for driving said supporting means along at least one of said first and second directions; wherein said driving means comprises a rack and pinion for driving said rack, said supporting means operatively connected to said rack.

109. A distance measuring device for projecting light beams to a plurality of distance measurement points forming at least a two-dimensional distribution of points extending in first and second transverse directions, to measure the distance from said device to an object located at least at one of said distance measurement points, said device comprising:
source means for emitting light, said light source means comprising means for projecting a plurality of discrete light beams to said distance measurement points;
means for detecting the light reflected from said distance measuring points;
means for supporting said light source means and said light detecting means so that the optical axis of said light source means is parallel to the optical axis of said light detecting means; and
means for driving said supporting means along at least one of said first and second directions; wherein said supporting means comprises two plate members movable relative to one another with lost motion between said plate members and further comprising means for biasing plate members along one of said first and second directions.

110. The distance measuring device according to claim 109, wherein said driving means comprises a lever operatively connected to be driven by a cam, said lever drivingly engaging one of said plate members to move said supporting means in a direction opposite to the direction of biasing by said biasing means.

111. A distance measuring device for projecting light beams to a plurality of distance measurement points forming at least a two-dimensional distribution of points extending in first and second transverse directions, to measure the distance from said device to an object located at least at one of said distance measurement points, said device comprising:
source means for emitting light, said light source means comprising means for projecting a plurality of discrete light beams to said distance measurement points;
means for detecting the light reflected from said distance measuring points;
means for supporting said light source means and said light detecting means so that the optical axis of said light source means is parallel to the optical axis of said light detecting means; and
means for driving said supporting means along at least one of said first and second directions; wherein said driving means comprises:
a pinion having a partially toothed peripheral portion;
a pair of oppositely arranged racks positioned to be selectively engaged by said toothed peripheral portion of said pinion, said racks operatively connected to said supporting means; and
means for rotating said pinion to move said supporting means.

112. A distance measuring device for projecting light beams to a plurality of distance measuring points, to measure the distance from said device to an object located at least at one of said distance measuring points, said device comprising:
source means for emitting light;
means for deflecting light emitted by said light source means into a plurality of light beams to be projected to said distance measuring points, said distance measuring points forming a distribution of points extending in first and second directions and located in positions that can have different distances from said device;
means for collecting the light deflected by said distance measuring points;
means for detecting light collected by said distance measuring points, said light deflecting means and said light collecting means comprising an optical element rotatably mounted in front of said light emitting means and light detecting means; and
means for rotating said optical element to cause light beams to be deflected to and collected from a plurality of said distance measuring points, wherein said optical element comprises a pair of members with a liquid layer disposed between said members.

113. A distance measuring device for projecting light beams to a plurality of distance measuring points, to measure the distance from said device to an object located at least at one of said distance measuring points, said device comprising:
said source means for emitting light;
means for deflecting the light emitted by said light source means into a plurlaity of light beams to be projected to said distance measuring points, said distance measuring points forming a distribution of points extending in first and second directions and located at positions that can have different distances from said device;

means for collecting the light reflected by said distance measuring points;

means for detecting light collected from said distance measuring points, said light deflecting means and light collecting means comprising an optical element rotatably mounted in front of said light emitting means and said detecting means; and means for rotating said optical element to cause light beams to be deflected to and collected from a plurality of said distance measuring points, wherein said optical element comprises first and second lenses, said lenses having the same radius of curvature along adjacently positioned face.

114. A distance measuring device for projecting light beams to a plurality of distance measurement points to measure the distance from said device to an object located at least at one of said distance measurement points, said device comprising:

source means for emitting light;

means for deflecting the light emitted by said light source means into a plurality of discrete light beams to be projected to a plurality of said distance measurement points, said distance measurement points forming a distribution of points extending in first and second directions and located at positions that can have different distances from said devices;

means for collecting the light reflected by said distance measurement points, said light collection means comprising an optical member including first and second members; and means for detecting the collected light from said distance measuring points;

wherein said light deflectig means comprises an optical element rotatably mounted in front of said light emitting means and means for rotating said optical element to allow light from said source means to be projected to a plurality of said distance measurement points; wherein said light collecting means further comprises means for rotating said second member with respect to said first member to allow light beams to be emitted to and collected from a plurality of said distance measurement points.

115. A distance measuring device for projecting light beams to a plurality of distance measurement points to measure the distance from said device to an object located at least at one of said distance measurement points, said device comprising:

source means for emitting light;

means for deflecting the light emitted by said light source means into a plurality of discrete light beams to be projected to a plurality of said distance measurement points, said distance measurement points forming a distribution of points extending in first and second directions and located at positions that can have different distances from said devices;

means for collecting the light reflected by said distance measurement points; and means for detecting the collected light from said distance measuring points;

wherein said light deflecting means comprises an optical element rotatably mounted in front of said light emitting means and means for rotating said optical element to allow light from said source means to be projected to a plurality of said distance measurement points; wherein said light collecting means comprises an optical element, said optical element comprising relatively rotatable members including adjacently positioned, corresponding concave and convex surfaces.

116. The distance measuring device according to claim 115, wherein said optical elements of said light collecting means and light reflecting means further comprises means for rotating one of said members with respect to the other of said members.

117. The distance measuring device according to claim 114, further comprising a liquid layer between said members.

118. A distance measuring device for projecting light beams to a plurality of distance measuring points forming a distribution of points extending in first and second directions and located in positions that can have different distances from said device, to measure the distance form said device to an object located at least at one of said distance measuring points, said device comprising:

source means for emitting light;

means for deflecting the light emitted by said light source means into a plurality of discrete light means projected to said distance measuring points;

means for collecting the light reflected from said distance measuring points; and means for detecting the collected light from said distance measuring points; wherein said light deflecting means and said light collecting means comprise two pairs of light deflecting elements rotatably mounted in front of said light emitting means and said light detecting means, and wherein said light deflecting means and said light collecting means comprise two pairs of pivotably mounted mirrors, a first pair of said mirrors cooperating to project the light emitted from said light source means to said distance measuring points, and a second pair of said mirrors cooperating to deflect the light reflected from said distance measuring points to said detecting means; wherein said first pair of mirrors comprises a first mirror pivotably mounted adjacent to said light source means and a second mirror receiving light reflected by said first mirror to project the received light to a distance measuring point, and said second pair of mirrors comprises a third mirror pivotably mounted adjacent to said light detecting means, and a fourth mirror positioned to receive light reflected from said distance measuring point and to reflect the light to said third mirror, wherein light reflected from said third mirror is received by said light detecting means.

119. The distance measuring device according to claim 118, further comprising means to rotate one of said pairs of light deflecting elements to allow light emitted from said light source means to be projected to a plurality of said distance measurement points.

120. The distance measuring device according to claim 118, further comprising means for operably connecting said second mirror with said fourth mirror and said first mirror with said third mirror.

121. The distance measuring device according to claim 118, further comprising means for simultaneously rotating said first and third mirrors and for simultaneously rotating said second and fourth mirrors.

122. A distance measuring device for projecting light beams to a plurality of distance measuring points to measure the distance from said device to an object located at least at one of said distance measuring points, said device comprising:

source means for emitting light along an optical axis;

means for projecting the light emitted by said source means to a plurality of said distance measuring points forming at least a two dimensional distribution of points extending substantially horizontally and vertically from said optical axis;

means for collecting the light reflected from at least one of said distance measuring points; and means for detecting the light collected by said light collecting means; wherein said light source means comprises a time-sparingly pulsed light emitting member and said light projecting means comprises a plate with a slit extending along a direction substantially perpendicular to the optical axis of said source means, and means for moving said plate in a direction substantially perpendicular to the direction along which said slit extends.

123. A distance measuring device for projecting light beams to a plurality of distance measuring points to measure the distance from said device to an object located at least at one of said distance measuring points, said device comprising:

source means for emitting light along an optical axis;

means for projecting the light emitted by said source means to a plurality of said distance measuring points forming at least a two dimensional distribution of points extending substantially horizontally and vertically from said optical axis;

means for collecting the light reflected from at least one of said distance measuring points; and means for detecting the light collected by said light collecting means; wherein said light source means comprises a time-sparingly pulsed light emitting member and said light projecting means comprises a plate with a slit extending along a direction substantially perpendicular to the optical axis of said source means, and a prism for separating the light emitted from said source means to said distribution of distance measuring points.

124. The distance measuring device according to claim 123, wherein said prism has a substantially biangular pyramid shape.

125. The distance measuring device according to claim 123, wherein said prism has a substantially quadrangular pyramid shape.

* * * * *

UNITED STATES PATENT AND TRADEMARK OFFICE
CERTIFICATE OF CORRECTION

PATENT NO. : 5,137,350
DATED : August 11, 1992
INVENTOR(S) : M. MISAWA et al.

It is certified that error appears in the above-identified patent and that said Letters Patent is hereby corrected as shown below:

```
    Cover page, 75/Inventors" change "fuchu" to ---Tokyo---.
    At column 38, line 63 (claim 113, line 8), change "plurlaity"
to ---plurality---.
    At column 39, line 33 (claim 114, line 20), change
"deflectig" to ---deflecting---.
    At column 40, line 16 (claim 118, line 6), change "form" to -
-from---.
```

Signed and Sealed this

Twenty-ninth Day of March, 1994

Attest:

BRUCE LEHMAN

Attesting Officer     Commissioner of Patents and Trademarks